US011907959B2

(12) United States Patent
Bowers

(10) Patent No.: US 11,907,959 B2
(45) Date of Patent: *Feb. 20, 2024

(54) SYSTEMS AND METHODS FOR PROVIDING VENDOR MANAGEMENT AND ADVANCED RISK ASSESSMENT WITH QUESTIONNAIRE SCORING

(71) Applicant: Venminder, Inc., Elizabethtown, KY (US)

(72) Inventor: Dana A. Bowers, Elizabethtown, KY (US)

(73) Assignee: Venminder, Inc., Elizabethtown, KY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/102,994

(22) Filed: Jan. 30, 2023

(65) Prior Publication Data

US 2023/0222517 A1 Jul. 13, 2023

Related U.S. Application Data

(63) Continuation of application No. 17/149,389, filed on Jan. 14, 2021, now Pat. No. 11,615,429.

(60) Provisional application No. 62/962,726, filed on Jan. 17, 2020.

(51) Int. Cl.
| | | |
|---|---|---|
| G06Q 30/00 | (2023.01) | |
| G06Q 30/018 | (2023.01) | |
| G06F 40/186 | (2020.01) | |
| G06Q 10/0635 | (2023.01) | |
| G06Q 10/0639 | (2023.01) | |

(52) U.S. Cl.
CPC ....... *G06Q 30/0185* (2013.01); *G06F 40/186* (2020.01); *G06Q 10/0635* (2013.01); *G06Q 10/06395* (2013.01)

(58) Field of Classification Search
CPC .......... G06Q 30/0185; G06Q 10/0635; G06Q 10/06395; G06F 40/186
See application file for complete search history.

(56) References Cited

U.S. PATENT DOCUMENTS

| 11,615,429 | B2 | 3/2023 | Bowers | |
|---|---|---|---|---|
| 2015/0227869 | A1* | 8/2015 | Saraf | G06Q 10/0635 705/7.28 |
| 2015/0242776 | A1* | 8/2015 | Wilcox | G06Q 10/0635 705/7.28 |
| 2016/0232465 | A1* | 8/2016 | Kurtz | G06Q 10/0635 |
| 2018/0129989 | A1* | 5/2018 | Bowers | G06Q 10/0635 |
| 2018/0336264 | A1* | 11/2018 | Barday | H04L 67/306 |
| 2019/0050597 | A1* | 2/2019 | Barday | G06F 16/951 |
| 2019/0266348 | A1* | 8/2019 | Barday | G06F 40/186 |
| 2020/0004762 | A1* | 1/2020 | Malhotra | G06F 16/254 |
| 2020/0042543 | A1* | 2/2020 | Barday | H04L 63/20 |
| 2020/0050790 | A1* | 2/2020 | Barday | G06F 40/174 |
| 2020/0143301 | A1* | 5/2020 | Bowers | G06F 3/04847 |

(Continued)

*Primary Examiner* — Hassan Mrabi
(74) *Attorney, Agent, or Firm* — Choate, Hall & Stewart LLP; William R. Haulbrook; Peter A. Flynn

(57) ABSTRACT

Methods and systems are presented herein for assessing risk associated with a vendor providing services and/or other products to a financial institution, for preparation of associated risk assessment reports or vendor oversight reports, and for maintenance of a plurality of risk assessment reports or oversight reports associated with a plurality of vendors.

18 Claims, 85 Drawing Sheets

(56) References Cited

U.S. PATENT DOCUMENTS

| | | | |
|---|---|---|---|
| 2021/0089980 A1* | 3/2021 | Akey | G06Q 30/0203 |
| 2021/0149982 A1* | 5/2021 | Jones | G06F 16/951 |
| 2021/0224824 A1 | 7/2021 | Bowers | |
| 2021/0303603 A1* | 9/2021 | Barday | G06F 16/288 |
| 2022/0019605 A1* | 1/2022 | Malhotra | G06Q 10/0637 |

* cited by examiner

1200 Upload compliance document

- 1202 Vendor product — %Vendor.Name% %Product.Name%
- 1204 Document Type — Audit/IT
- 1206 Select file to upload — File Name
- 1208 Document description — Ex. %Type examples%
- 1210 Expiration date

1212
Is the document relevant to other Andera products?

If so, no need to upload the same document multiple times. Just choose the other products below and we will make this document accessible from those folders as well.

- ☐ Select all products
- ☐ Account Management
- ☐ Customer Support Center Services
- ☐ Online Account Opening

Frequently Asked Questions

What is the difference between a template and a questionnaire?
How do I turn weighted questions on/off?
Do you have risk questionnaire samples?
How do I require approval for risk assessments?

What is the difference between a template and a questionnaire?
At your financial institution you will have only one (1) risk template but you can create as many risk questionnaires as needed.

How do I turn weighted questions on/off?
Go to Manage Template to turn on/off weighted questions.

Do you have risk questionnaire samples?
Yes, questionnaire samples are available when creating new risk questionnaires. Go to the Questionnaire Library to create a new risk questionnaire.

How do I require approval for risk assessments?
Go to Enterprise Admin to set risk assessments to require approval by authorized users.

FIG. 25

Preview Level 1 Risk Questionnaire

1 Operational Risk

1. Does the company lack adequate documentation on internal controls?
2. Have there been any material operational lapses, particularly customer impacting, in past 12 months?
3. Is the service provider a sole source of the product or service for the bank?
4. Does the company have evidence of operating in a manner consistent with regulatory guidance and bank expectations?

2 Business Continuity

1. Has the company developed an escalation and notification plan to alert the bank to any significant disruptions?
2. Has the company conducted a full business continuity test with adequate results?
3. Does the company lack a business continuity plan approved by senior management or the board?
4. Has the company experienced a disruption in service in the past 24 months?

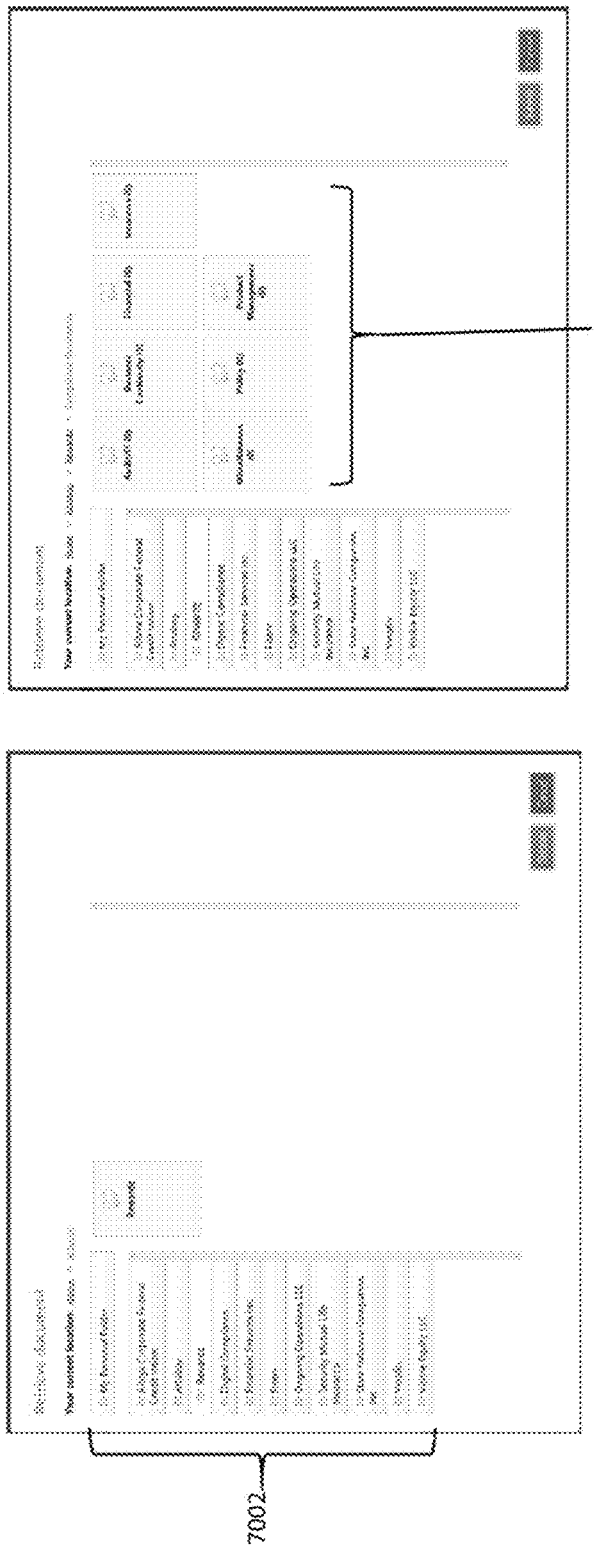
FIG. 70A
FIG. 70B
FIG. 70C

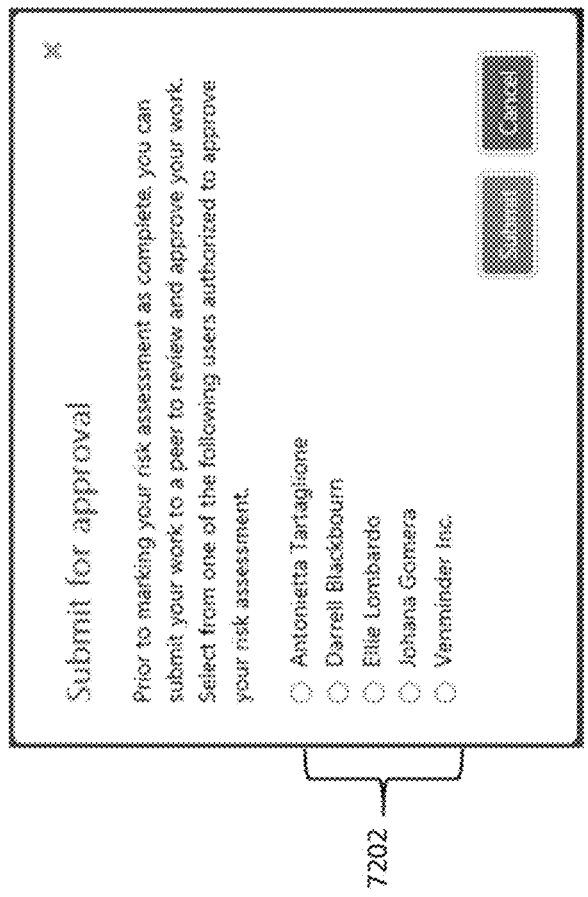
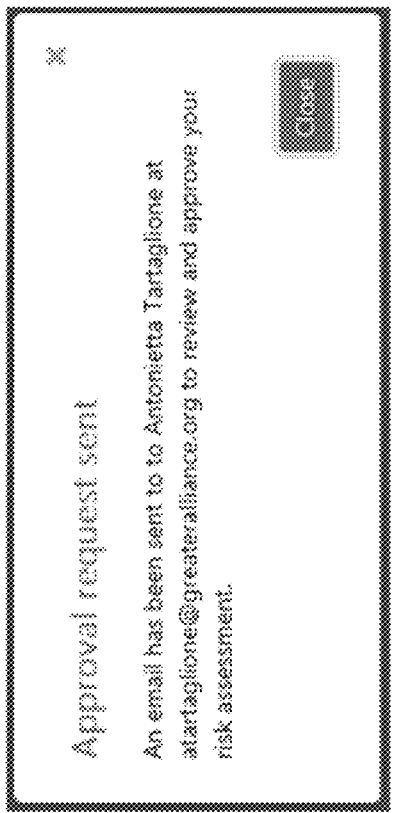
FIG. 72A
FIG. 72B

FIG. 97

SYSTEMS AND METHODS FOR PROVIDING VENDOR MANAGEMENT AND ADVANCED RISK ASSESSMENT WITH QUESTIONNAIRE SCORING

CROSS-REFERENCE TO RELATED APPLICATIONS

This patent application claims benefit of U.S. Provisional Application No. 62/962,726, filed on Jan. 17, 2020, titled "SYSTEMS AND METHODS FOR PROVIDING VENDOR MANAGEMENT AND ADVANCED RISK ASSESSMENT WITH QUESTIONNAIRE SCORING", the contents of which are hereby incorporated by reference in their entirety. This patent application is a continuation of U.S. Non-Provisional application Ser. No. 17/149,389, filed on Jan. 14, 2021, titled "SYSTEMS AND METHODS FOR PROVIDING VENDOR MANAGEMENT AND ADVANCED RISK ASSESSMENT WITH QUESTIONNAIRE SCORING", the contents of which are hereby incorporated by reference in their entirety.

FIELD OF THE INVENTION

This invention relates generally to systems and methods for managing client/vendor relationships. More particularly, in certain embodiments, the invention relates to systems and methods for providing vendor management and custom profiles.

BACKGROUND

Financial institutions such as banks and credit unions are increasingly relying on third-party vendors to perform various important functions. While this improves efficiency and reduces cost for the financial institution, there are various risks posed by such outsourcing. A financial institution ("FI") must establish a vendor oversight program to mitigate such risks, comply with various regulations, and pass examination by auditors. Generally, maintaining oversight of different vendors and vendor products requires a coordination of large amounts of oversight requirements, tasks, documents, results, due dates, and individuals.

The vendor management process has historically been disjointed, messy, and time-consuming. A single financial institution may have numerous vendors to manage, and there may be many individuals within a given financial institution who deal with a given vendor and must coordinate collection of documents and data regarding the corresponding vendor products. Furthermore, the terms of various contracts between a financial institution and its vendors must be carefully monitored.

Moreover, financial institutions may wish to maintain different types of information about the vendors and vendor products with which they are associated. Traditional vendor management systems allow financial institutions to maintain information according to a predetermined set of fields.

There is a need for a consolidated, efficient system for managing contracts between a financial institution and its vendors and for preparation of associated vendor oversight reports which include specific risk assessment information for each vendor. There is also a need for customizable vendor profiles that allow new fields of information to be maintained for each vendor. Moreover, there is a need for providing oversight management in a way that information about vendors, products, tasks, results, due dates, and the like can be centrally viewed, updated and output to compliance officers, board members and others.

SUMMARY

Methods and systems are presented herein for assessing risk associated with a vendor providing services and/or other products to a financial institution, for preparation of associated risk assessment reports or vendor oversight reports, and for maintenance of a plurality of risk assessment reports or oversight reports associated with a plurality of vendors.

In some aspects, this disclosure provides a method for determining risk levels associated with vendors and/or software or service providers, the method comprising the steps of causing to display, by a processor of an enterprise system, one or more graphical user interfaces (GUIs) associated with one or more risk assessment modules, the risk assessment modules comprising one or more members selected from the group consisting of (i) a template management module (e.g., modify template module) for managing questionnaire templates; (ii) a questionnaire management module (e.g., questionnaire library module) for managing questionnaires; (iii) a start risk assessment module for performing a new risk assessment; (iv) a continue risk assessment module for continuing an existing risk assessment; and (v) an assessment viewing module for managing completed assessment. In some embodiments, the method includes receiving, by a processor of an enterprise system, a first input from a first client (e.g., said first client having been authorized to access the enterprise system, e.g., said first client being one member of a network of subscribed clients), the first input comprising instructions to access a selected module of the one or more risk assessment modules; receiving, by the processor of the enterprise system, subsequent input from the first client specific to the selected risk assessment module; and updating, in a memory of the enterprise system, risk assessments information stored in association with the first client, based on the subsequent input. In some embodiments the risk assessment module may be configured to configured to define a scoring system for questions in a questionnaire.

In some embodiments, the method includes providing to a user a create questionnaire GUI. A subsequent input may include custom data field information for a risk assessment, the custom data field information including one or more risk score ranges.

In some embodiments, the method includes providing to a user a review response GUI. A subsequent input may include custom data field information for a risk assessment, the custom data field information including one or more score points for one or more questions in a questionnaire.

BRIEF DESCRIPTION OF THE FIGURES

The foregoing and other objects, aspects, features, and advantages of the present disclosure will become more apparent and better understood by referring to the following description taken in conjunction with the accompanying drawings, in which:

FIG. 7 is an example vendor exam preparation workspace in accordance with an embodiment of the invention.

FIG. 10 is an example workspace for collecting documents by prompting the end user for selection of actions for unassigned suggested documents in accordance with an embodiment of the invention.

FIG. 11 is an example workspace for preparing a collected document for the examination report in accordance with an embodiment of the invention.

FIG. 12 is an example workspace for uploading document to be attached and included in the examination in accordance with an embodiment of the invention.

FIG. 13 is an example workspace to previewing contents to be included in the examination report.

FIG. 14 is an example workspace to review vendor products in accordance with an embodiment of the invention.

FIG. 18 is an example user-management workspace to manage users in accordance with an embodiment of the invention.

FIG. 20 is an example onboarding welcome page in accordance with an embodiment of the invention.

FIG. 25 is an example FAQ modal window in accordance with an embodiment of the invention.

FIG. 28 is an example preview questionnaire modal window in accordance with an embodiment of the invention.

FIG. 33 is an example of a contributor setting workspace in accordance with an embodiment of the invention.

FIG. 36 shows an example tips workspace in accordance with an embodiment of the invention.

FIG. 38 is an example create questionnaire modal window with scoring enabled in accordance with an embodiment of the invention.

FIG. 40A is an example review response: awarded points modal window in accordance with an embodiment of the invention.

FIG. 40B is an example review response: award points for free form question modal window in accordance with an embodiment of the invention.

FIG. 70A is an example "add new control-link" documents workspace in accordance with an embodiment of the invention.

FIG. 70B is an example link-documents workspace in accordance with an embodiment of the invention.

FIG. 70C is an example link documents confirmation modal window in accordance with an embodiment of the invention.

FIG. 72A is an example of a submission approval modal window in accordance with an embodiment of the invention.

FIG. 72B is an example approver confirmation modal window in accordance with an embodiment of the invention.

FIG. 97 is an example risk report in accordance with an embodiment of the invention.

Figure 1:
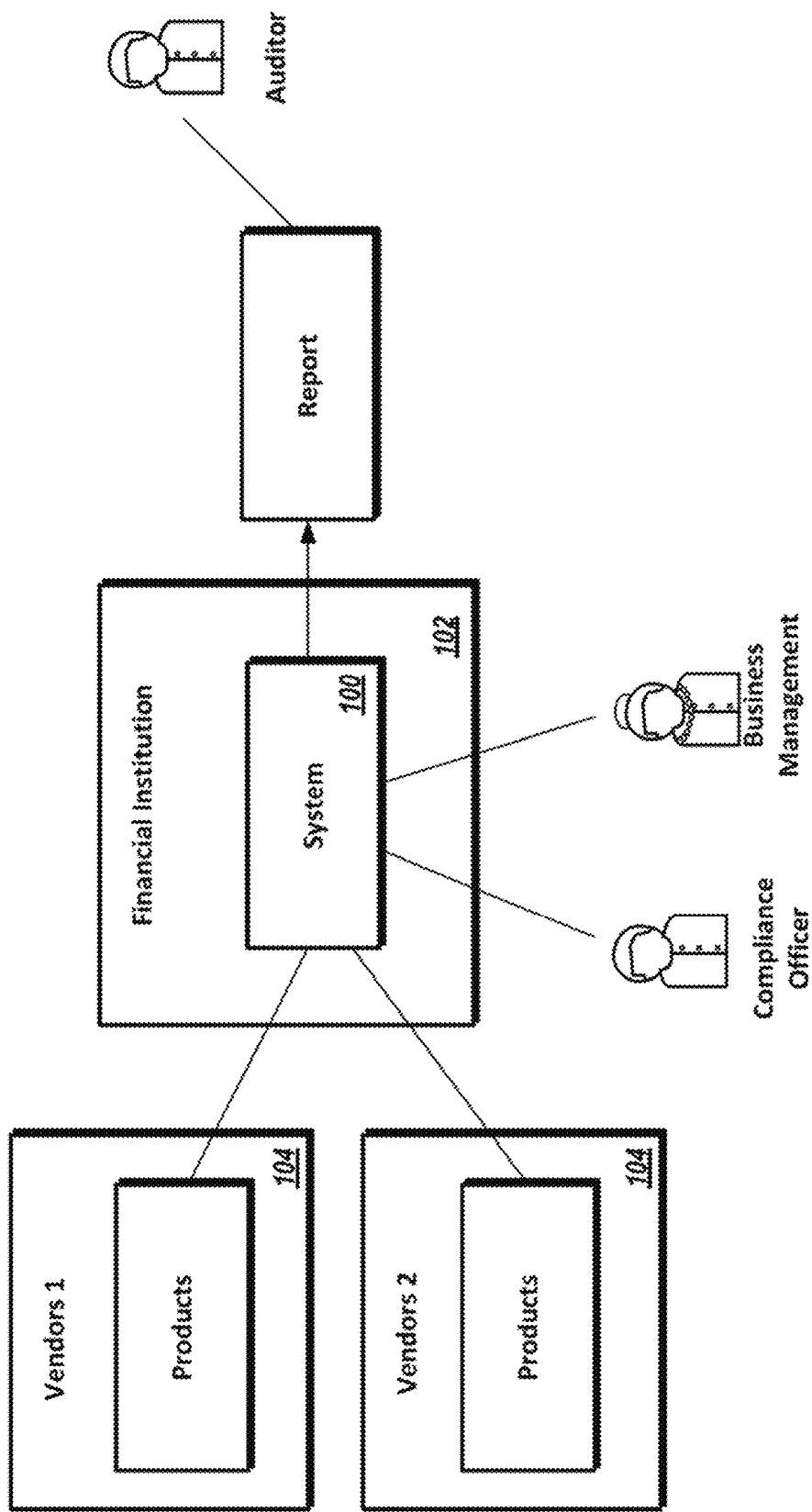
FIG. 1 is a block diagram of an example system for managing contracts between a financial institution and its vendors.

The features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements.

Definitions

Advanced Level Risk Assessment: As used herein, the term "advanced level risk assessment" refers to an advanced level assessment technology where new features are available to set scoring and add residual risk questions.

Advanced Questionnaire: As used herein, the term "advanced level questionnaire" means an add-on component to a standard questionnaire module as described herein.

Client: as used herein, the term "client" may include an organization that uses the software system as described herein.

Enterprise User: As used herein, the term "enterprise user" refers to a client who has purchased a software suite that provides the client with access to the various modules and services described herein.

External Questionnaire: As used herein, the term "external questionnaire" includes a questionnaire that is sent to a recipient who is outside of the client's organization.

Inherent Risk: As used herein, the term "inherent risk" refers to risk that exists for an entity/vendor as a consequence of their policies, procedures, line of business and/or other factors.

Internal Questionnaire: As used herein, the term "internal questionnaire" includes a questionnaire that is sent to a recipient who is within the client's organization.

Mitigating Control: As used herein, the term "mitigating control" refers to one or more policies, procedures, defined sets of rules, expert reviews, regulatory requirements, and/or any item that may be considered to lessen the likelihood of a risk's impact on the overall risk rating for a vendor.

Onboarding: As used herein, the term "onboarding" refers to a process whereby a client is guided through setting themselves up to be able to effectively use the provided software suite.

Probability/Impact: As used herein, the terms "probability" and "impact" refer to the effect of the likelihood of a given event happening combined with the effects of said event; e.g., a tornado hitting a facility would be considered high impact, but, for facilities located outside of Tornado Alley, would be considered low probability.

Questionnaire: As used herein, the term "questionnaire" refers to one or more unique sets of questions, formatted to follow a template, that are created for the purpose of assessing vendor risk.

Recipient: As used herein, the term "recipient" includes a user who receives a questionnaire sent via a provider software application as described herein.

Residual Risk: As used herein, the term "residual risk" refers to the risk that results from applying a mitigating control, such as a financial analysis, cyber security review, or other item as set forth in the definition of mitigating control, to an element of inherent risk that then may lower that risk. Inherent risk−mitigating control=residual risk.

Residual Question: As used herein, the term "residual question" refers to a questions that a user identifies that may help mitigate the risk.

Risk Category: As used herein, the term "risk category" refers to a defined type of risk which may be used as a section header within a risk assessment. Templates provide a list of the most-used categories; they can include such things as Financial or Reputational risk. New risk categories can be added or deleted as required by the FI.

Risk Level Setting: As used herein, the term "risk level setting" refers to risk levels determined by a user and customized to match the terminology used by a client. The risk level settings may apply to all assessments.

Sender: As used herein, the term "sender" includes a client user who sends a questionnaire via a provider software application.

Standard Questionnaire: As used herein, the term "standard questionnaire" includes a base questionnaire module provided by the provider system.

Software Suite: As used herein, the term "software suite" refers to a collection of modules/submodules (e.g., parts of a software program specifying one or more routines), that are able to interface with one another.

Template: As used herein, the term "template" refers to a group of settings that are universally applied to all Risk Assessment questionnaires that are created by a given set of users.

DETAILED DESCRIPTION

Methods and systems are presented herein for assessing risk associated with a vendor providing services and/or other products to a financial institution, for preparation of associated risk assessment reports or vendor oversight reports, and for maintenance of a plurality of risk assessment reports associated with a plurality of vendors.

FIG. 1 is a block diagram of an example system 100 to assist financial institutions 102 to manage vendors 104 in accordance with an embodiment of the invention. In some implementations, the system 100 provides guided workflow to i) manage contracts with a given vendor 104, to provide a guided workflow to assist the financial institution 102 to prepare for an compliance or contract audit examination, ii) provide a rating system of the vendors 104 and their products and services, iii) provide a risk-assessment rating-system for the vendors 104, and iv) provide mechanisms for collaboration, the tracking of communication, and document storage.

Figure 2:
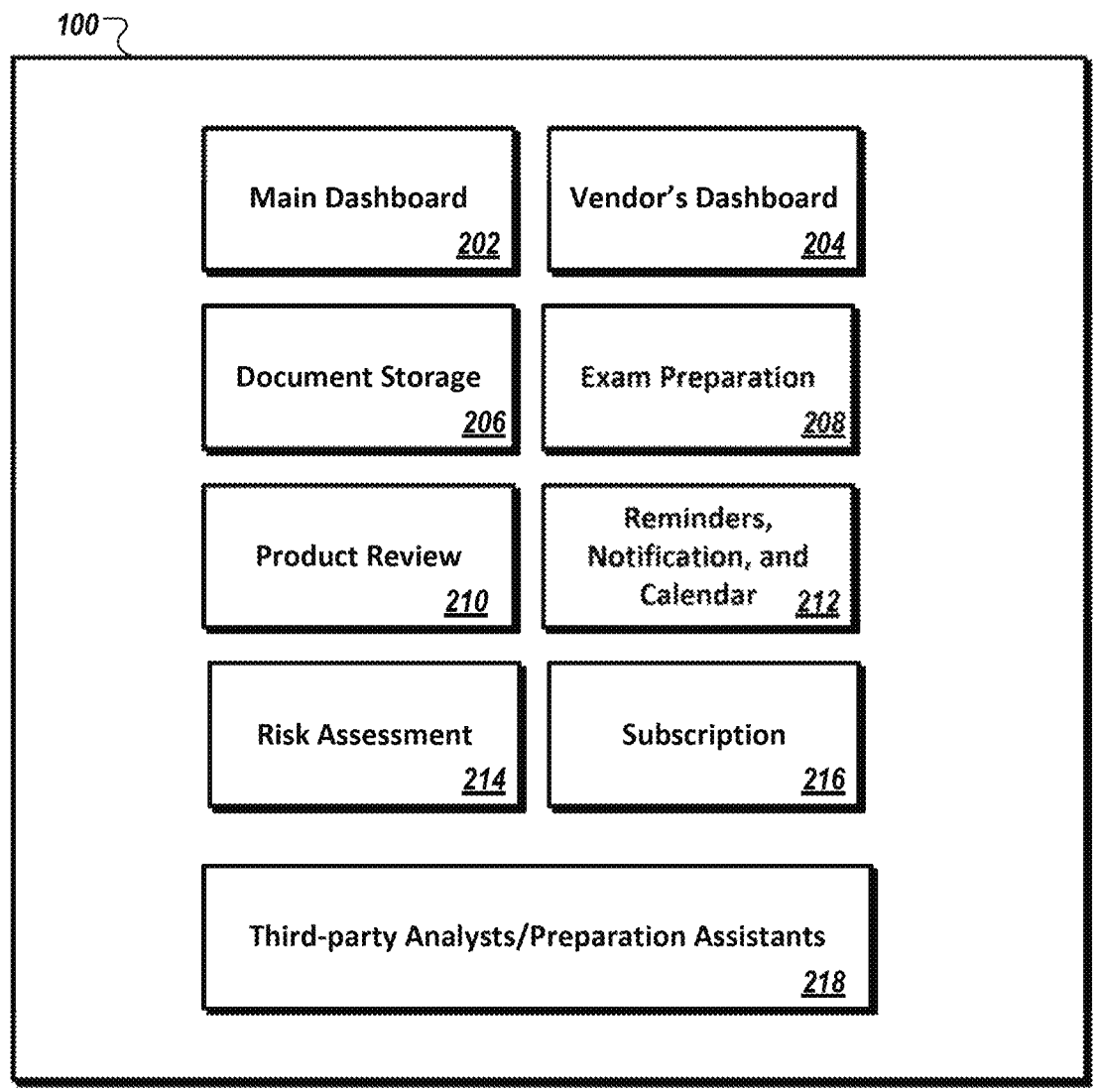
FIG. 2 is a block diagram of the example system for managing contracts between the financial institution and its vendors in accordance with an embodiment of the invention.

FIG. 2 is a block diagram of the example system 100 for managing contracts between the financial institution and its vendors in accordance with an embodiment of the invention. The system 100 may include a main dashboard 202 for managing actions associated with a given vendor 104 and to track such actions. The system 100 may include a vendor dashboard 204 to view and manage products and vendors associated with a given financial institution. The system 100 may include a document storage page 206 to view and manage documents associated with the vendors and their products. In some implementations, the document storage page 206 may be accessible via the main dashboard 202 and the vendor dashboard 204.

The system 100 may include a reminder, notification, and/or calendar function 212. The function 212 may manage and store a list of dates associated with expiration of a given document or contract as well as a list of personal reminders provided by the end-users. The function 212 may display such reminders in a calendar display. The function 212 may send notifications to the end-user based on pre-defined rules associated with an examination. The rules may be related to the expiration date of a given product or agreement, a scheduled examination, a risk-assessment evaluation, and etc.

The function 212 may include an alert and/or information feed (e.g., new documents uploaded, new reviews added, status update on a given examination or preparation process, etc.). The alert may include a progress bar to indicate a given end-user progress with a given task.

The alert may include an experience bar to indicate a given end-user usage level associated with the various functions of the system 100.

The system 100 may include a risk-assessment module 214 to guide an end-user in assigning a risk rating for a given vendor and/or product. The risk-rating may be utilized as part of the reporting of the compliance and/or contract audit examination. In some implementations, the risk rating may be used to determine the types of information and the types of documents to include in the examination report.

The system 100 may include a subscription module 216. The subscription module 216 may manage and maintain usage by the end-user of the various system components (e.g., 202, 204, 206, 208, 210, 212, and 214) for a given financial institution. The system 100 may monitor the end-user's action, such as the usage of complimentary tools and document storage, purchases of additional tools and document storage, purchases of enterprise features, among others.

In some example embodiments, the system may include one or more modules for executing, providing and/or causing to display one or more graphical user interfaces (GUIs) and/or widgets. The GUIs and/or widgets may include a vendor profile widgets for, among other things, managing vendor profiles; oversight grid widgets for, among other things, providing grid-based oversight of oversight requirements; task widgets for, among other things, managing tasks associated with oversight requirements; oversight management widgets for, among other things, managing tasks and oversight requirements associated with vendors and/or vendor products; document widgets for, among other things, managing documents associated with tasks; administrator widgets for, among other things, managing users; dashboard widgets for, among other things, managing outstanding tasks and vendor products associated with users; and reports widgets for, among other things, generating status, task and/or vendor reports.

In some example embodiments, data associated with vendors (e.g., vendor management information), which is used by the GUIs and/or widgets, may be stored in a memory of the system 100 or of a client computing device associated with the system 100. In some example embodiments, the system 100 is an enterprise system with which one or more enterprise client computing devices are connected. The GUIs and/or widgets are described in further detail below.

Main Dashboard

Figure 3:
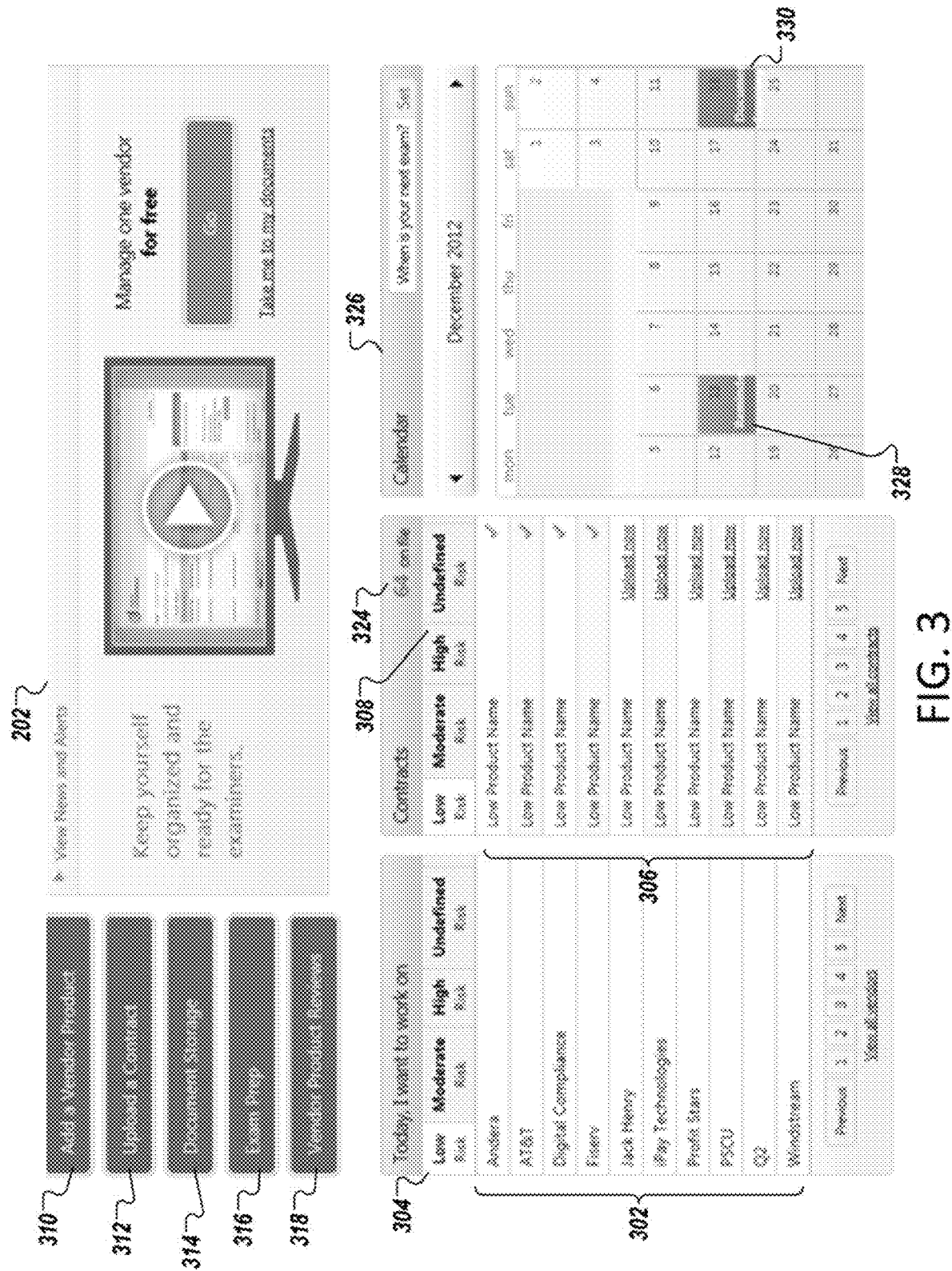
FIG. 3 is an example main dashboard in accordance with an embodiment of the invention.

FIG. 3 is an example main dashboard 202 in accordance with an embodiment of the invention. The main dashboard 202 may be used to initiate the various functions, as described in relation to FIG. 2. The main dashboard 202 may display a vendor list 302, which may be organized and filtered by a vendor's risk level 304 (e.g., low, medium, high, or undefined/unknown). The main dashboard 202 may display a contract list 306, which may also be organized and filtered by risk levels 308. The main dashboard 202 may display a number of contracts on file (324), such as those stored in the document storage 206.

The main dashboard 202 may include a calendar 326 that displays reminder dates 328 and expiration dates 330 of contracts, of risk assessment of vendors and/or products, as well as of upcoming examinations. In some implementations, the calendar 326 may include dates in which notifications will be sent by the system. In some implementations, the calendar 326 may only display the expiration dates for documents that are uploaded by the end-user.

In some implementations, upon selecting a date in the calendar 326, the system 100 may prompt the end-user to create a reminder (e.g., for email communication, SMS-message, and other methods of notification accessible to and specified by the end-user). The system 100 may display a content of a reminder when the end-user hovers the cursor thereover. The calendar may be a part of the reminders, notification, and calendar function 212. The alerts and reminders of the calendar 326 may be employed to notify the end-user of upcoming critical dates (e.g., renewal date). The notification may be generated based on the date of the given activity having met an alert condition (e.g., exceeding a date threshold in relation to the critical date).

The main dashboard 202 may include a function to add a vendor product (310), a function to upload a contract associated with a given product (312), a function to manage stored documents (314), a function to prepare for an examination (316), and a function to review and manage reviews for a given vendor products (318).

The main dashboard 202 may be displayed to the users upon login to the system 100.

In some implementations, when adding a new vendor product (310), the system 100 may present the end user with a list of products. The list may include all products associated to the financial institution, including those that are not currently being managed by any of the end-user of that institution as well as those that do not have a contract loaded. The list of products may be maintained within a database that is managed by the system 100.

When adding a new vendor product, the system 100 may present the end-user with a list of questions associated with the product. The questions may include a request for the vendor name, the product name, the product type, and a risk level. The risk level may be defined as low, medium, high, and undefined (as corresponding to the risk level 304). Alternatively, the risk level may be an input from the risk-assessment module 214.

In some implementations, the risk-levels 304, 308 may be used to determine a suggested document 320 (see—see FIG. 8) in the examination-preparation area 322 (not shown—see FIGS. 7-13). Once the vendor product is added, the system 100 may present the end-user with a notification that the product has been added. In the notification, the system 100 may include a link or a selection that allows the end-user to upload a contract associated with the added vendor product. The system may also provide a link or selection to add a collaborator or to add contact information of the vendor.

In some implementations, the system 100 allows more than one person to interact with a vendor. The collaboration function allows the system 100 to receive information from the end-user about co-workers or other people in the end-user's organization that may perform actions or provide reviews for a given vendor and/or vendor product. In some implementations, the collaborator may perform any of the end-user's function (e.g., upload contract, add notes and reminders, save email conversation, and document events), though may not change or undo any of the actions performed by the end-users. Each of the vendor products may be assigned a different point of contact (i.e., a product manager). The system 100 may provide a search function for the end-user to determine if an added collaborator is already registered with the system 100.

In some implementations, when uploading a contract associated with a given product (312), the system 100 may prompt the end-user for a file. Multiple files may be selected and uploaded in a given instance. The system 100 may send a notification to the end-user that the contract has been uploaded and that a notification will be sent when it is ready for review. In some implementations, the contract may be transmitted to a third-party that analyzes and/or prepare the contract for review by the end-user. The system 100 may use aliases table. Examples of tools utilized by the third-party to analyze and prepare the contract are described in Appendices E and F of the U.S. Provisional Patent Application No. 61/805,066, which is incorporated by reference herein in its entirety.

Vendor Dashboard

Figure 4:
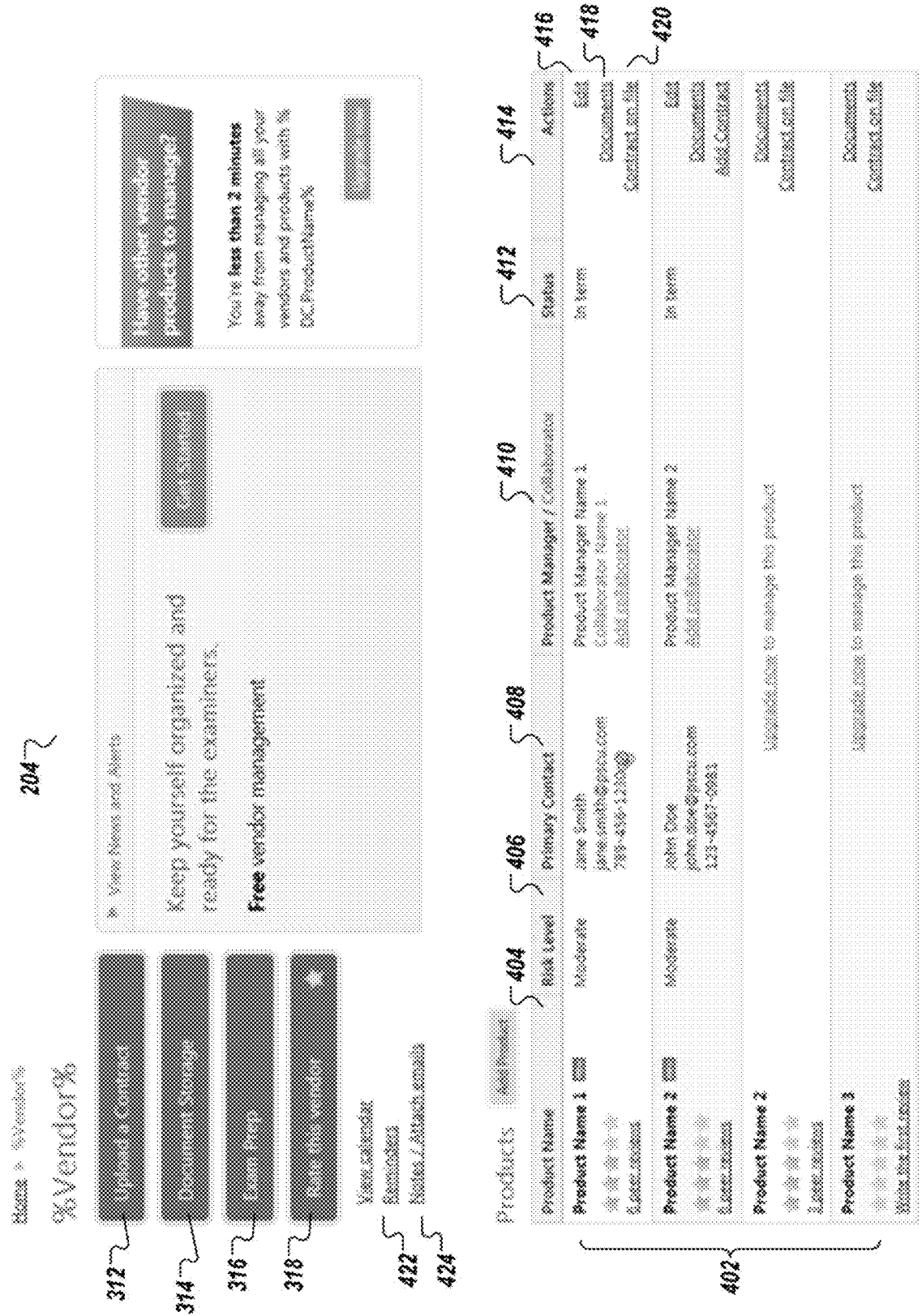
FIG. 4 is an example vendor dashboard in accordance with an embodiment of the invention.

FIG. 4 is an example vendor dashboard 204 in accordance with an embodiment of the invention. In some implementations, the vendor dashboard 204 may be accessed by the end-user when the user selects a vendor from the list of vendors 302 in the main dashboard 202.

In some implementations, the vendor dashboard 204 may include the function to upload a contract associated with a given product (312), the function to manage stored documents (314), the function to prepare for an examination (316), and the function to view and manage reviews for a given vendor products (318).

In some implementations, the vendor dashboard 204 may include a list of vendor products (402) that are associated to the financial institution. The list 402 may include, for example, but not limited to, products that are currently being managed as well as products that are yet to be assigned to a given product manager. For each of the products in the list 402, the system 100 may display a product name 404, a risk level that has been assigned to the product 406, a vendor contact information 408, an assigned product manager (of the financial institution) 410, a status indicator of the product 412, and actionable tasks 414 associated with a given product. The actionable tasks 414 may allow an end-user to edit a given product information (416), to view or manage the document associated with the given product (418), and to add a contract or edit the contract on file associated with the given product (420).

Upon a selection of a product in the list 402, the system 100 may prompt the end-user whether to assign a product-manager for the product. The prompt may further include details and information about the product, including, for example, the vendor name, the product name, the product type, and the source of the product. Upon the end user providing the information, the system 100 may provide options to allow the end-user to upload a contract, to add a collaborator, or to add contact information.

Upon a selection to edit a product (416), the system 100 may display the information about an added product (e.g., the vendor name, the product name, the product type, and a risk level), as described in FIG. 3. The system 100 may also display the vendor's contact-information and/or a list of assigned collaborators.

The system 100 may provide a selection to allow the end-user to remove collaborators from specific products.

Upon a selection to edit a contract (420) associated with a product, the system 100 may display information relating to the contract, including the status of the contract (e.g., "in-term", "renewal negotiation", "auto-renew", "cancelled", "replaced", etc.), the contract files (which may include one or more files), the end-user that uploaded the contract, the upload date, the contract date, the contract expiration date, a list of products associated with the contract, and certain key clauses (e.g., whether the contract includes an auto-renewal clause, information relating to the number of days required for a non-renewal notice, and an auto-renewal period). The system 100 may also display information relating to the contract terms (e.g., sale price per unit, etc.), comments associated with the term (e.g., whether the contract is a service-level agreement (SLA)), the vendor signatory, the institution signatory, among others. The system 100 may provide a prompt to the end-user to edit or replace the contract.

In addition, the system 100 may take actions and set reminders. Example actions of the system 100 are summarized in Table 1.

TABLE 1

| Status | Description | Action | Email Communication |
| --- | --- | --- | --- |
| In Term | Contract has not reach expiration date | No action taken | Initiate communication six months from expiration date |
| Renewal negotiation | Financial Institution is working on a new contract terms | No action taken | Sent on the expiration date |
| Auto-Renew | Automatically renew terms of the contract based on the info entered when the contract was loaded | Change the contract expiration date based on the terms loaded in the upload contract form | Sent on the expiration date |
| Cancelled | Contract is no longer valid | All products/documents associated with the contract will also be in cancelled status and archived | Sent on the expiration date |
| Replace | Financial Institution replacing the existing contract with a new one | Move old contract to archives/new contract starts the upload contract process over | |

In addition, upon a selection to edit a contract, the system 100 may provide guidance to the end-user depending on the various selected options. For example, if the end-user specifies "renewal negotiation" (which indicates that the end-user is currently negotiating the contract with the vendor), the system 100 may provide a message that states: "By setting a contract to renewal-negotiation, you will no longer receive notices regarding contract expiration and/or auto-renewal. Change your status when you are ready. You can either upload your new contract or cancel your existing contract." The system 100 may also take action, such as to stop the sending of the contract expiration emails.

In another example, if the end-user specifies "auto-renew" (which indicates that the contract would auto-renew with the terms as originally provided), the system 100 may prompt the end-user for a new expiration date for the contract and a date for new reminders.

In yet another example, if the end-user specifies "cancelled" (which indicates that the contract has been canceled), the system 100 may notify the end-user that the system 100 will cancel all of the selected products, archive all of the uploaded documents, and archive all of the uploaded contracts. The system 100 may also prompt the end-user for new vendor information. The system 100 may also prompt the end-user to upload a new contract or document.

In yet another example, if the end-user specifies "replace contract" (which indicates that the end-user wishes to replace an existing contract with a new contract), the system 100 may prompt the end-user for new documents associated with the new contact. The system 100 may archive the old contract in an archived folder. The old contract may be accessible to the end-user at the document storage page 206. In some implementations, the system 100 may also sent the new document to the third-party 218 for analysis and preparation.

Still looking at FIG. 4, the vendor dashboard 204 may include features to assist the end-user in managing reminders and notes associated with the vendor product. For example, the vendor dashboard 204 may include an option to display all of the reminders (422) associated with a given vendor.

The vendor dashboard 204 may include an option to attach and view notes and correspondences (424) (e.g. electronic mail) associated with the vendor. In some implementations, the system 100 may present the information as a list that includes the dates that the note was created, a title for the note, a note type, a product name, an identifier of the end-user that created the note, a vendor name, a product name, and a note message. The list may be filed, sorted, or organized using the note title, the email information, or by the product information.

Document Storage

Figure 5:
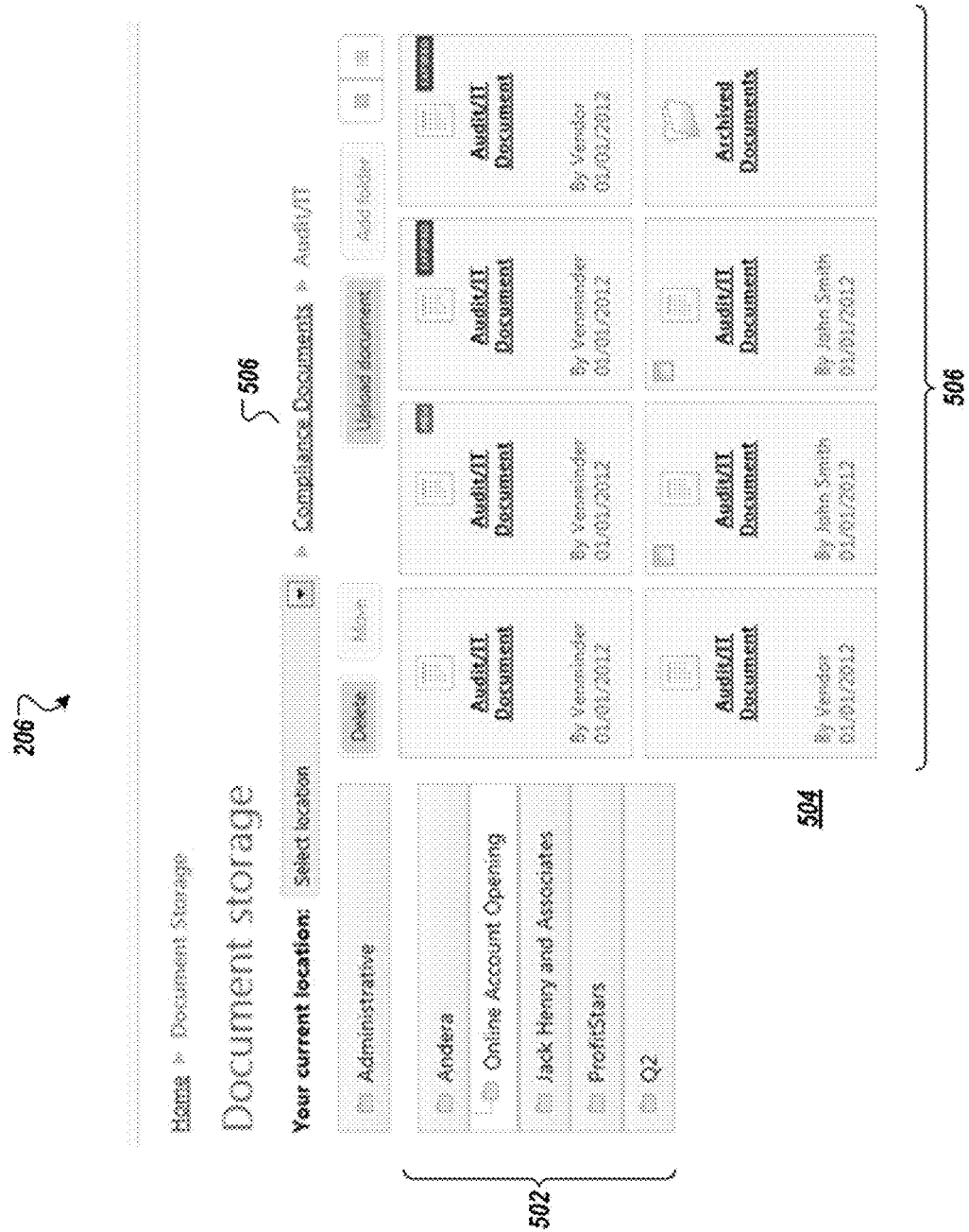
FIG. 5 is an example document storage page in accordance with an embodiment of the invention.

FIG. 5 is an example document storage page 206 in accordance with an embodiment of the invention. The document storage page 206 allows an end-user or product manager to view and manage documents associated with a given vendor.

In some implementations, the document storage page 206 may display a list of product managers 502 and the documents they are managing or collecting. The document storage page 206 may include a workspace 504 for managing and viewing a set of collected documents. The workspace 504 may allow the end-user to organize the set of documents in a set of vendor folders. The vendor folders may include documents and folders associated to a given vendor and vendor product.

In some implementations, the document storage page 206 may include a compliance document folder 506 to be used for the examination preparation effort. The compliance document folder 506 may include folders relating, for example, to "audit/IT", "business continuity", "financial", "insurance", "miscellaneous", "policy", and "product management."

Upon a selection to upload a new document, the document storage page 206 may prompt the end-user for a file to upload, a document description, a document date, comments, and/or reminders.

The document storage page 206 may restrict the transfer of files. In some implementations, once a document has been uploaded, for example, to the compliance document folder 506, the document storage page 206 may prohibit the end-user from moving these documents to a different folder. To this end, the system 100 may require the end-user to delete the file and re-upload the file to the different folder. In some implementations, the document storage page 206 prohibits the addition of new folders to the compliance document folder 506.

As another example, only documents uploaded by the end-user may be moved by the end-user. The document storage page 206 may indicate to the end-user the documents that they have permission to move. The document storage page 206 may indicate the owner of the document.

The document storage page 206 may label the various uploaded documents. For example, in some implementations, the document storage page 206 may label documents that have been newly uploaded by the third-party 218 or by the vendor as "new". The label may appear only during a first login session by the end-user, and the label may be removed in subsequent sessions. Other labels may include "expired."

Exam Preparation

Figure 6:
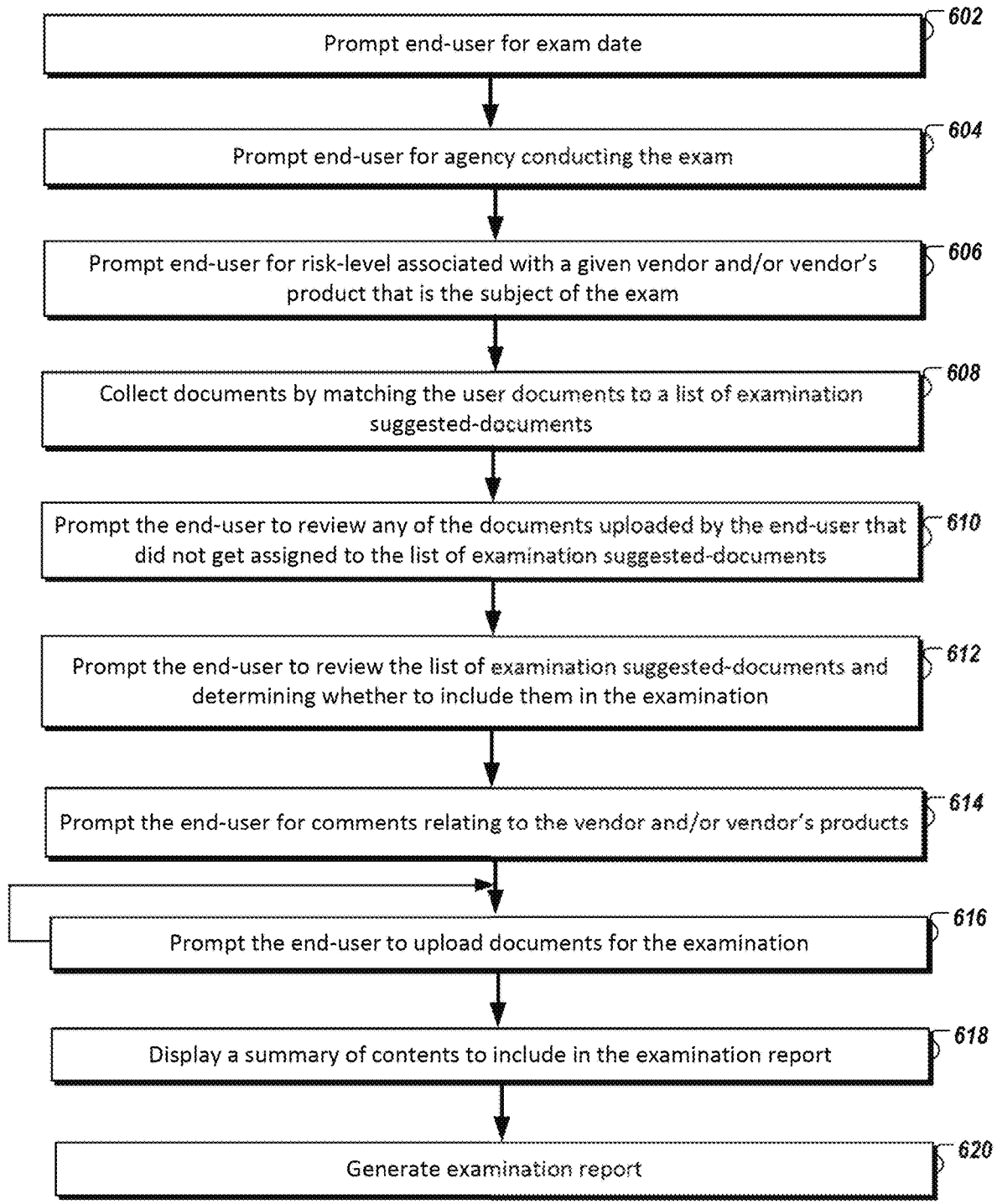
FIG. 6 is an example workflow of the system in guiding an end-user in preparing a vendor oversight report associated with one or more selected vendor products in accordance with an embodiment of the invention.

FIG. 6 is an example workflow of the system 100 to guide an end-user to prepare a vendor oversight report associated with one or more selected vendor products in accordance with an embodiment of the invention. The workflow may be referred to as "Exam Prep". The Exam Prep may be used to assist and guide the users of a financial institutions to prepare, for example, for its annual exam with a given government agency, regulatory body, or auditing process. In some implementations, the Exam Prep may collect all of the documents that will be the subject of the examination. The Exam Prep may collect all of the notes and correspondences associated with a product. The Exam Prep may allow the end-user to review all of these documents. The Exam Prep may allow end-users to invite experts and/or collaborators to assist with the exam preparation. The Exam Prep may create or generate a report for the examiners.

In some implementations, the Exam Prep workflow may be initiated from the main dashboard 202 or the vendor dashboard 204, as described in relation to FIGS. 3 and 4.

Upon initiation of the Exam Prep workflow, the system 100 may prompt the end-user for examination information, including, for example, a date of the next regulatory exam (step 602). The system 100 may use the provided date to track the number of days remaining until the examination and to determine when notification (e.g., by email) regarding the examination may be sent. In some implementations, the system 100 may send, for example, a reminder to an end-user that created the report (and/or the product manager) 90 days before the examination. The reminder may indicate to the end-user that the report is ready for the end-user's review. The system 100 may also send a reminder, when no report has been generated, to an end-user to remind them to start a report.

In the Exam Prep workflow, in some implementations, the system 100 may prompt the user for a list of one or more agencies to be included in the examination (step 604).

Examples of the agencies may include, for example, but not limited to, the Consumer Financial Protection Bureau (CFPB), Federal Deposit Insurance Corporation (FDIC), Federal Reserve System (FED), National Credit Union Administration (NCUA), and/or the Office of the Comptroller of the Currency (OCC).

In some implementations, the system 100 may also prompt the end-user for a risk-level (e.g., low, medium, high, and undefined/unknown) associated with the vendor and/or vendor product, if the information has not been provided, for which the examination is being prepared (step 606). The risk-level may be an input from the risk-assessment module 214. The system 100 may use the provided risk-level to determine suggested documents for the examination-preparation process.

Figure 7:
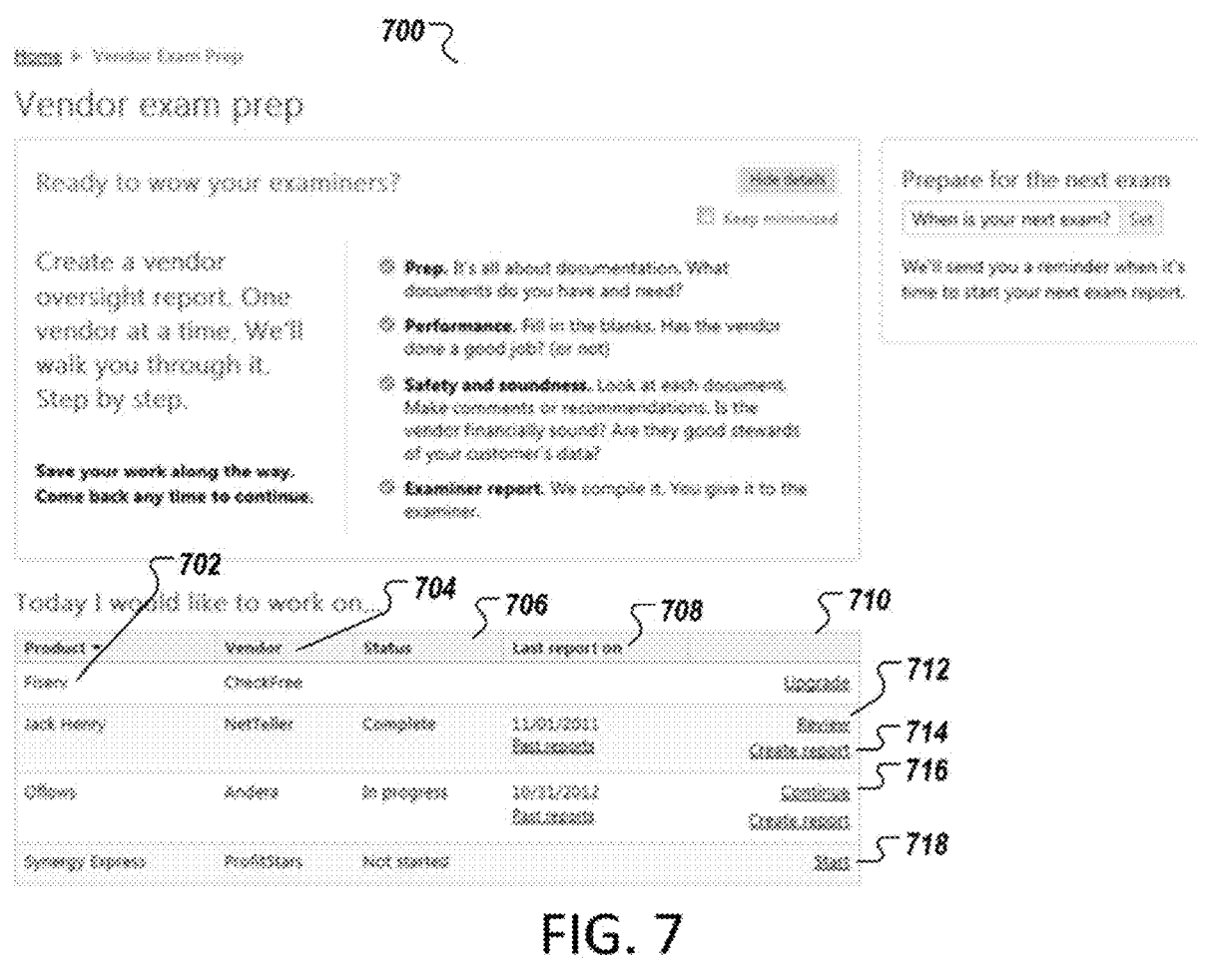

FIG. 7 is an example vendor examination-preparation workspace 700 in accordance with an embodiment of the invention. The workspace 700 may display a list of products 702. For each of the products 702, the workspace 700 may display the vendor name (704), the status of the examination (706), the last reported date (708), and actionable tasks 710.

The last reported date 708 may be, for example, the last time a report was created or the last time the product was examined. The status of the examination (706) may include "complete", "in progress", and "not started." A list of the examination status is shown in Table 2.

TABLE 2

| Status | Description | Action |
| --- | --- | --- |
| Complete | All steps have been completed | Review, Preview report |
| In progress | Started but not all steps completed | Continue, Preview report |
| Not started | No steps have been started | Start |

The actionable tasks 710 may include reviewing an examination report (712), creating a report (714), continuing a report (716), and starting a report (718).

The system 100 may save all of the work, including all of the actions taken by the end-user. To this end, the end-user can continue from another point in the examination preparation process.

Referring back to FIG. 6, in some implementations, the method 600 may include matching all of the end-user's uploaded documents to a list of examination suggested documents (step 608). The list of examination suggested documents may be a pre-defined list selected from a set of pre-defined list. The pre-defined list may be selected based on the risk-level associated with the given product or vendor subject to the examination.

Figure 8:
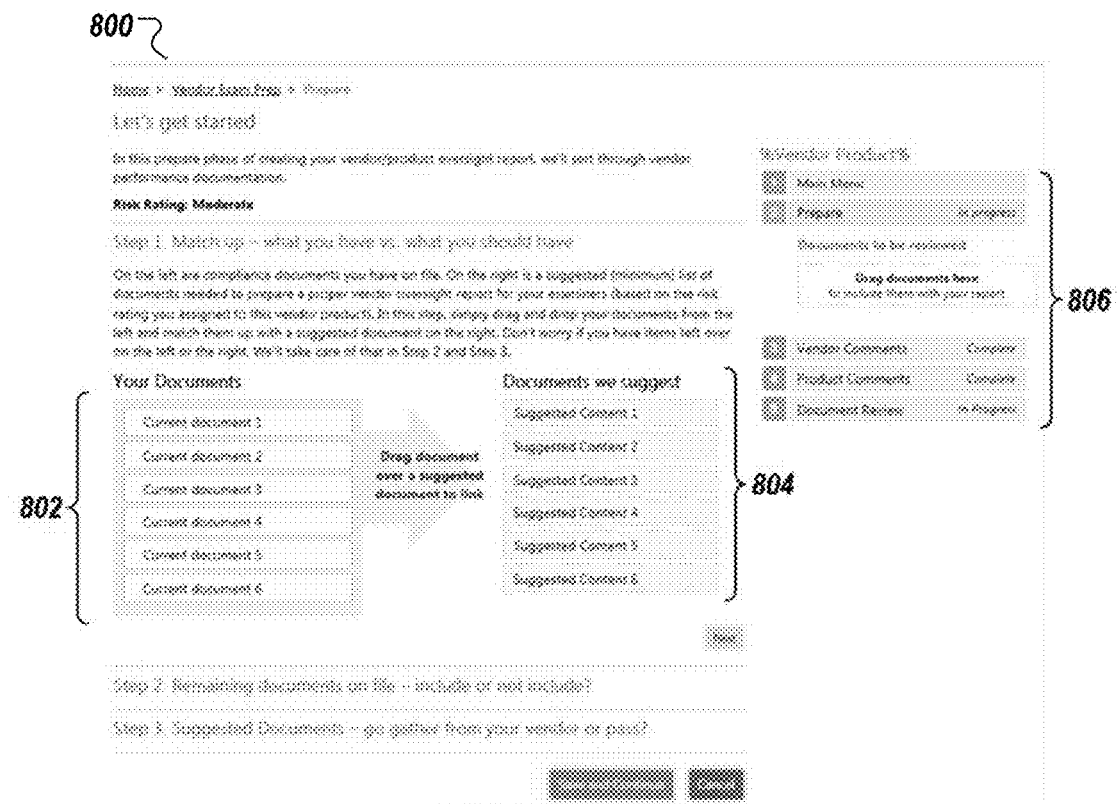
FIG. 8 is an example workspace for collecting documents by matching collected end-user's document to a list of suggested documents in accordance with an embodiment of the invention.

FIG. 8 is an example workspace 800 for matching collected end-user's document to a list of suggested documents in accordance with an embodiment of the invention. The workspace 800 may display a list of collected documents uploaded by the end-user (802). The list may include documents collected in the compliance document folder, as described in relation to FIG. 5. The workspace 800 may display a list of suggested documents (804) for the examination. The list of suggested documents (804) may be a pre-defined list of documents that is organized by risk levels. The workspace 800 may allow the end-user to select a document from the collected list (802) and "drag and drop" it to a suggested content in the list of suggested documents (804). The action may merely associate the documents in that no files are moved.

The system 100 may display a status of the workflow (806). The status may include an indicia of the current process being performed by the end-user and a status of the other processes (e.g., complete, in-profess, or ready to start) in the workflow.

Figure 9:
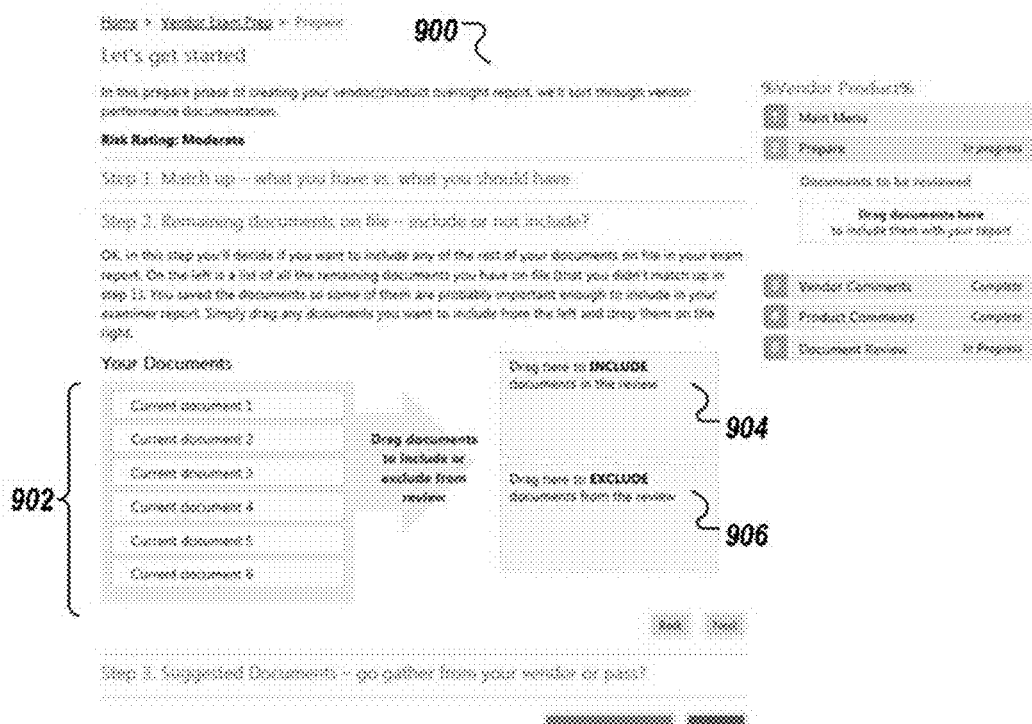
FIG. 9 is an example workspace for collecting documents by prompting the end user for selection of actions for unassigned documents that have been provided by the end user in accordance with an embodiment of the invention.

Referring back to FIG. 6, in some implementations, the method 600 may include prompting the end-user to review any of the collected documents uploaded by the end-user that was not assigned to the list of the examination suggested-documents (step 610). FIG. 9 is an example workspace 900 for prompting the end-user to review the unassigned documents 902 that has been collected to the document storage page 206, but has not been assigned in FIG. 8. In some implementations, the system 100 may prompt the end-user to identify each of the unassigned documents as either to include (904) or exclude (906) from the report/examination.

Figures 10, 11:
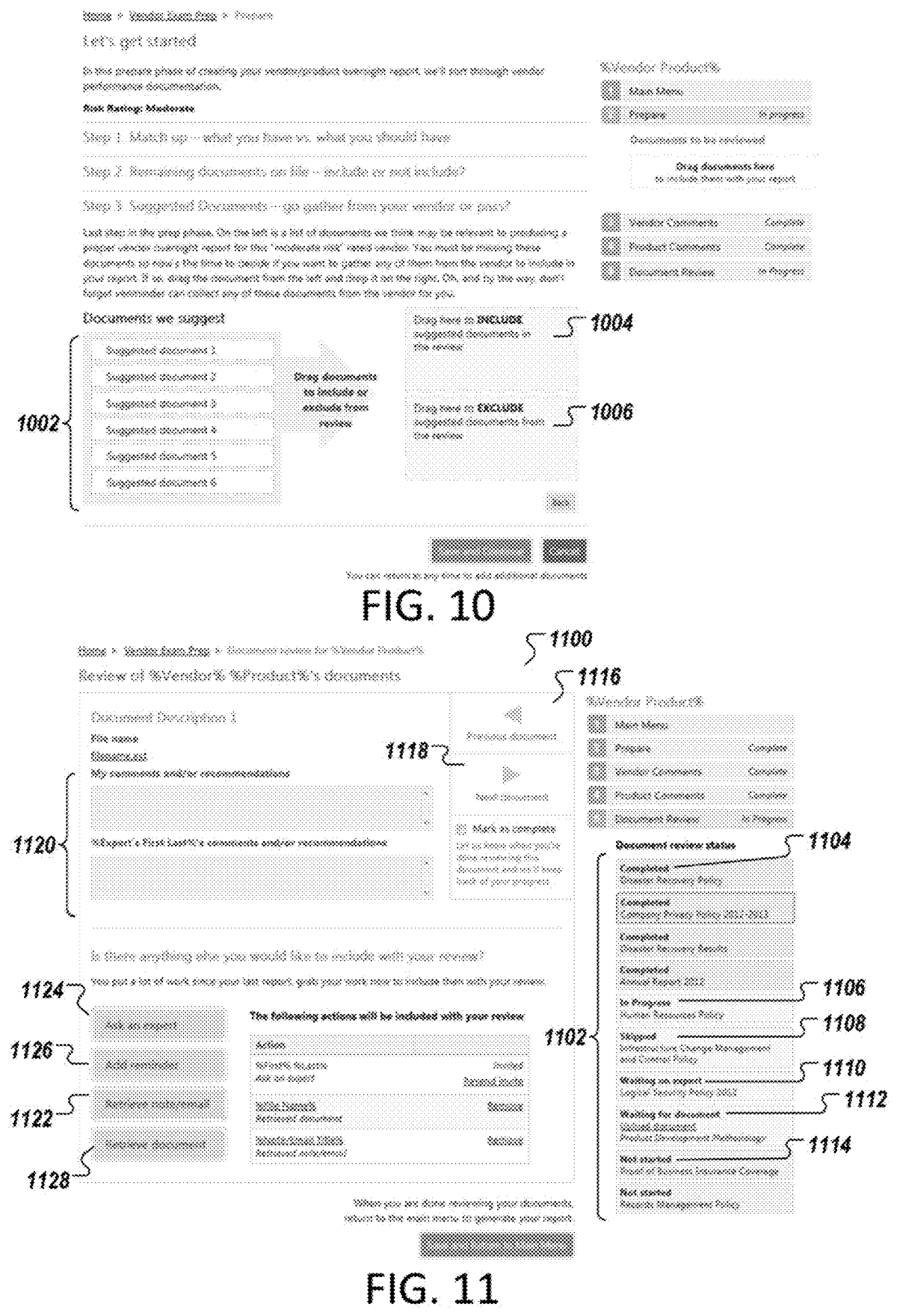

Still looking at FIG. 6, in some implementations, the method 600 may include prompting the end-user to review the list of examination suggested-documents and determining whether to include them in the examination (step 612). FIG. 10 is an example workspace 1000 for prompting the end-user to review the unassigned suggested documents 1002. The system 100 may prompt the end-user to identify each of the unassigned suggested documents as either to include (1004) or exclude (1006) from the report/examination.

Still looking at FIG. 6, in some implementations, the method 600 may include prompting the end-user to provide comments about the vendor (step 614). The comments may be in response to interrogatories, such as (i) "What has the vendor done well since your last exam date," (ii) "What has not gone well since your exam date," and (iii) "What actions are you going to take before your exam date." The system 100 may also prompt the user to provide comments for each of the vendor product that is being examined.

Still looking at FIG. 6, in some implementations, the method 600 may include displaying (step 614) all of the documents that has been matched between the end-user's uploaded documents and the list of suggested documents (as described in relation to FIG. 8) as well as those documents that are marked to include (as described in relation to FIGS. 9 and 10). FIG. 11 is an example workspace 1100 for preparing the collected document for the examination report in accordance with an embodiment of the invention. The system 100 may display a status label for each of the documents. The status label may include "completed" 1104, "in progress" 1106, "skipped" 1108, "waiting for experts" 1110, "waiting for documents" 1112, and "not started" 1114. The status labels are described in further detail in table 3.

TABLE 3

| Document Status-Label | Description |
| --- | --- |
| Not Started | Included in exam but the user has not reviewed it |
| Waiting on expert | Expert has been invited but no response provided |
| Waiting for documents | Document type is included in exam but document has not been uploaded |
| Skipped | Viewed the document but preformed no actions |
| In Progress | Actions preformed but not marked as complete |
| Complete | Checked the box mark as complete |

In some implementations, the system 100 may provide a navigation function to allow the end-user to scroll through the various selected documents. The navigation function may include an arrow to review the previous selected document (1116) or the next selected document (1118). For each of the selected documents, the system 100 may allow the end-user to add comments (1120), to retrieve an electronic correspondence or note (1122), to invite an expert and/or collaborator to provide comments or to assist in the document preparation (1124), and/or to set reminders (1126).

Upon selection to invite a co-worker/expert (1124), the system 100 may provide a list of co-workers and/or suggested experts for the user to send a message. The system 100 may also prompt the end-user for a name, contact information, and a message to send to a co-worker and/or expert. The system 100 may accept multiple requests for comments.

The system 100 may allow each of the co-workers and/or experts to register and login. After which, the system 100 may only allow the co-worker and/or expert to view and provide comments for the vendors and/or vendor product to which they were asked for comments. The system 100 may send a notification to the end-user subsequent to a comment being provided. The system 100 may also send a notification when the co-worker and/or expert has registered to the system 100.

Upon receipt of comments from a given co-worker and/or expert, the system 100 may label the request as being complete. The system 100 may also update the Exam Prep workspace 1100 with the received solicited comments. To this end, the system 100 may provide an organized and efficient framework to request for comments from internal and external collaborators, to track such requests, and to review and utilize such comments in the examination-preparation process.

Upon selection of an input to retrieve an electronic correspondence or note (1122), the system 100 may display a list of notes and correspondences stored within the system 100. The system 100 may provide a date, a title, a correspondence type (e.g., email, notes, SMS, etc.), and an identity of the end-user and/or product manager that performed the uploaded. The system 100 may allow the end-user to filter the list based on the correspondence type.

Still looking at FIG. 11, the system 100 may allow the end-user to retrieve additional documents (1128) related to the vendor product. A selection of this input (1128) may direct the end-user to the document storage page 206, as described and shown in relation to FIG. 5. The end-user may add documents to the examination preparation process from there.

Referring back to FIG. 6, in some implementations, the method 600 may include prompting the end-user to upload documents for the examination (step 616). FIG. 12 is an example workspace 1200 for uploading document to be attached and included in the examination in accordance with an embodiment of the invention. The workspace 1200 may display the vendor product name 1202 and the document type 1204. The workspace 1200 may prompt the end-user for a file (1206), a document description (1208), an expiration date (1210), and a selection to use the document for other products (1212). The selection (1212) allows the end-user to have to upload a given document only once as the document can be applied to multiple products that may be the subject of one or more examinations. The workspace 1200 also allows the end-user to tailor comments and descriptions for each of the documents to be included in the report.

Figures 13, 14:
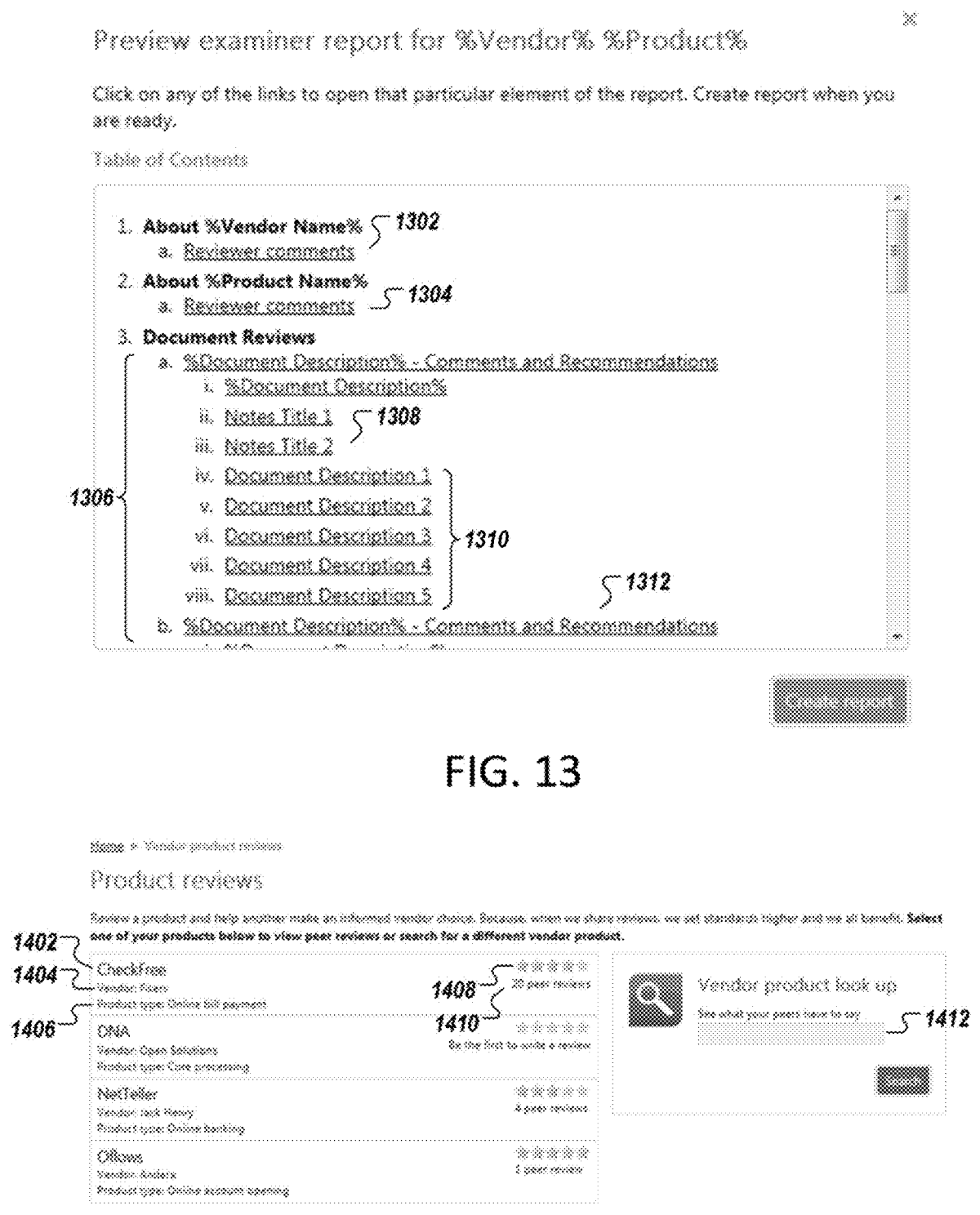

Still looking at FIG. 6, in some implementations, the method 600 may include displaying a summary of contents to include in the examination report (step 618). FIG. 13 is an example workspace 1300 to preview contents to be included in the examination report. The contents may include, for example, but not limited to, the reviewer's comments about the vendor (1302), the reviewer's comments about the products (1304), and the documents to include in the report (1306). The documents 1306 may include notes (1308), documents (1310), and comments and recommendations (1312). The system 100 may allow the end-user to preview any of the uploaded documents, comments, and notes as collected by the system 100.

Still looking at FIG. 6, in some implementations, the method 600 may include generating an examination report in accordance with an embodiment of the invention (step 620). The report may be generated, for example, as a PDF ("portable document format") file. In some implementations, the report may be generated as a compressed file (e.g., a ZIP (archive file format) file). Upon a creation of the examination report, the system 100 may add the report to an archive section to which the end-user can later review the report. The system 100 may also update the vendor and product dashboard to indicate the recent addition of a new report as well as the status of the last instance that a report had been created. In some implementations, the system 100 may send a notification to the end-user to recommend initiating a new report (in the case of an annual report). The notification may be sent, for example, 9 months after the examination report has been generated.

Vendor Product Review

The system 100 may include a vendor product review workspace to allow the end-user to view and provide reviews/ratings for a given vendor, as described in relation to FIG. 3. In some implementations, the system 100 may display the performance rating and/or the listing of one or more performance comments received from users of the given vendor product and/or one or more corresponding products provided by one or more different vendors.

FIG. 14 is an example workspace 1400 to review vendor products in accordance with an embodiment of the invention. The workspace 1400 may display, at any given instance, a composite of multiple vendor products. The composite may include preferably four to five vendor products. Of course, any of number of vendor products may be displayed on the workspace 1400. For each of the products, the workspace 1400 may display the vendor name (1402), the product (1404), the product type (1406), a rating value 1408, and an indication of the number of reviews (1410). In some implementations, the system 100 may provide a search tool 1412. In some implementations, the system 100 may also provide a rating/review module for a given vendor.

Figure 15:
FIG. 15 is an example display for viewing product review in accordance with an embodiment of the invention.

FIG. 15 is an example display 1500 for viewing product reviews in accordance with an embodiment of the invention. In some implementations, the system 100 may provide a prompt 1502 for the end-user to send a private message to the vendor or to the reviewer. The system 100 may also provide a prompt 1504 to flag the review as being inappropriate. The flag may generate a notification to a designated reviewer to determine whether the message is appropriate to display. The system 100 may also display an indicator of the number of people that flagged the review as being helpful and/or unhelpful.

The system 100 may prompt the end-user to provide a review 1508 for a given selected product. The end-user may provide a rating value 1510 (which may a star rating), comments, and identifier/contact information.

In some implementations, the display 1500 may include a listing of performance ratings (1512) received from various end-users and/or product managers of the various vendor products. The listing may be organized (e.g., ordered) on the graphical user interface according to popularity (e.g., number of "likes" received for each of the performance comments).

News and Alerts

The system 100 may include an alert and/or information feed that provides information about changes that have been made (e.g., new documents uploaded, new reviews added, and status updates for a given examination or preparation process, etc.). The alert may include a progress bar to indicate a given end-user progress with a given task.

Figure 16:
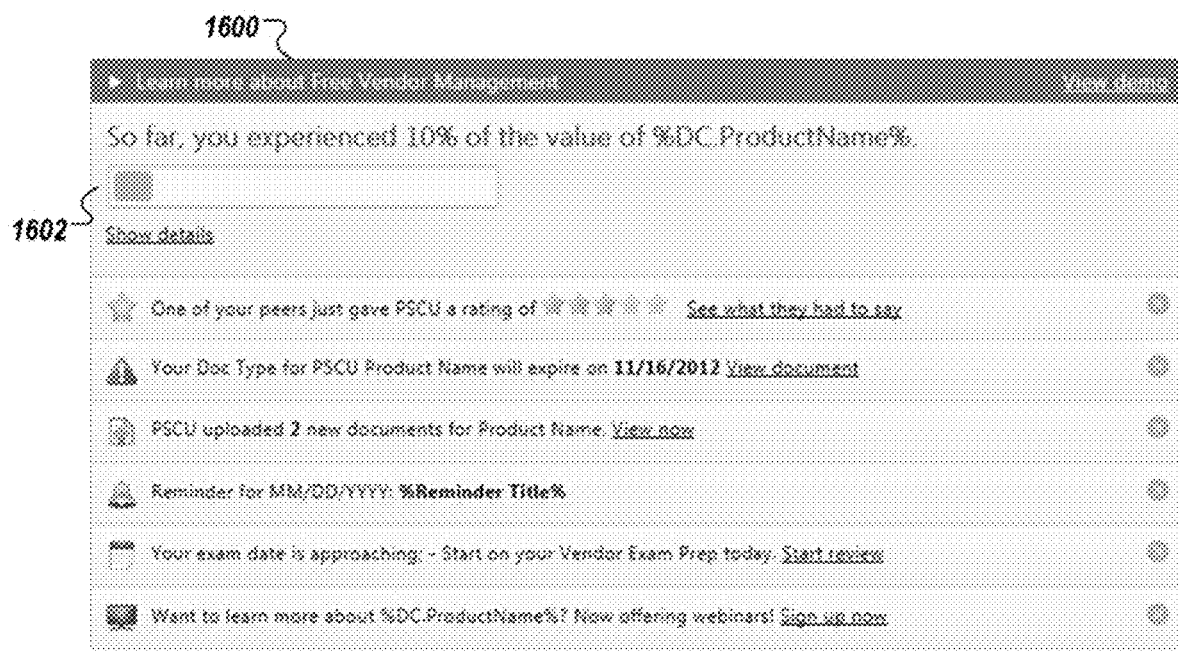
FIG. 16 is an example alert and information display in accordance with an embodiment of the invention.

FIG. 16 is an example alert and information display 1600 in accordance with an embodiment of the invention. The display 1600 may include an experience bar 1602 that shows a given user's level of experience with the system 100. The system 100 may calculate the experience bar based on a set of tasks or functions performed by the end-user within the system 100. Each function may be assigned a function value, which may be aggregated to produce a total experience value. The experience bar 1602 may display the total experience value to the user. Examples of assigned values for a set of functions are provided in Table 4.

TABLE 4

| Function | Link | Percentage |
|---|---|---|
| Add Contract | Upload Contract | 10% |
| Add 2 Compliance Documents | Document Storage | 5% each |
| Add a vendor product | Add Vendor Product | 10% |
| Add a collaborator | Vendor Dashboard | 10% |
| Attach an email and Note | Emails and Notes | 5% each |
| Add a reminder | Reminders | 10% |
| Preform Exam Prep | Exam Prep | 20% |
| Write a review | Vendor Product Review | 10% |

Risk Assessment Module

In another aspect of an embodiment, the system 100 provides a risk-assessment module 214 that may allow the end-user to rate the vendor products and/or vendors in the areas of Information Access, Operational and Financial Dependency and Regulatory Exposure. To this end, the system 100 may provide a graphical user interface configured to display one or more prompts for user entries associated with a risk assessment of a given vendor product where the user entry are in response to a set of questionnaires.

Figure 17:
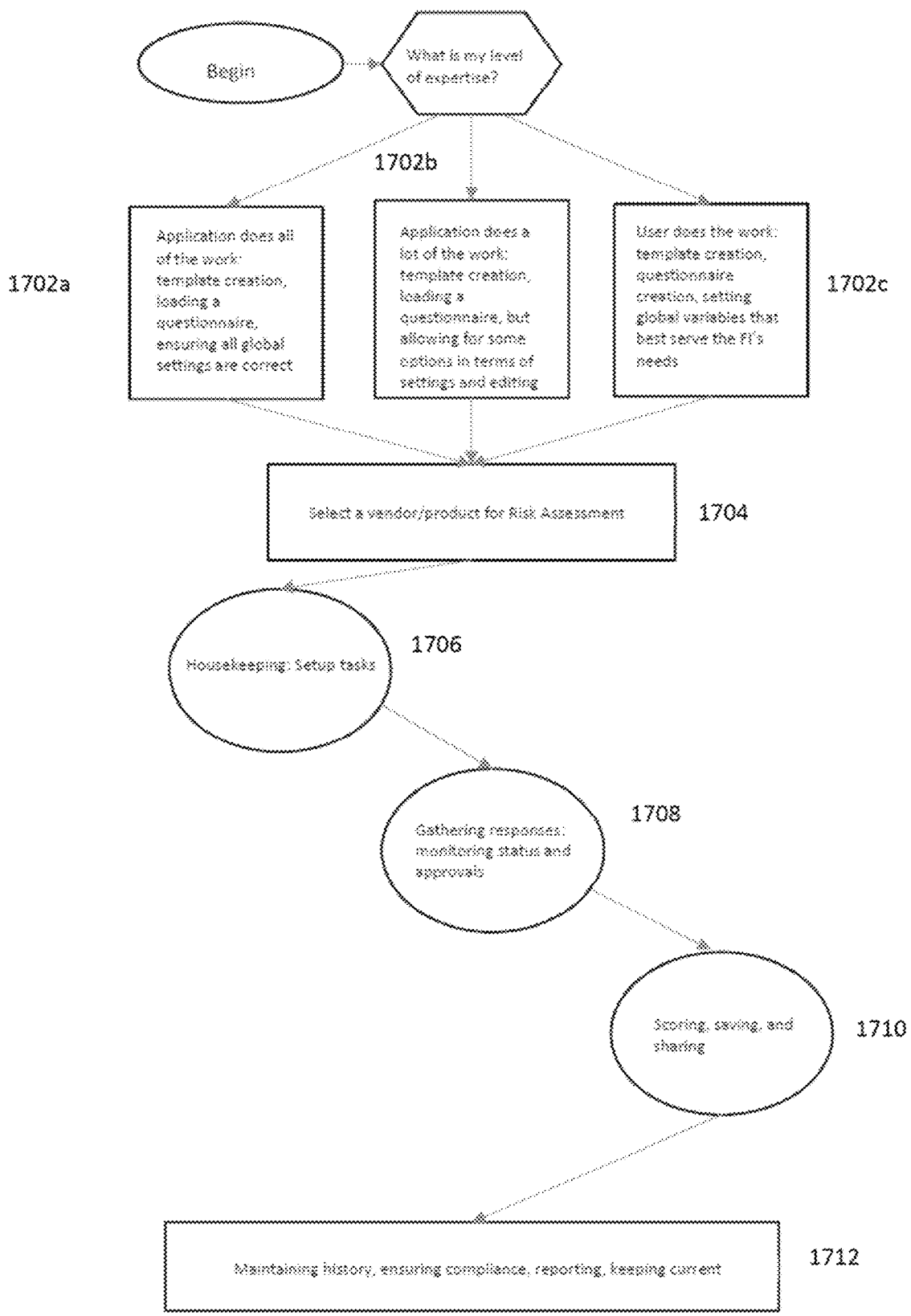
FIG. 17 is an example workflow of the system to guide a user to conduct a risk assessment associated with one or more vendors or products in accordance with an embodiment of the invention.

In certain embodiments, a web-based system allows for user-friendly, step-by-step preparation of vendor-specific risk assessment reports using a template and a questionnaire. FIG. 17 depicts an example workflow of the system to guide a user at a financial institution to conduct a risk assessment associated with one or more vendors or products in accordance with an embodiment of the invention. Prior to beginning a risk assessment, a user at a FI interacts with an onboarding module to select one of various operating paths 1702a-c, e.g., selected based on the user's expertise. The most basic path 1702a automates the substantial majority of the Risk Assessment process (such as the selection of templates, questionnaires, and settings), while the most advanced path 1702c allows the user complete control over creation of the template, questionnaires, and settings used to conduct the risk assessment. In certain embodiments, following interaction with the onboarding module, a template is created which specifies a set of global variables that apply to all the questionnaires created by the FI. In certain embodiments, the template further specifies rules for determining a final risk score, such as, for example, section weighting, question weighting, or other score settings. Once the template has been built, one or more questionnaires may be created and saved. Based on the onboarding path selected by the user, the questionnaire may be preloaded by the application, may be created based on sample questionnaires provided by the application, or may be created by the user based on the outline contained in the template. In any case, the questionnaire is fully editable by the user. Once at least one questionnaire has been created and saved, a risk assessment may be performed for a vendor or product. The user can identify a vendor or product for assessment (step 1704), and select a questionnaire from a list of available saved questionnaires. One or more contributors, referring to individuals or entities that complete part or all of the selected questionnaire, for the risk assessment are identified. In certain embodiments, some contributors can be identified as optional contributors (e.g., they may contribute) and others as mandatory contributors (i.e., they must contribute). Contributors are invited to respond to part or all of the selected questionnaire, and the user may view these responses (step 1708). In some embodiments, interested parties in the risk assessment process are identified and are kept up-to-date with call-to-action or reminder notifications that are triggered by specific events, such as being invited to act as a contributor or having an assessment waiting for approval. Such notifications may be in the form of emails, or may take other forms.

Following response to the questionnaire by the one or more contributors, a two-part risk assessment is carried out which evaluates inherent risk as well as residual risk. Finally, a final risk score is calculated (step 1710) based on the determined inherent risk and residual risk, as well as on the rules specified in the template. In some embodiments, one or more approvers must review the assessments and may approve or reject an assessment and provide commentary to support their decision. In these embodiments, a risk assessment is not complete until it is approved by the approvers, and rejection of an assessment may either generate a new risk assessment, or the user may revise and resubmit their current assessment based upon the approver's comments. Once complete, a risk assessment becomes part of a vendor's overall documentation and is stored in a Risk Assessment history location (step 1712). Users may refer to completed risk assessments, may use them as documentation to support other processes, may download them, and may share them with others. In certain embodiments, "old format" risk assessments, referring to assessments completed prior to deployment of the new system, are converted and stored alongside risk assessments completed after deployment of the new system.

Figure 18:
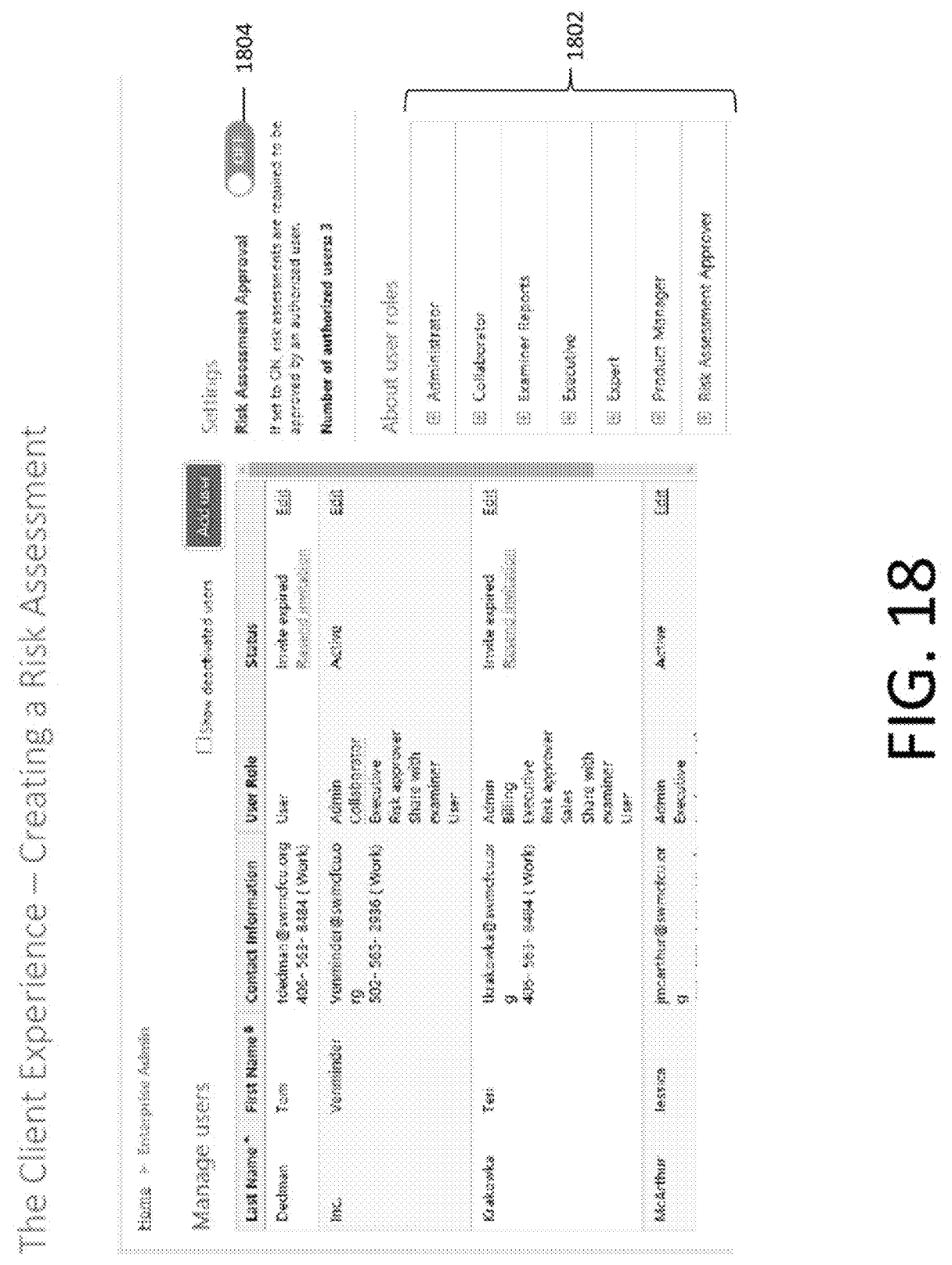

In some embodiments, a user (e.g., a client) may start with creating one or more risk assessment templates and/or questionnaires, e.g., as described herein. FIG. 18 depicts an example user-management workspace to manage users in accordance with an embodiment of the invention. The workspace may display a list comprising a plurality of users, who may be either individuals or entities. For each user, the workspace may display a plurality of information associated with each user such as contact information, user role, and status. Users may be assigned a role from a plurality of roles 1802. In certain embodiments, the workspace comprises a Risk Assessment approval flag 1804 which can be set to values of "on" or "off," (e.g., by an Enterprise Admin). Setting the approval flag to a value of "on" requires that all Risk Assessments generated must be approved by a user who possesses sufficient authority by virtue of their assigned user role.

Figure 19:
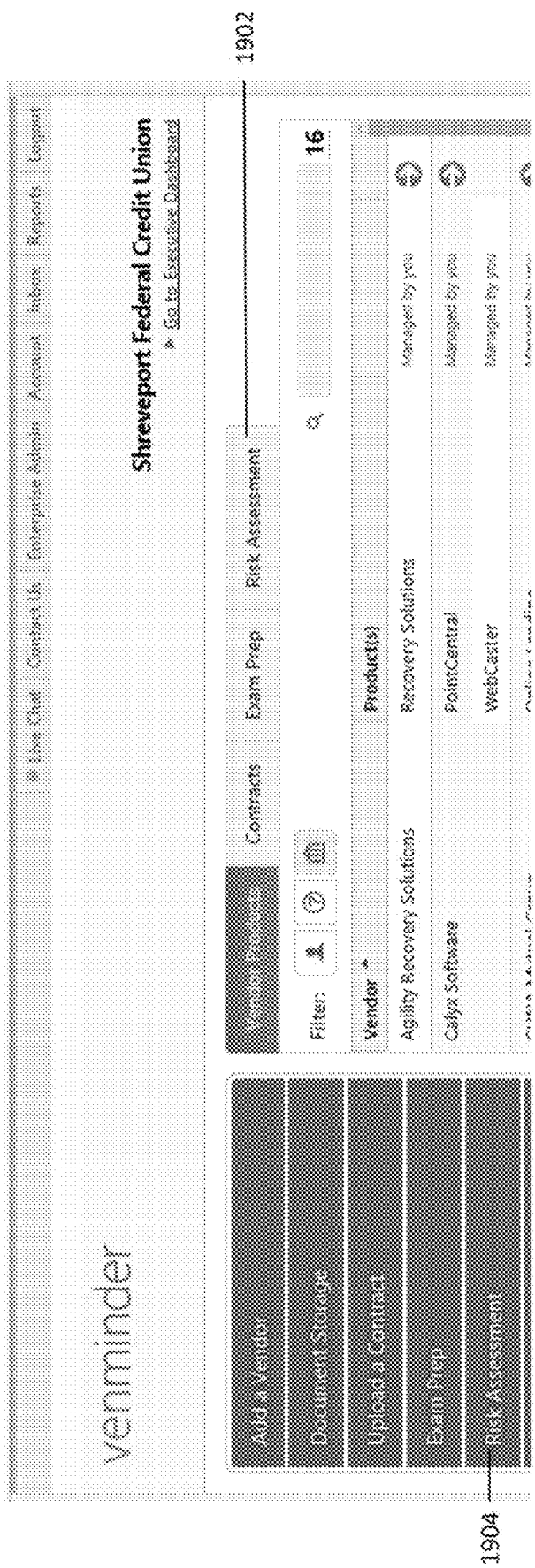
FIG. 19 is an example navigation page which allows a user at a financial institute to access a plurality of modules of a software suite in accordance with an embodiment of the invention.

FIG. 19 depicts an example navigation page which allows a user (e.g., at a financial institute) to access a plurality of modules of a software suite in accordance with an embodiment of the invention. In the depicted embodiment, a user can access the Risk Assessment Module by selecting either the Risk Assessment tab 1902 from the Main Dashboard or by selecting the Risk Assessment menu item 1904 from the plurality of available modules. In certain embodiments, the Risk Assessment module is only available to certain users (e.g., only available to enterprise users or users assigned a specific role) and not available to other users.

Figure 20:
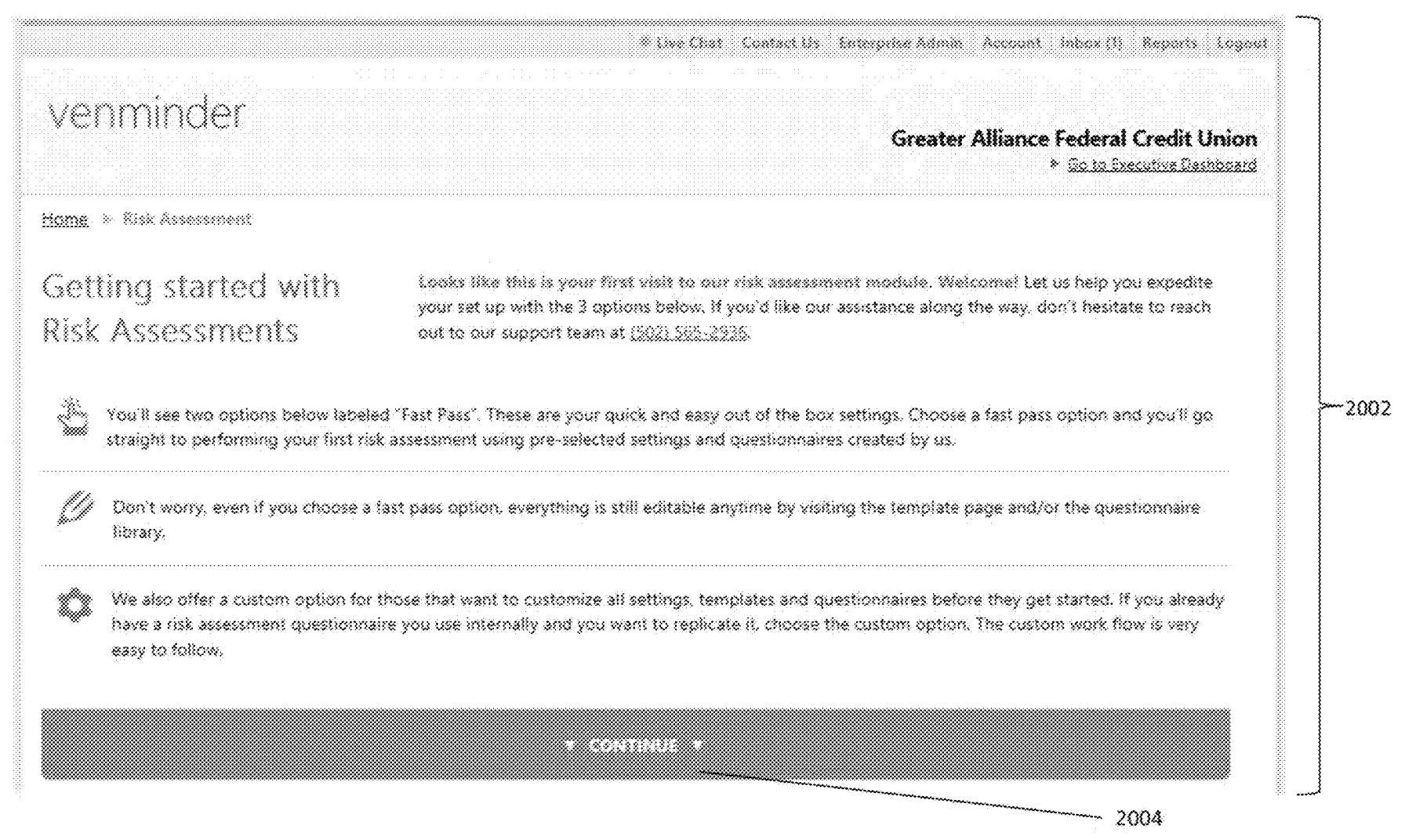

FIG. 20 is an example onboarding welcome page in accordance with an embodiment of the invention. In certain embodiments of the invention, the onboarding welcome page is the first page presented to the user upon initial access to the Risk Assessment module. The onboarding welcome page presents the user with introductory text 2002 describing how to navigate through the onboarding process. In certain embodiments, the actual onboarding module can be accessed by user selection of a "continue" bar 2004 which will allow the user to input more granular information about their setup. Without wishing to be bound by theory, use of an onboarding welcome page is designed to enhance the user experience by decluttering the options available to a user upon first-time exposure to the Risk Assessment module.

Figure 21:
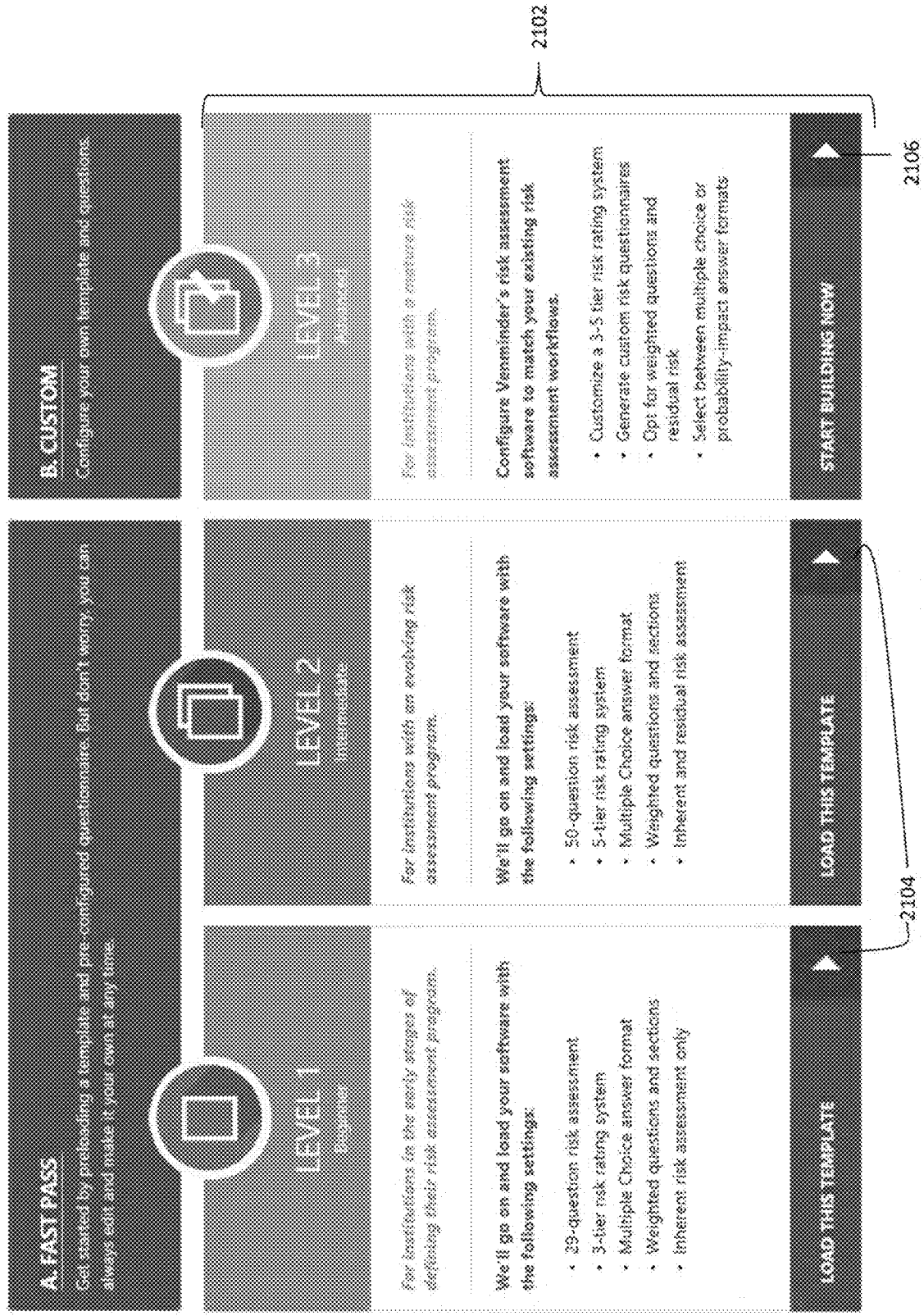
FIG. 21 is an example onboarding page used as part of an onboarding module in accordance with an embodiment of the invention.

FIG. 21 is an example onboarding page used as part of an onboarding module in accordance with an embodiment of the invention. In certain embodiments, prior to beginning a risk assessment, a user interacts with the onboarding module to select one of various operating paths or modules 2102. The most basic path (e.g., "Level 1," "Level 2") can automate the substantial majority of Risk Assessment setup work (such as the selection of templates, questionnaires, and global settings), while the most advanced path (e.g., "Level 3") allows the user to manually complete the setup work. In certain embodiments, setup work can be automated by loading a preset template, preloading a questionnaire, or (auto-)determining global settings. In certain embodiments, some operating paths may be classified as "Fast Passes," which can be accessed by clicking buttons 2104, and others may be classified as "Custom" which can be accessed by clicking button 2106. The "Fast Pass" classification is used to indicate operating paths in which most of the setup work is automated by the software suite (e.g., templates are preloaded). The "Custom" classification is used to indicate operating paths which allow a user to manually carry out the setup work (e.g., templates are built from scratch). In any of the operating paths, the user may, at any time, edit some or all of the template, questionnaire, or Risk Assessment settings, including those which were preloaded or preset.

Figure 22:
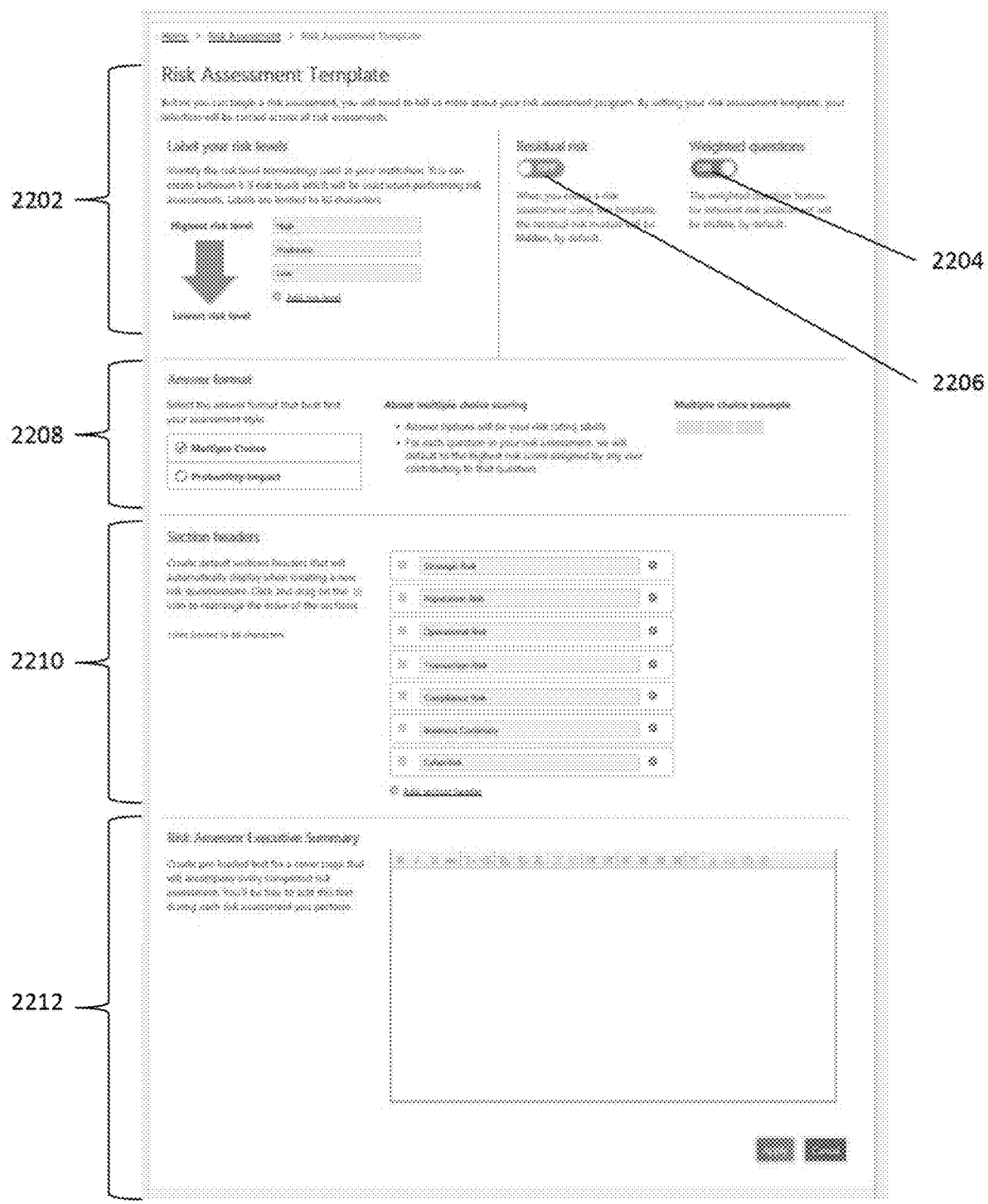
FIG. 22 is an example template management workspace to build or edit a template for a Risk Assessment in accordance with an embodiment of the invention.

FIG. 22 is an example template management workspace to build, set up, or edit a template for a Risk Assessment in accordance with an embodiment of the invention. Users who selected either Level 1 or Level 2 operating paths will have a template preloaded for them, while users who selected Level 3 may create their own template. Template settings can include risk levels (e.g., from three to five levels), inclusion/exclusion of residual risk, the ability to add weighted values to questions, determination of answer format, inclusion/exclusion of standard section headings and the ability to create new ones, and the entering of standard text for an Executive Summary. In some embodiments, each of these elements can be included in every subsequent questionnaire that is created for this FI as long as this template remains in force. In some embodiments, templates may be edited. In some embodiments, if there is at least one questionnaire in progress, the template cannot be altered. Completed questionnaires can retain the original template's format. Any or all subsequent new questionnaires can be built using an updated template.

In some embodiments, when toggling between different answer formats, the description and example of how the format will be visually represented within the questionnaire will change as appropriate.

In certain embodiments, the template management workspace comprises a Risk Level interface 2202 which allows the user to precisely specify the number and terminology used to refer to Risk Levels (e.g., from three to five levels) in a Risk Assessment. In certain embodiments, the template management workspace comprises configurable flags which control behavior of the Risk Assessment module. For example, a template management workspace may include a Residual Risk flag 2206 which, when turned "off", will hide by default the residual risk module for Risk Assessments created using the given template. The template management workspace may also include a weighted question flag 2204 which, when "on", causes the weighted question feature for inherent risk assessment to be visible by default for Risk Assessments created using the given template. In certain embodiments, the template management workspace comprises an Answer Format interface 2208. The user may use the Answer Format interface 2208 to specify the format that best fits the assessment style. Possible answer formats include multiple-choice, probability-impact, or other formats. In certain embodiments, the template management workspace 2202 comprises a Section Header interface 2210. The Section Header interface 2210 allows users to specify which section headings will automatically display when creating a new Risk Assessment questionnaire using the given template. The user may select from standard section headings or may create new ones. In certain embodiments, the template management workspace comprises a Risk Assessor Executive Summary interface 2212 which allows a user to create pre-loaded text for a cover page that will accompany every Risk Assessment created using the given template.

In some embodiments, after a given template is created by a user at an FI using the template management workspace, every subsequent Risk Assessment questionnaire that is created by a user at the FI will include the elements specified in the given template. In certain embodiments, templates may be edited. In certain embodiments, as long as there is at least one Risk Assessment created with the given template that is not yet marked "complete," the user will not be able to edit the template. In certain embodiments, updating the template will cause future Risk Assessment questionnaires to utilize the update template; however, Risk Assessments completed using the previous template will retain the previous template's format.

Figure 23:
FIG. 23 is an example save template confirmation prompt in accordance with an embodiment of the invention.

FIG. 23 is an example save template confirmation prompt in accordance with an embodiment of the invention. In some embodiments, when changes have been made to a risk assessment template and the user selects 'Apply', the above confirmation modal will appear. The save template confirmation prompt allows the user to confirm whether they wish to proceed with changes made to a template or they wish to cancel the changes made to the template.

Figure 24:
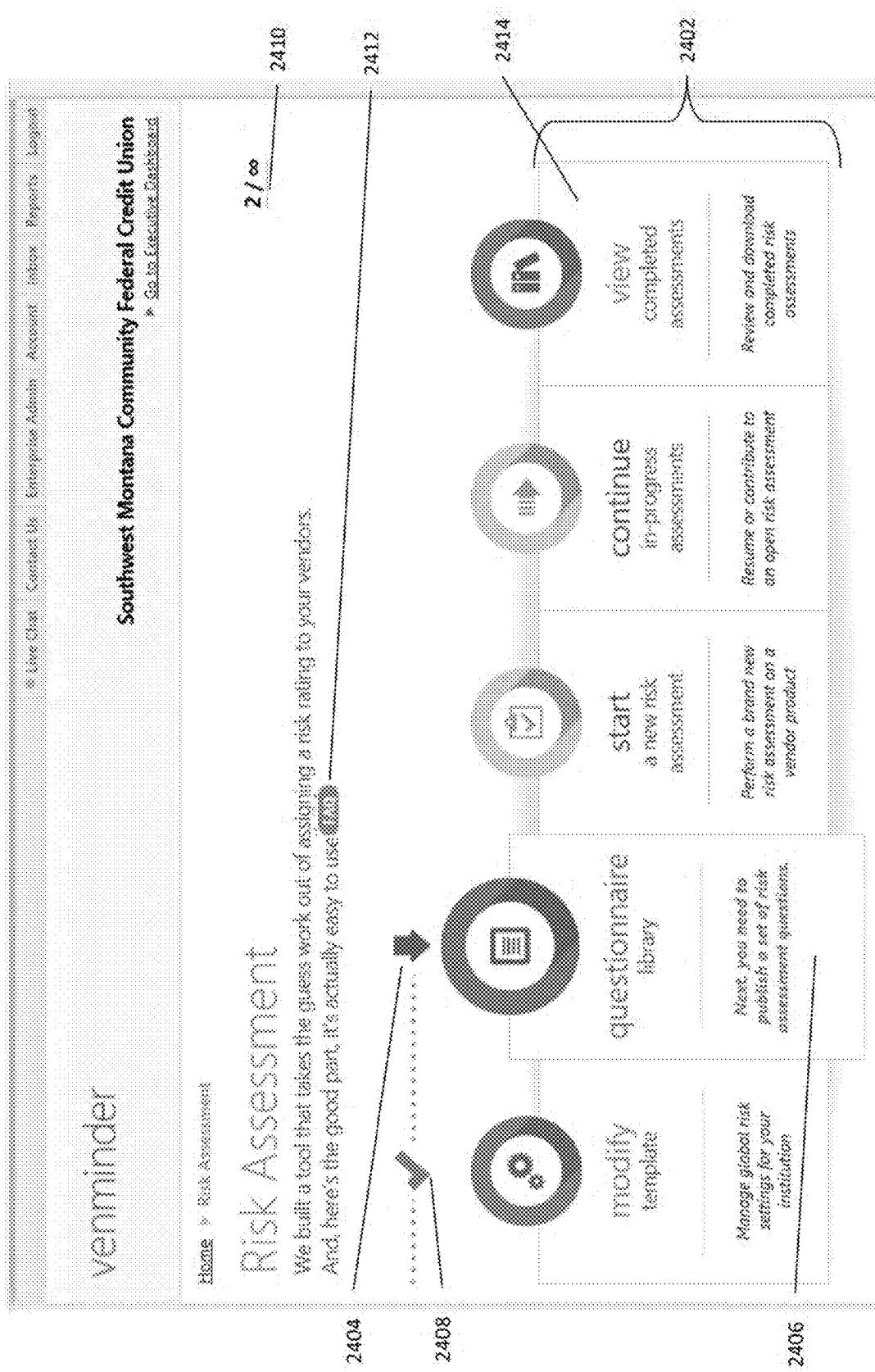
FIG. 24 is an example Risk Assessment Home page in accordance with an embodiment of the invention.

FIG. 24 is an example Risk Assessment Home page in accordance with an embodiment of the invention. In certain embodiments, the Risk Assessment Home page displays a GUI to access (i) a template management module (e.g., modify template module) for managing questionnaire templates; (ii) a questionnaire management module (e.g., questionnaire library module) for managing questionnaires; (iii)

a start risk assessment module for performing a new risk assessment; (iii) a continue risk assessment module for continuing an existing risk assessment; and/or (iv) a assessment viewing module for managing completed assessments. In certain embodiments, the Risk Assessment Home page will be presented to the user following creation, build, edit, and/or update of the template. The Risk Assessment Home page reflects the client's experience through the process of performing a Risk Assessment. Steps of the Risk Assessment process are shown as a series of tiles 2402. As each step in the Risk Assessment process is completed, each subsequent tile to the right becomes active (e.g., colored or lighted) and the working on each tile changes. In an exemplary embodiment, e.g., as shown in FIG. 24, the user has not yet completed a risk questionnaire, accessible through tile 2406, and is being directed to do so by the enlarged tile and the arrow above it 2404. Completed steps may be marked as complete with a checkmark 2408. In one embodiment, e.g., as shown in FIG. 24, the tile can read 'modify' the template, and not 'create'. The selection of a preload option (Level 1 or Level 2) can mean that a template has already been created for a user by the system. In one embodiment, the tile can read 'create' the template, and not 'modify.'

In certain embodiments, the software suite may make available only a limited number of Risk Assessments to the user. For example, a user may purchase only a certain number of risk assessments. The Risk Assessment Home page may display the number of risk assessments completed and the number of risk assessments purchased or otherwise available, e.g., through counter 2410. In certain embodiments, the Risk Assessment Home page includes a link to frequently asked questions (FAQ) 2412. In certain embodiments, users who have availed themselves of a previous Risk Assessment process may have completed assessments in "old" formats. Completed assessments in "old" formats may undergo a conversion process that render the assessment available for view/download by selecting the view completed assignments tile 2414. In some embodiments, the final tile will only become active after an assessment has been marked as complete.

FIG. 25 is an example FAQ modal window in accordance with an embodiment of the invention. In certain embodiments, the FAQ modal window is updated as more users avail themselves of the Risk Assessment module. In certain embodiments, the FAQ modal window is scrollable if the content of the FAQs exceeds the current page length. In certain embodiments, the FAQ modal window is a fixed-height window.

Figure 26:
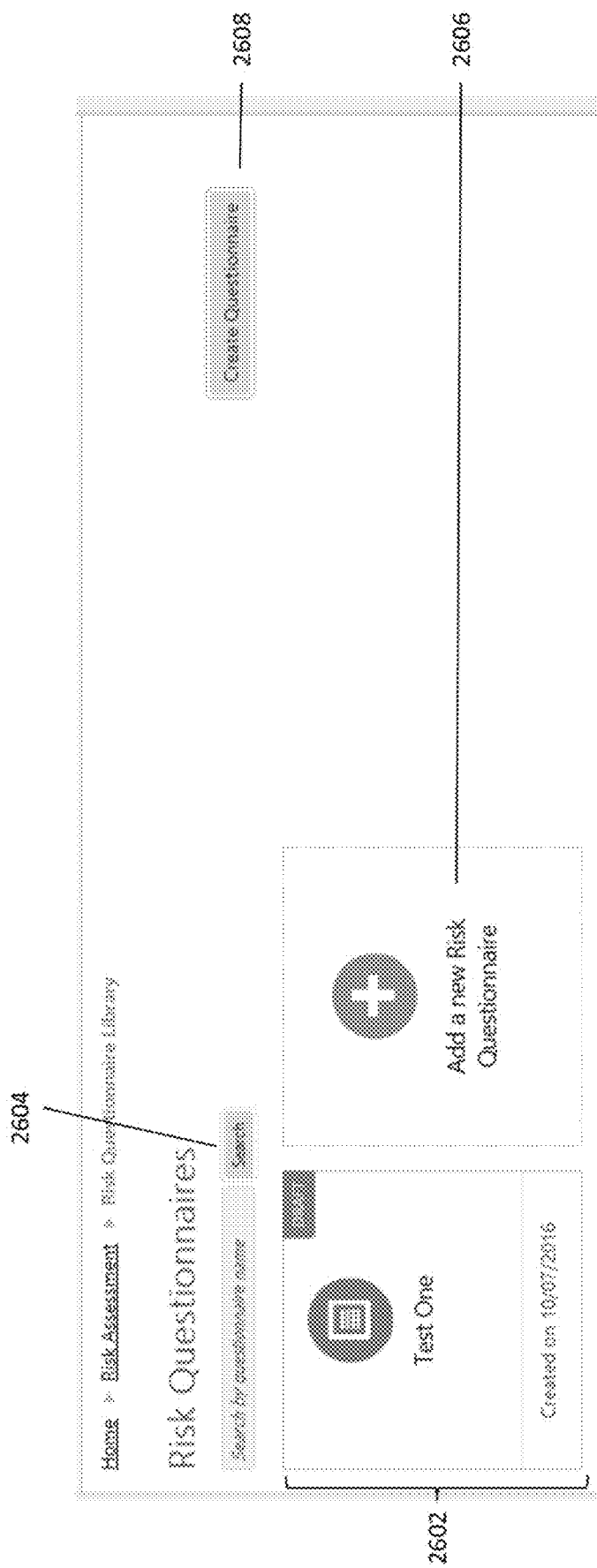
FIG. 26 is an example questionnaire library in accordance with an embodiment of the invention.

FIG. 26 is an example questionnaire library in accordance with an embodiment of the invention. In an exemplary embodiment, all existing questionnaires are displayed as named tiles 2602. Moving a pointing a device over any existing questionnaire tile will "flip" the tile to reveal information associated with the questionnaire, such as creator name, date, last date of use (if it has been used), and/or further options, including options to edit, delete, clone, or view the questionnaire. In certain embodiments, a search bar and button 2604 are provided, e.g., in the event that there are too many questionnaires to be visible on a single page. In certain embodiments, new questionnaires may be created by either clicking the "add a new risk questionnaire" tile 2606 or clicking a button 2608.

Figure 27:
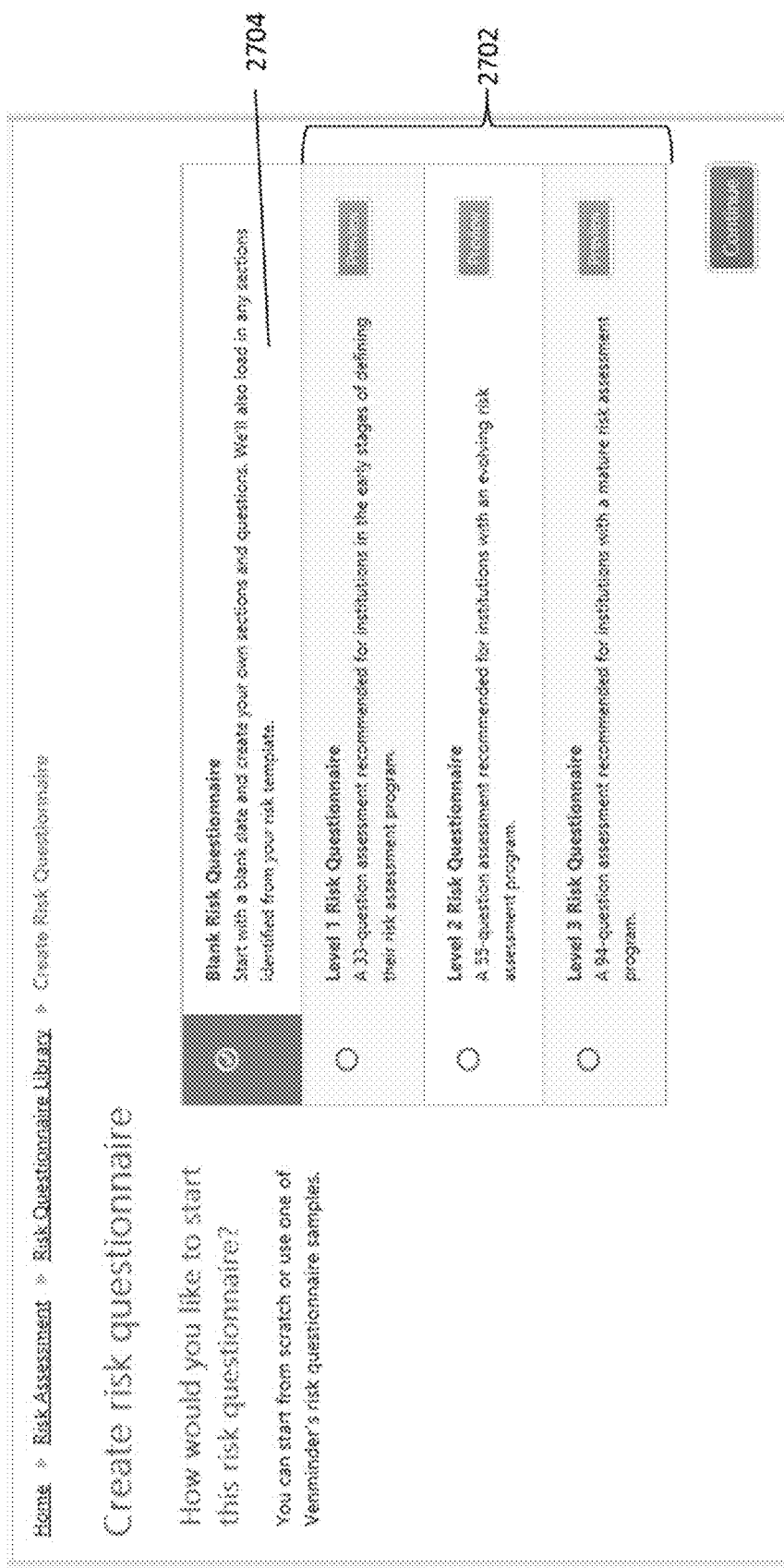
FIG. 27 is an example questionnaire creation workspace in accordance with an embodiment of the invention.

FIG. 27 is an example questionnaire creation workspace in accordance with an embodiment of the invention. In certain embodiments, if a client has selected a "Fast pass" path (e.g., Level 1 or Level 2 from FIG. 21), a basic questionnaire will have been preloaded for the client, while if a client selected a "custom" path (e.g., Level 3 from FIG. 21), the client may create her own questionnaire from scratch, e.g., selecting tab 2704, based on her template, or can optionally load a Level 1, 2, or 3 questionnaire (e.g., through one of the other level tabs 2702) and customize it. Users of any level may be able to load any of the standard questionnaires as they see fit. In certain embodiments, questionnaires may be previewed.

FIG. 28 is an example preview questionnaire modal window in accordance with an embodiment of the invention. In certain embodiments, the preview questionnaire modal window displays a scrollable read-only view of the selected questionnaire sample.

Figure 29:
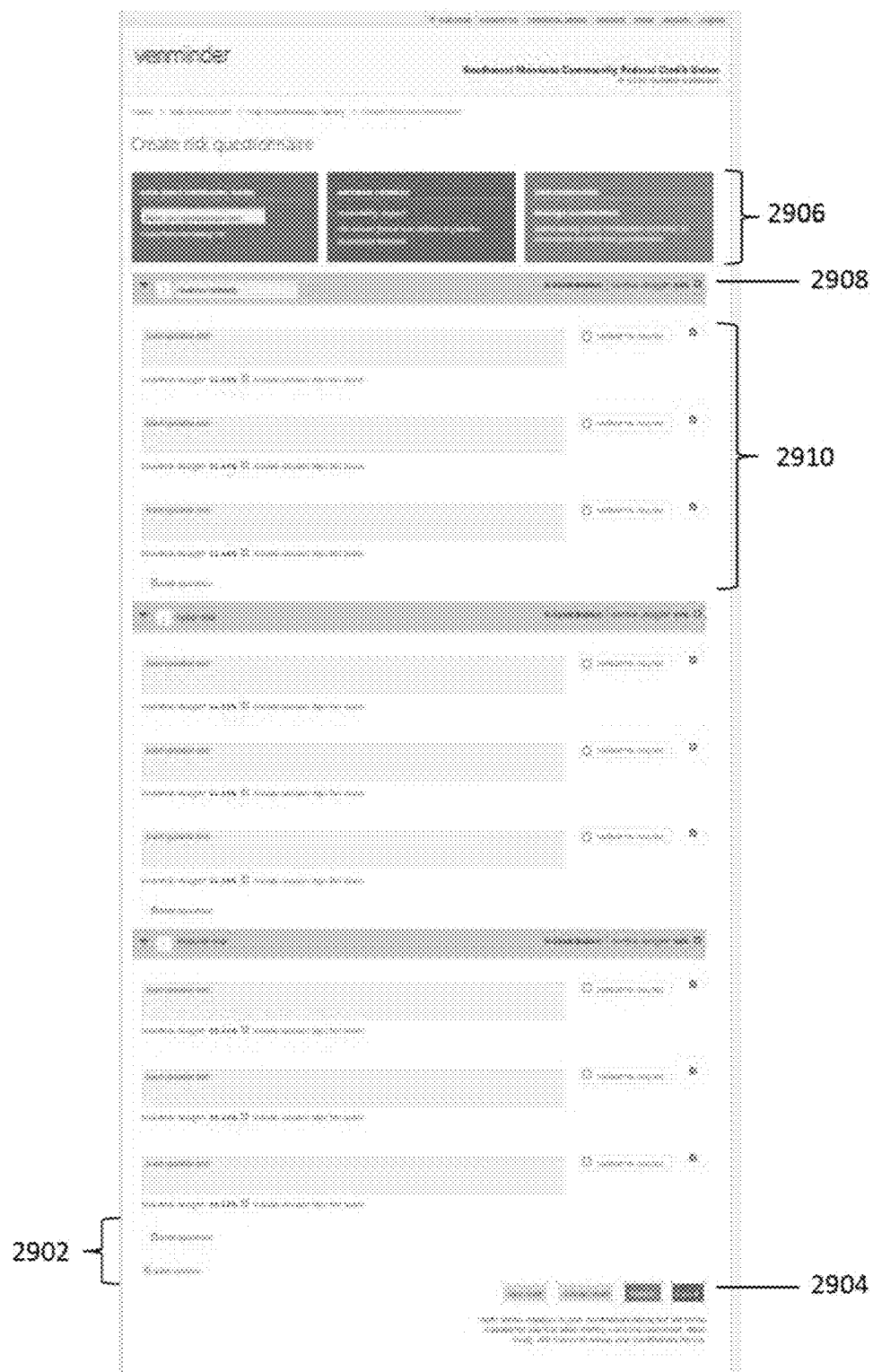
FIG. 29 is an example questionnaire edit workspace in accordance with an embodiment of the invention.

FIG. 29 is an example questionnaire edit workspace (e.g., create/edit questionnaire screen) in accordance with an embodiment of the invention. In certain embodiments, the questionnaire edit workspace comprises: (a) a questionnaire header workspace 2906, which allows the user to input a questionnaire name, a description of the chosen answer format, and to identify contributors. In some embodiments, all questionnaires must be named in order to be saved. In some embodiments, preloaded questionnaires are named for the sample used; (b) a section header workspace, which displays the section name, an expand/collapse arrow, a prevailing score indicator (e.g., meaning that if the section score is High, then the entire assessment will be scored as high), section weights, contributor information, and a delete option; (c) question contents workspace, which can display preloaded questions or allow for entry of question text, answer format, a delete option, question weights, and the ability for the user to create tips (e.g., through workspace 2910); (d) edit options, which can allow for insertion of additional sections or questions; and (e) user action buttons, which allow the user to save an initial draft, discard a draft, publish the questionnaire, or cancel. In certain embodiments, duplicate questionnaire names are not allowed, and the system will validate and append a number or other identifier at the end of any duplicate name to make it unique. In certain embodiments, each section, if not preloaded, will consist of three questions and the user may add as many questions/sections as they wish, e.g., through edit buttons 2902. In certain embodiments, the save option 2904 is only made available when any page change has been made. In certain embodiments, after an initial save action, the save draft button will become simply save.

Figure 30:
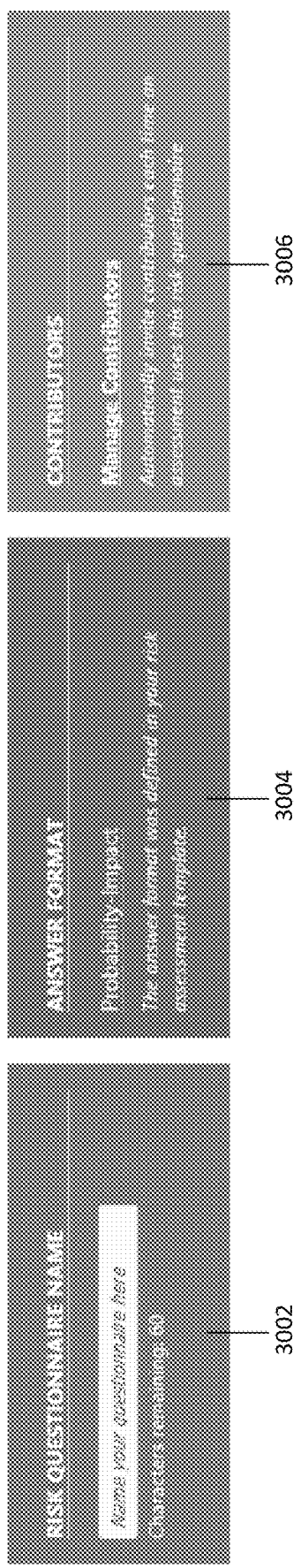
FIG. 30 shows a closer view of an example questionnaire header workspace 2906 in accordance with an embodiment of the invention.

FIG. 30 shows a closer view of an example questionnaire header workspace 2906 in accordance with an embodiment of the invention. The questionnaire header portion allows for input of the questionnaire name (tile 3002) and displays the answer format (tile 3004) that was chosen in the creation of the questionnaire template. In certain embodiments, possible answer formats include multiple choice and/or probability-impact. In certain embodiments, the probability impact format allows a user (e.g., contributor) to provide their estimate of both the likelihood of something happening and the likely result should that thing happen. In certain embodiments, the questionnaire header 2906 allows a user (e.g., owner) to select, monitor, and manage a list of contributors associated with the questionnaire (tile 3006).

Figure 31:
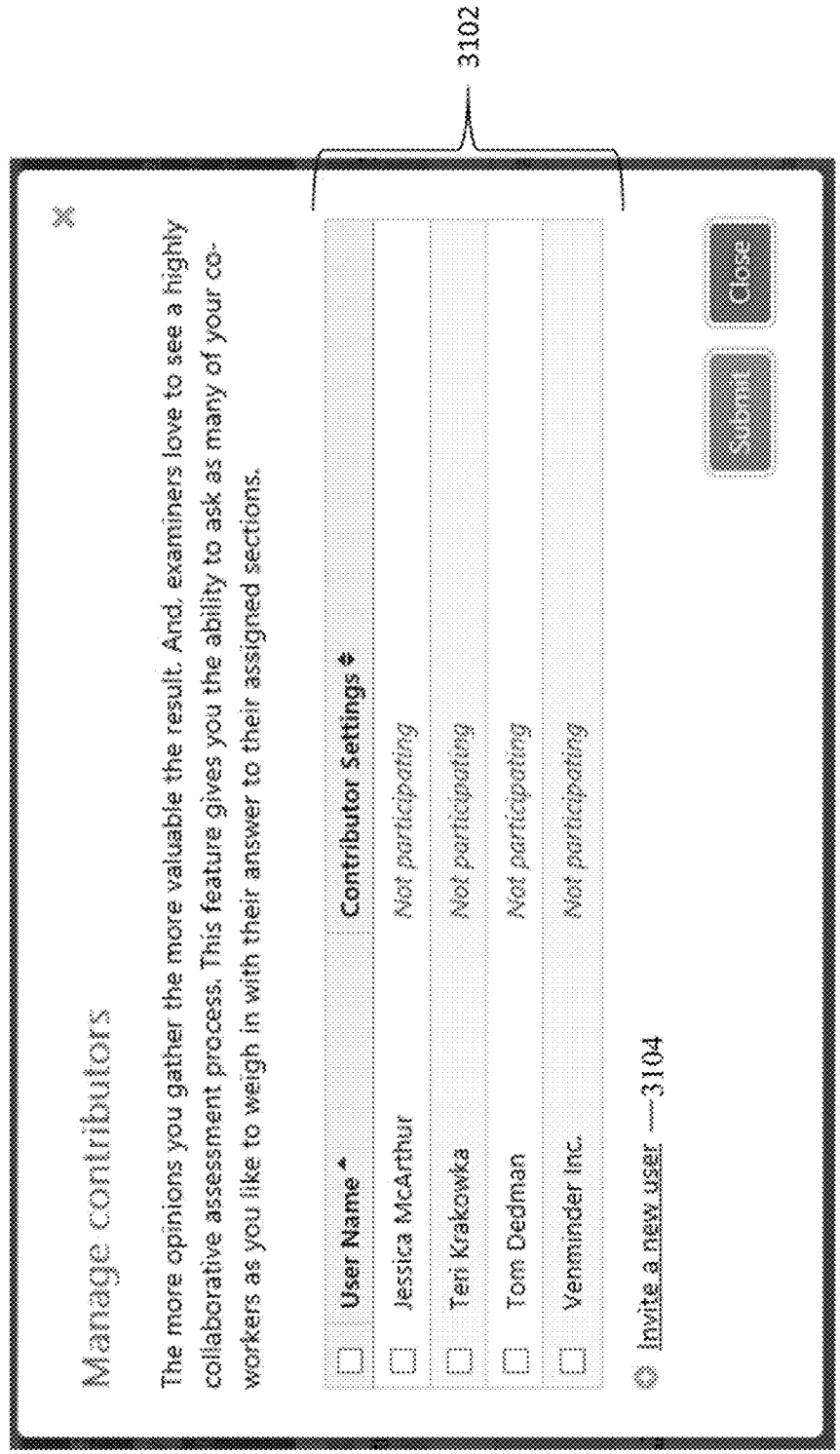
FIG. 31 is an example manage contributors modal window in accordance with an embodiment of the invention.

FIG. 31 is an example manage contributors modal window in accordance with an embodiment of the invention. In certain embodiments, the manage contributors modal window displays a list 3102 of all users (e.g., client users). The user managing the Risk Assessment process (e.g., the "owner") may identify some, all, or none of the users as contributors. Should a desired contributor not appear on this list, the owner can invite a new user through link 3104.

Figure 32:
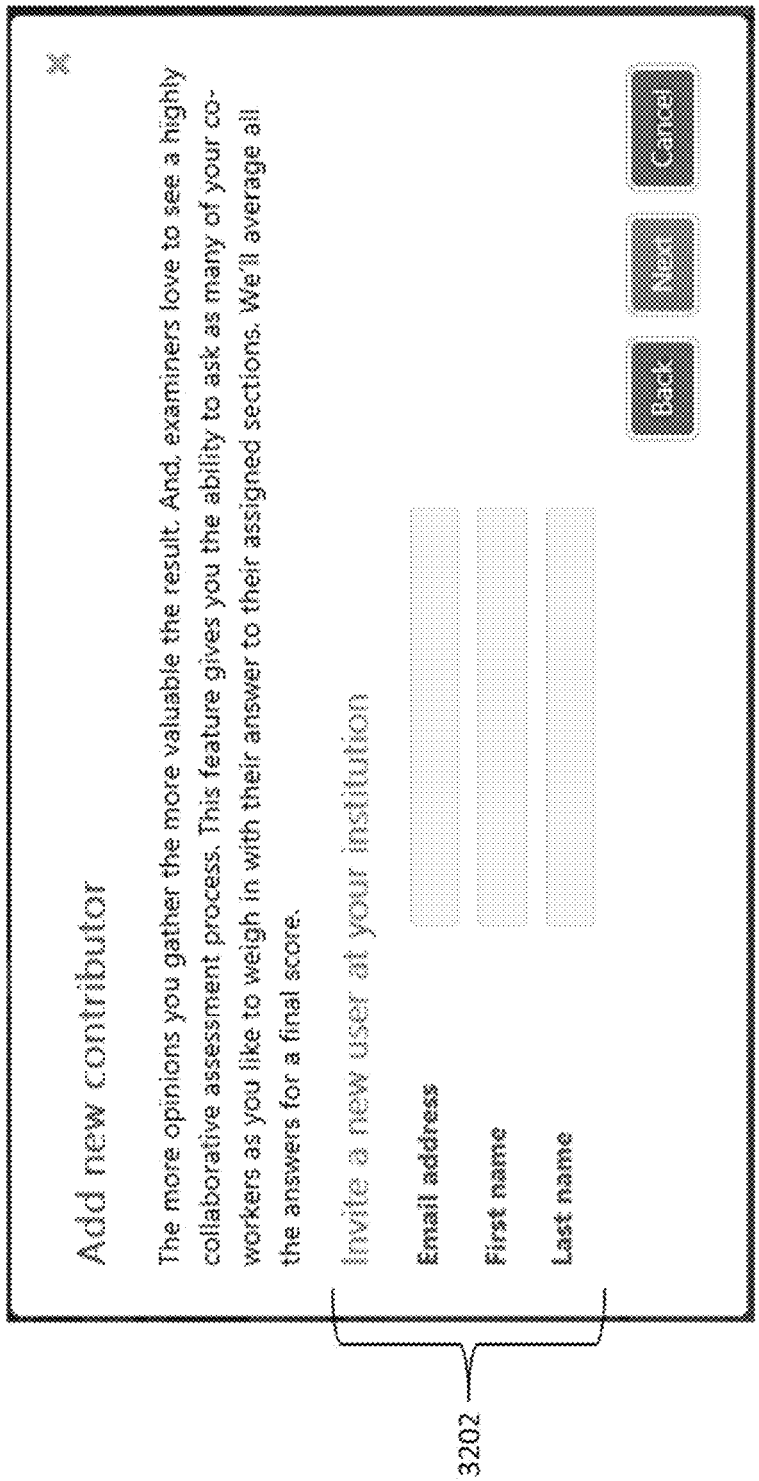
FIG. 32 is an example add contributor modal window in accordance with an embodiment of the invention.

FIG. 32 is an example add contributor modal window in accordance with an embodiment of the invention. In certain embodiments, an email, first name, and/or last name (list/input fields 3202) are required to identify a contributor. In certain embodiments, domains are validated against a client list of domains.

Figure 33:
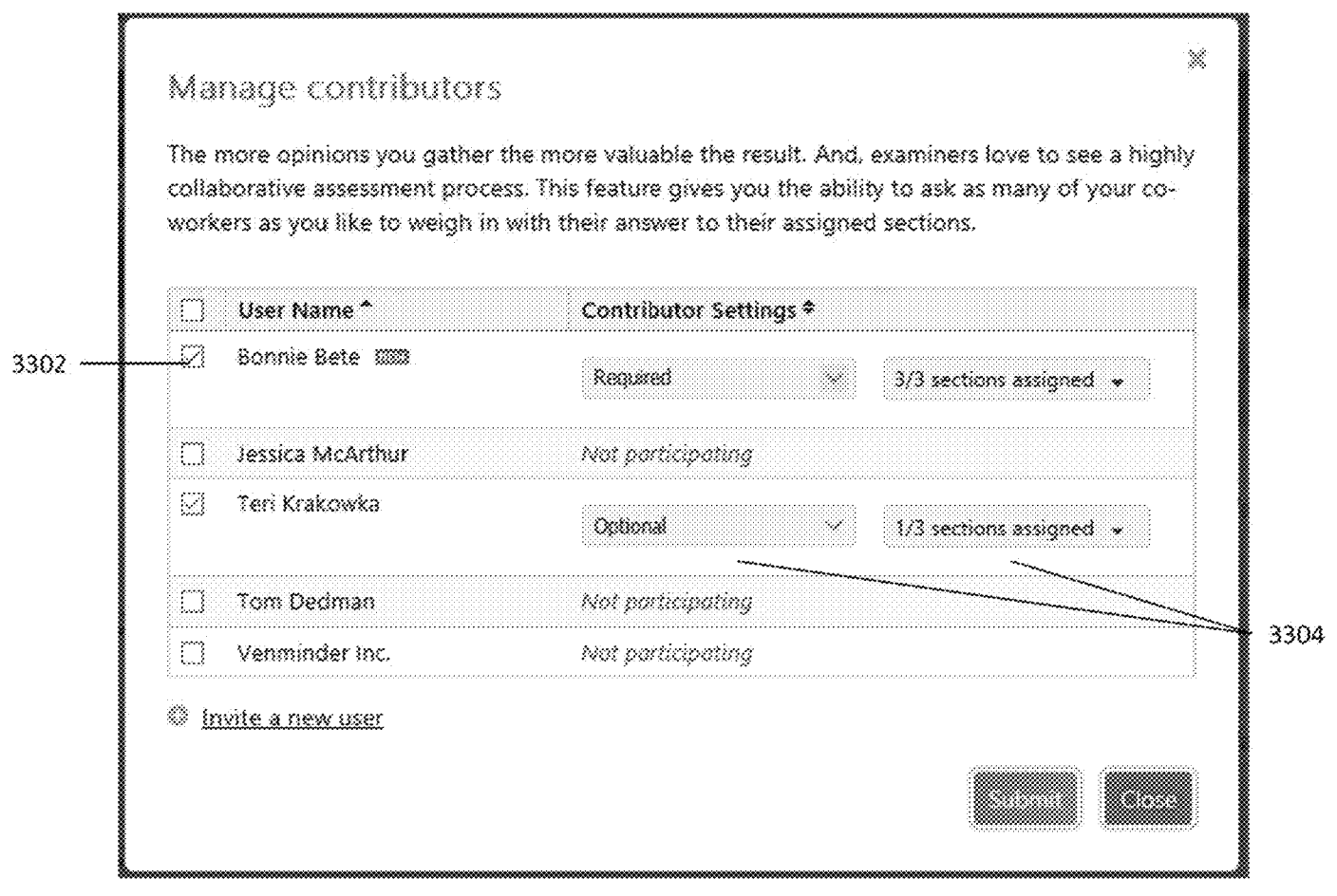

FIG. 33 is an example of a contributor setting workspace in accordance with an embodiment of the invention. In certain embodiments, a newly added contributor 3302 appears as preselected and is tagged as "new." In some embodiments, the user must determine what participation level is associated with each contributor (optional/required) and what sections are applicable to a contributor. In certain embodiments, a dropdown menu 3304 is utilized to identify one, some, or all sections for each contributor input.

Figure 34:
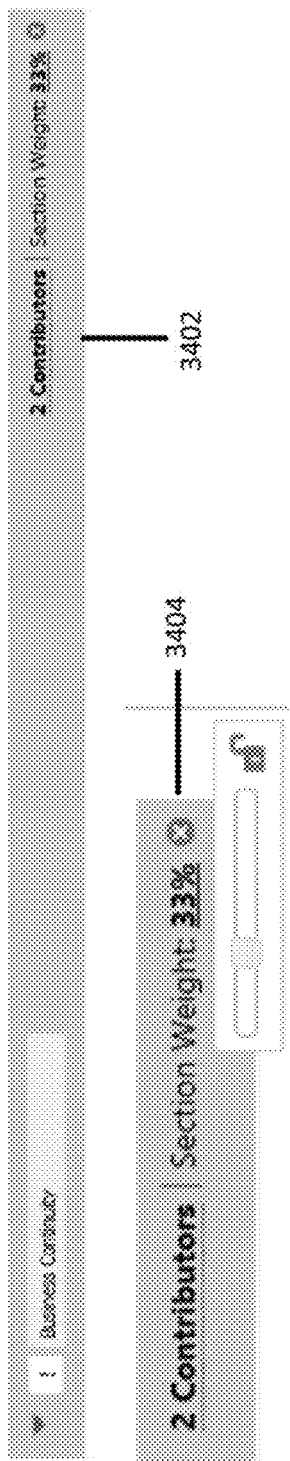
FIG. 34 shows a closer view of an example section header workspace in accordance with an embodiment of the invention.

FIG. 34 shows a closer view of an example section header workspace in accordance with an embodiment of the invention. In certain embodiments, the number of identified contributors per section 3402 is noted. In certain embodiments, hovering over the number will display a list of all contributors; required contributors may be noted with an asterisk or similar identifier. In certain embodiments, if weighting has been selected in the template, each section and each question within each section will carry a weight; this is determined by dividing the number of sections into 100% for section weight, and dividing the number of questions into 100% for question weight. In certain embodiments, the determined weights may be overridden by clicking on the weight percentage 3404, which may reveal a slider which allows the user to reapportion the weight. In certain embodiments, a user may lock the weights to prevent subsequent users from adjusting the weight.

Figure 35:
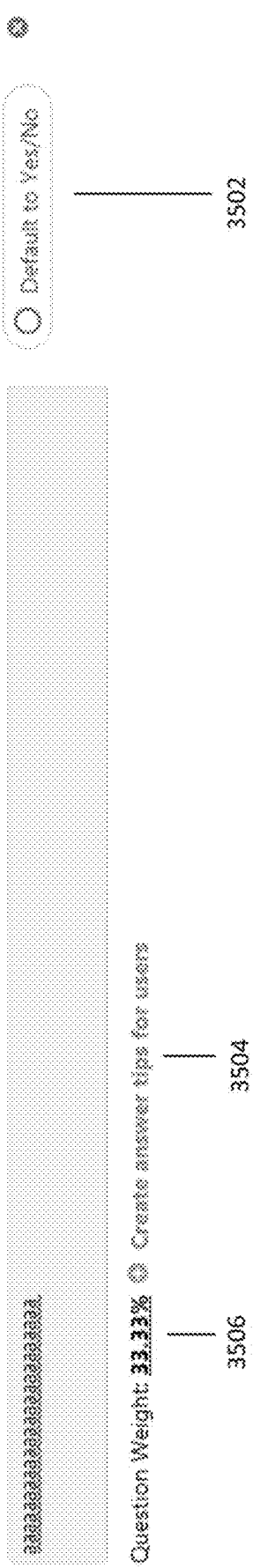
FIG. 35 shows a closer view of an example question contents workspace in accordance with an embodiment of the invention.

FIG. 35 shows a closer view of an example question contents workspace in accordance with an embodiment of the invention. In various embodiments, the owner may input question text, may specify default answers (e.g., through widget 3502), may override question weights 3506, and/or may create tips (e.g., through link 3504) which will be visible to contributors.

Figure 36:
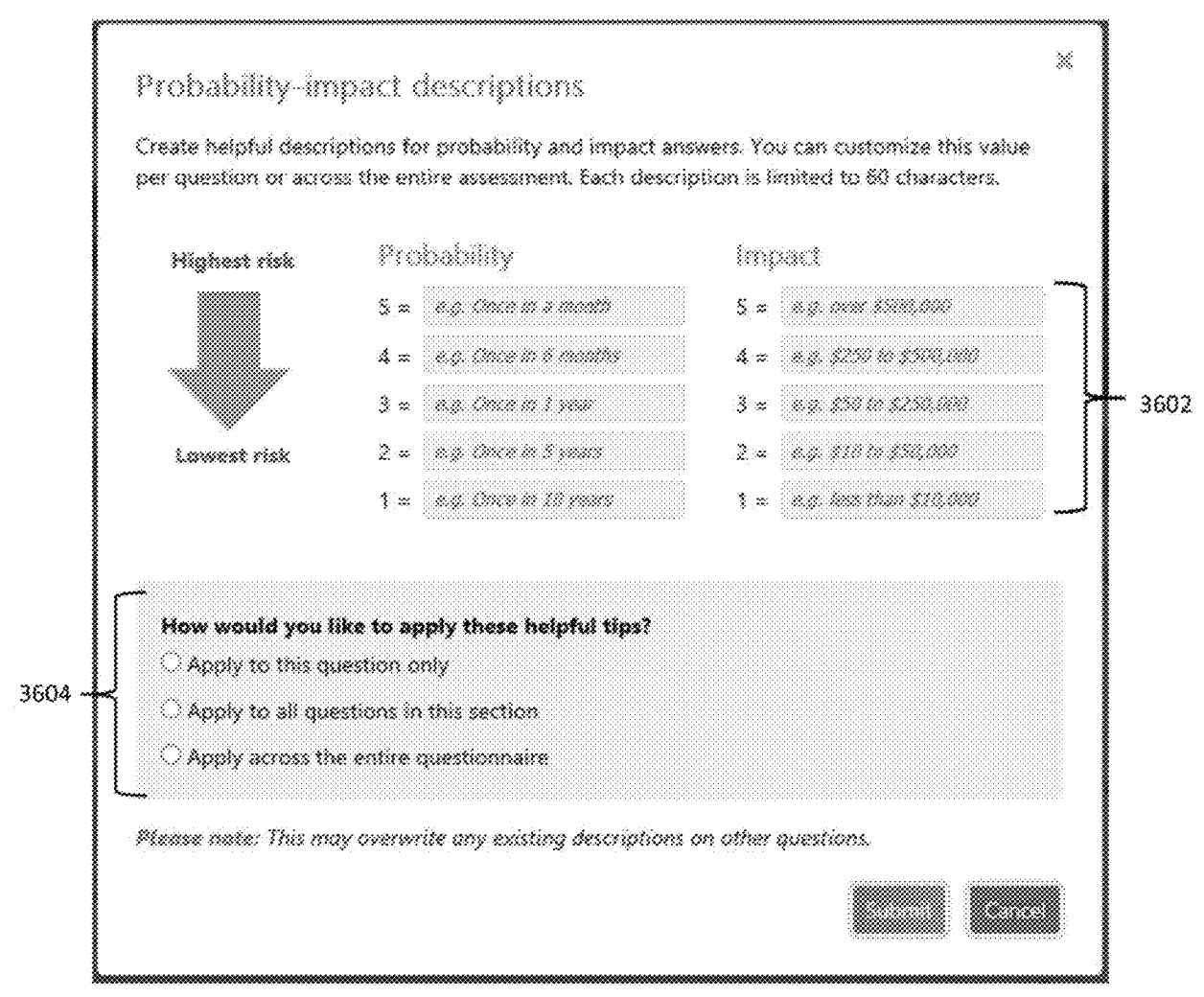

FIG. 36 shows an example tips workspace in accordance with an embodiment of the invention, e.g., as part of a probability-impact description workspace. In certain embodiments, a user may create tips which will be visible to users (e.g., contributors) of a questionnaire. In certain embodiments, hovering over "create answer tips" button causes the tips workspace to display. In certain embodiments, a list of tips 3602 may assist users (e.g., contributors) who are trying to define probability or impact and may be visible for each question, each section, or to the entire questionnaire (e.g., through radio buttons 3604). In certain embodiments, all entries must be filled out prior to submission. In certain embodiments, once updated and added, the create tips button 3504 is updated to read "manage tips."

Figure 37:
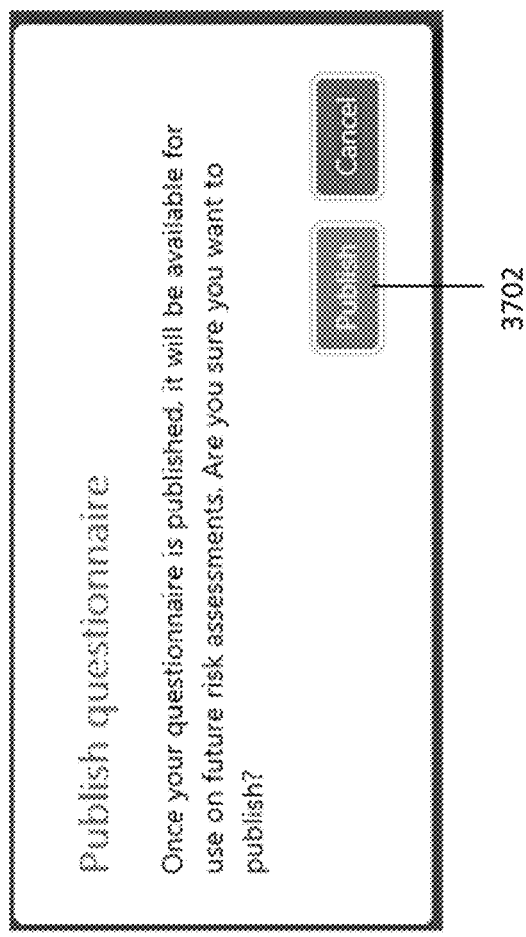
FIG. 37 is an example publish questionnaire modal window in accordance with an embodiment of the invention.

FIG. 37 is an example publish questionnaire modal window in accordance with an embodiment of the invention. In certain embodiments, the publish questionnaire modal window appears when the owner selects Publish from the questionnaire edit workspace. In certain embodiments, selecting the publish button 3702 renders the questionnaire "available" for selection by any other user who is initiating a Risk Assessment process.

In some embodiments, a system as described herein may include one or more modules for questionnaire scoring, for example, in an advanced questionnaires module. An advanced questionnaires module may be designed to augment an existing (standard) questionnaire module. Clients with an advanced questionnaires add-on may introduce scoring to any number of their questionnaires. Points may be applied to responses provided by a recipient, which may then used to calculate a score. The score may then be used by a client user to determine next steps in the client's vendor management program.

A user, for example, a client user may have the option to access a create/edit questionnaires module, for example a module including a scoring configuration.

Figure 38:
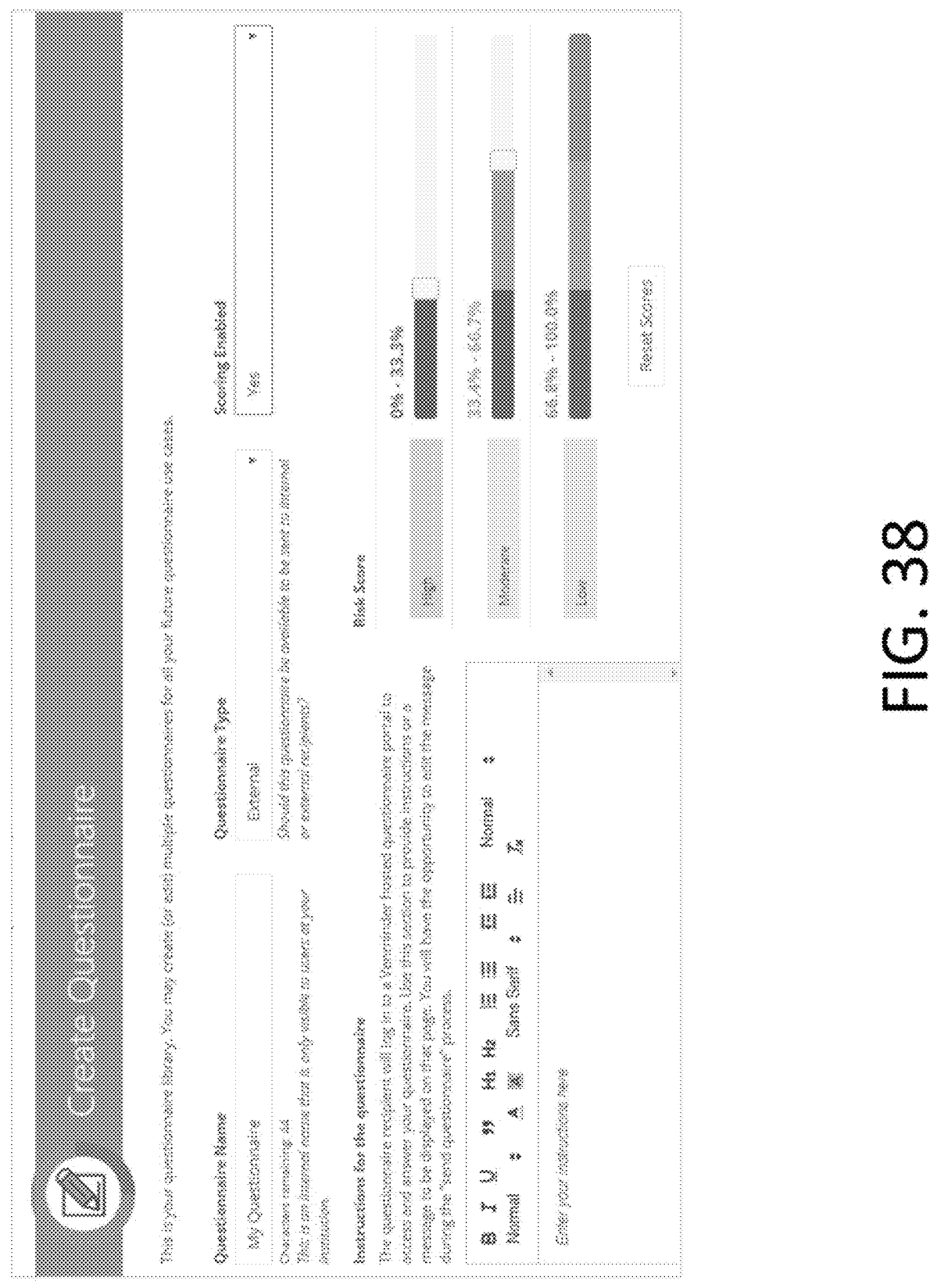

In some embodiments, a client with access to an advanced questionnaires module may have a "scoring enabled" option available when creating or editing a questionnaire. When set to 'Yes', a risk score section may be displayed with a number of risk score fields, for example, three risk score fields (see, e.g., FIG. 38). A user may customize a label of each risk score field. The system may default to an even distribution of one or more score ranges (%). In some embodiments, however, a user may modify the score ranges, for example, by using a slider to increase/decrease risk score ranges.

Question Scoring Setup

Figure 39A:
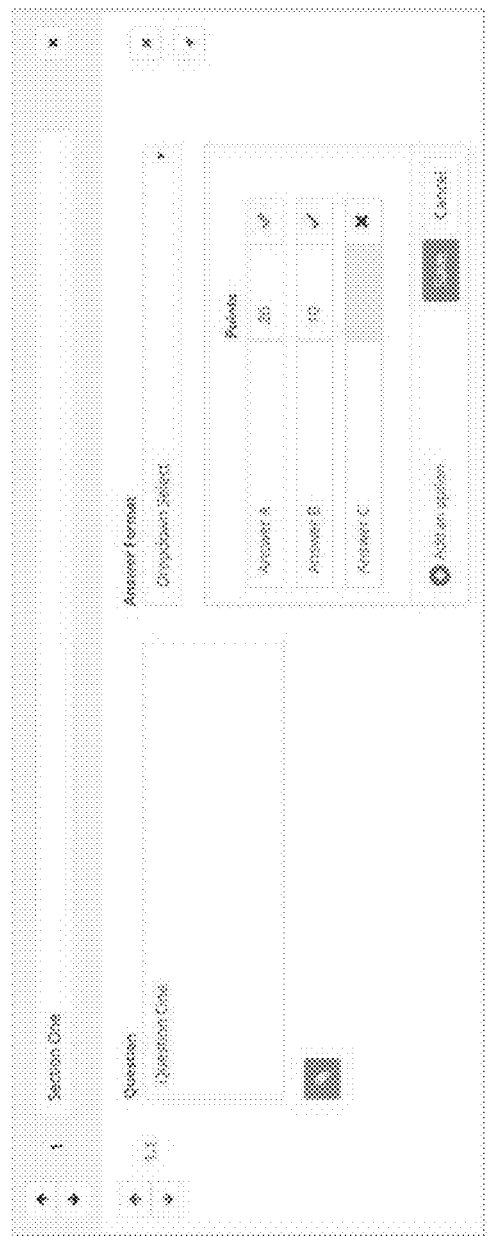
FIG. 39A is an example create questionnaire: question setup modal window in accordance with an embodiment of the invention.

In some embodiments, when scoring is enabled, a user may designate points to each of one or more answers options or omit the question from scoring. Yes/No, dropdown select, and/or multi-dropdown select answer formats may have fields to designate points beside each answer option (see, e.g., FIG. 39A). An answer may also be marked to trigger exclusion from scoring.

Figure 39B:
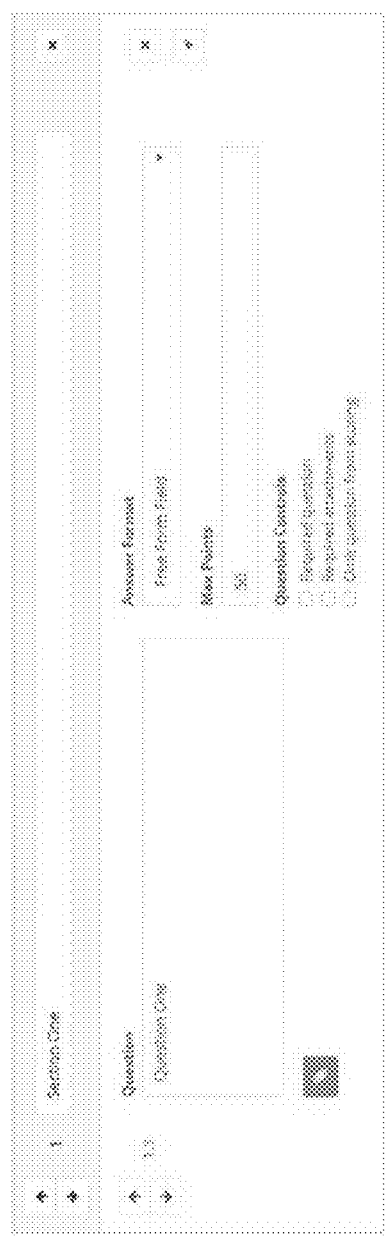
FIG. 39B is an example create questionnaire: set up free form field question modal window in accordance with an embodiment of the invention modal window in accordance with an embodiment of the invention.

In some embodiments, free form questions do not have definitive answers to award points. A user may therefore designate a maximum number of points instead. When a completed questionnaire is returned to a sender, a user may manually award score points to the question, up to the maximum amount of points previously defined. An example set up window for free form questions is shown in FIG. 39B).

Review Responses

Figures 40A, 40B:
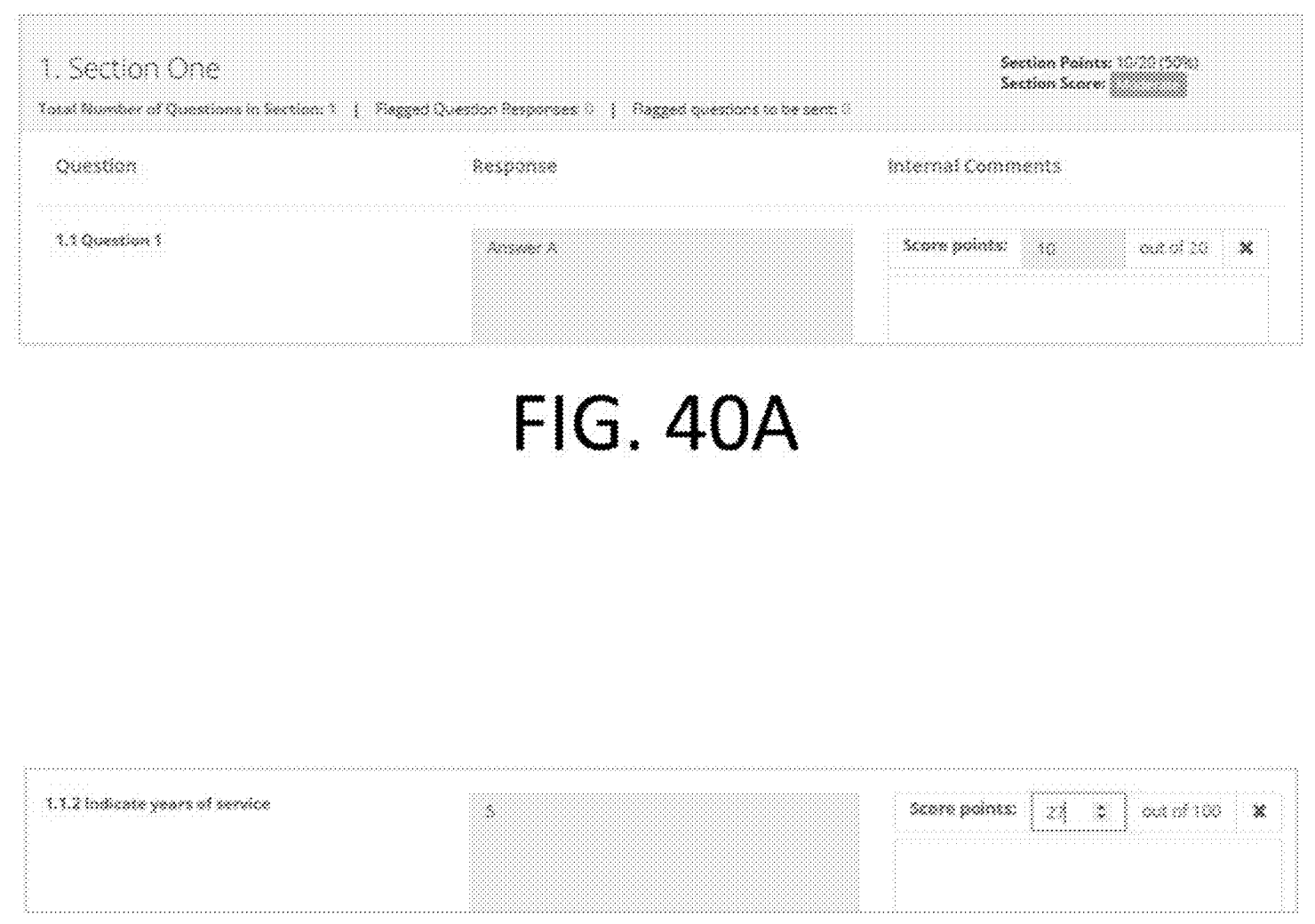

When a completed questionnaire is returned to the sender, the system may award points to the responses, as defined through the questionnaire setup. Awarded points for Yes/No, dropdown select, and multi-dropdown select answer formats may be read-only (see, e.g., FIG. 40A). In some embodiments, if the answer format is a free form field, score points may be enabled for the user to manually apply score points to the question (see, e.g., FIG. 40B).

Scoring Method

To calculate section and overall questionnaire scores, the system may divide awarded score points against available score points to arrive at a percentage score:

$$\frac{\text{Awarded Score Points}}{\text{Available Score Points}}$$

Awarded Score Points: The system may assign points towards the recipient response, as defined during a create questionnaire process.

Available Score Points are the maximum number of points that may be achieved within a questionnaire. The available score point may calculated, for example, at a question, section, and/or overall level.

Figure 41:
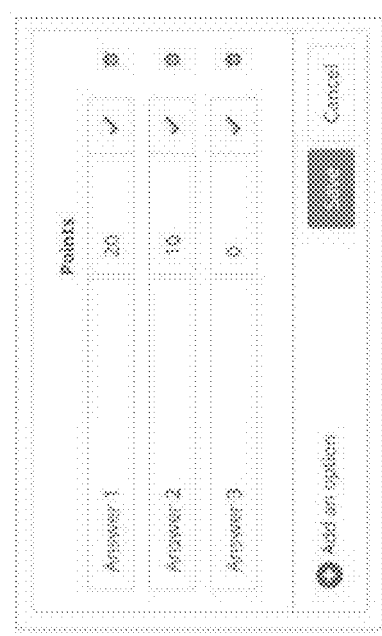
FIG. 41 is an example create questionnaire: point configuration modal window in accordance with an embodiment of the invention.

Scoring may be performed as follows:

Yes/No and single-select dropdown question: Highest number of points that may be achieved from a given response. In the example in FIG. 41, the available score points for the question is 20 points.

Multi-select dropdown question: Sum of points that may be achieved from all responses. In the example in FIG. 41 the available score points for the question is 30 points.

Section: Total number of points that may be achieved across all available questions within that section. Client users may create "tiered questions" that are only visible to a recipient if a particular response to a parent question was selected (e.g., by a recipient). Available score points at the section level may only consider questions visible to the recipient.

Overall: Total number of points that may be achieved across all available questions in the questionnaire.

Risk Score

Figure 42:
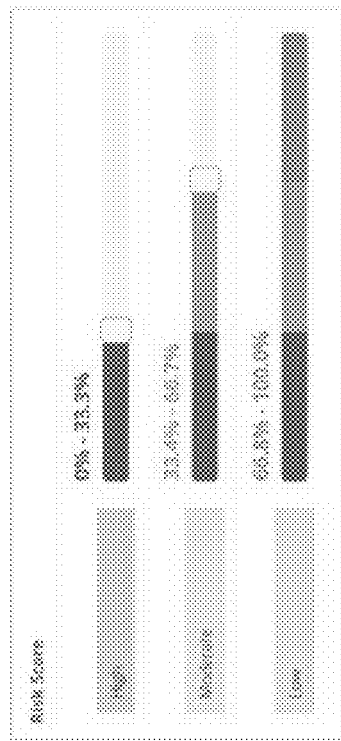
FIG. 42 is an example create questionnaire: risk score configuration modal window in accordance with an embodiment of the invention.

In some embodiments, the system may calculate a percent score by dividing the awarded score points against the available score points. The percent score may then be cross-referenced against the questionnaire's risk score setting to provide a risk score (see, e.g., FIG. 42).

Score Weighting

In some embodiments, a user may designate any number of points to their answer options. By doing so, a user may assign a larger or smaller amount of points to denote importance of questions within the questionnaire. The higher the point value, the greater impact it may have towards the final calculated score.

Omit from Scoring

Multiple scenarios may occur that would result in the exclusion of a question from scoring. No points may be awarded for a response and a question may not contribute to the available score point calculation. Example scenarios that may result in exclusion include:

1. Answer provided by recipient omits the question from scoring.

Figure 43:
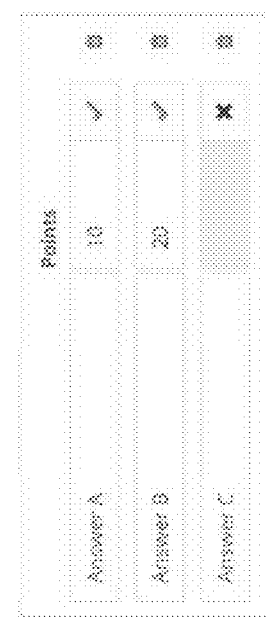
FIG. 43 is an example create questionnaire: answer configuration modal window in accordance with an embodiment of the invention.

During the questionnaire creation process, a client user may mark one or more answer options for exclusion from scoring. In the example in FIG. 43, the question would be excluded from scoring should the recipient respond with Answer C.

2. Question is configured to be excluded from scoring.

Figure 44:
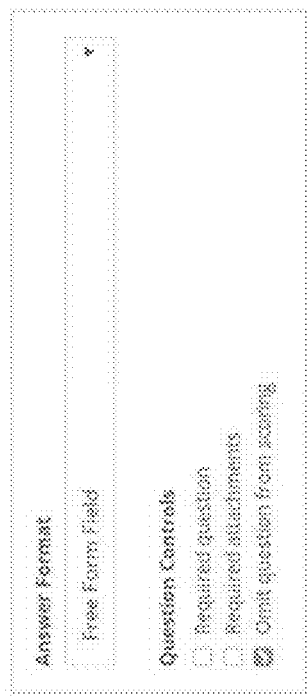
FIG. 44 is an example create questionnaire: question controls modal window in accordance with an embodiment of the invention.

During the questionnaire creation process, a client user may mark a question as excluded from scoring in its entirety (see, e.g., FIG. 44). Selecting the option may remove fields for inputting score points.

3. Questionnaire sender excludes the question and its response from scoring.

Figure 45:
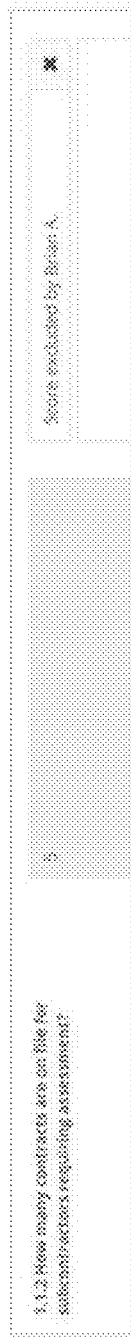
FIG. 45 is an example review response: excluded question modal window in accordance with an embodiment of the invention.

During a sender's review of a completed questionnaire, a sender may have the option to exclude a question from scoring (see, e.g., FIG. 45).

Example scoring use cases

Scoring: Use Case #1

In the following example use case, Question 1 is formatted to provide three (3) potential responses, each of which are awarded a different amount of score points:

Answer A=10 points

Answer B=5 points

Answer C=0 points

For this example question, the available points are 10 points. In the matrix below (Table 5), each answer uses the available score point as the denominator in the calculation to arrive to a percent score.

TABLE 5

| QUESTION 1 | Answer A | Answer B | Answer C |
|---|---|---|---|
| Awarded Score Points | 10 | 5 | 0 |
| Available Score Points | 10 | 10 | 10 |
| Score | 10 out of 10 (100%) Low | 5 out of 10 (50%) Moderate | 0 out of 10 (0%) High |

The calculated percent score is then cross-referenced against the questionnaire's risk score setting to provide a risk score (above).

Scoring: Use Case #2

Building on the previous use case, Question 1 has an additional (tiered) question, Question 1.1, that only becomes available for input should the recipient select Answer A.

Question 1.1 is formatted to provide (2) potential responses, each of which are awarded a different amount of score points:

Answer D=20 points

Answer E=10 points

For Question 1.1, the available points are 20 points. In the matrix below (Table 6), each answer uses the available score point as the denominator in the calculation to arrive to a percent score. Available score points accumulate as more questions become available for response.

TABLE 6

| QUESTION 1 | Answer A | Answer B | Answer C |
|---|---|---|---|
| Awarded Score Points | 10 | 5 | 0 |
| Available Score Points | 10 | 10 | 10 |
| Score | 10 out of 10 (100%) | 5 out of 10 (50%) | 0 out of 10 (0%) |
| QUESTION 1.1 | Answer D | Answer E | Not Available | Not Available |
| Awarded Score Points | 20 | 10 | N/A | N/A |
| Available Score Points | 20 | 20 | N/A | N/A |
| Score | 20 out of 20 (100%) | 10 out of 20 (50%) | N/A | N/A |
| Cumulative Score | 30 out of 30 (100%) Low | 20 out of 30 (67%) Moderate | 5 out of 10 (50%) Moderate | 0 out of 10 (0%) High |

Figure 46:
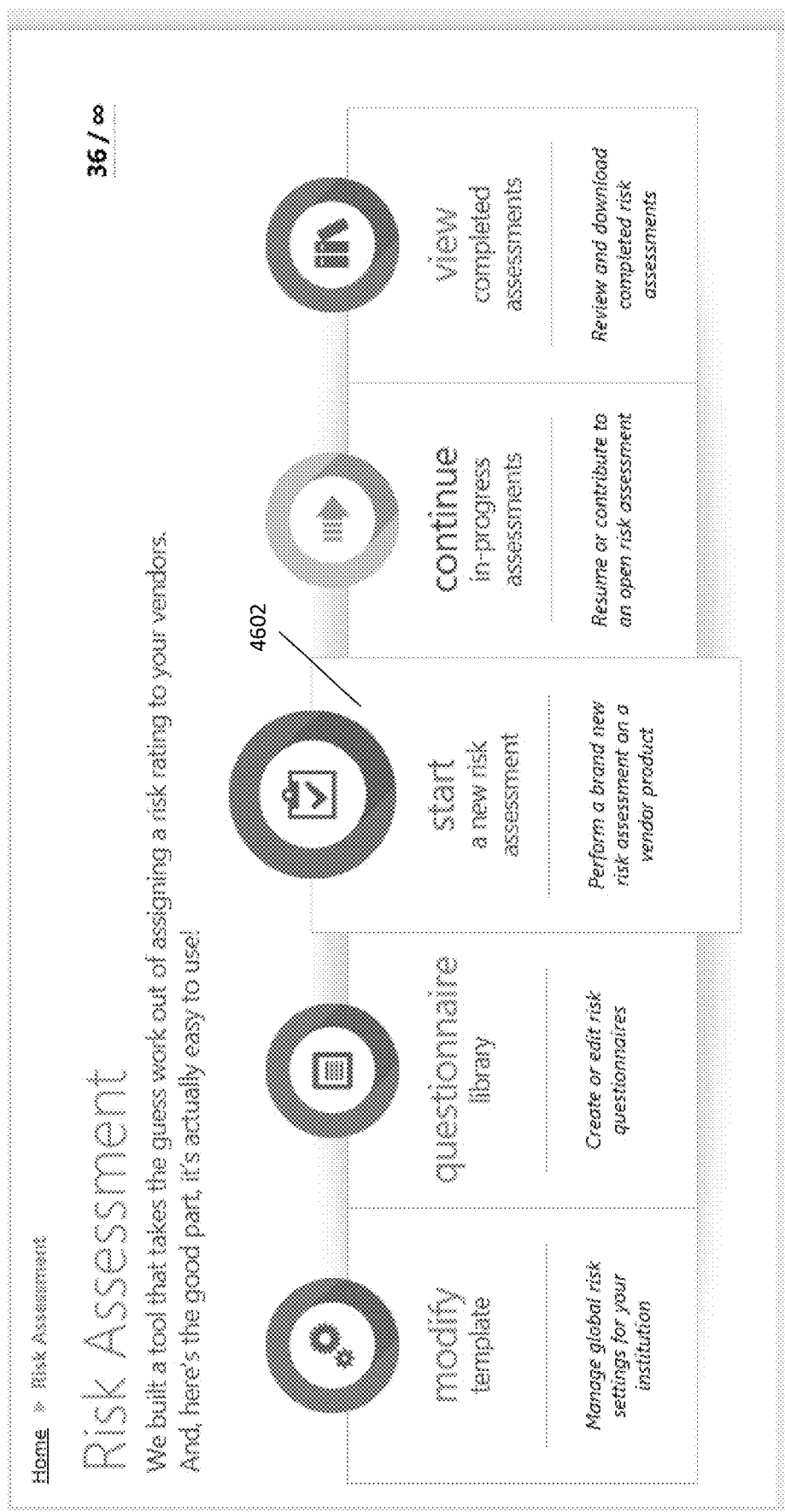
FIG. 46 is an example Risk Assessment Home page in accordance with an embodiment of the invention.

FIG. 46 is an example Risk Assessment Home page in accordance with an embodiment of the invention. In certain embodiments, after completion of a template and publication of at least one questionnaire, users will be able to begin the work of actually starting a new risk assessment (e.g., accessing a start risk assessment module) by selecting the start tile 4602.

Figure 47:
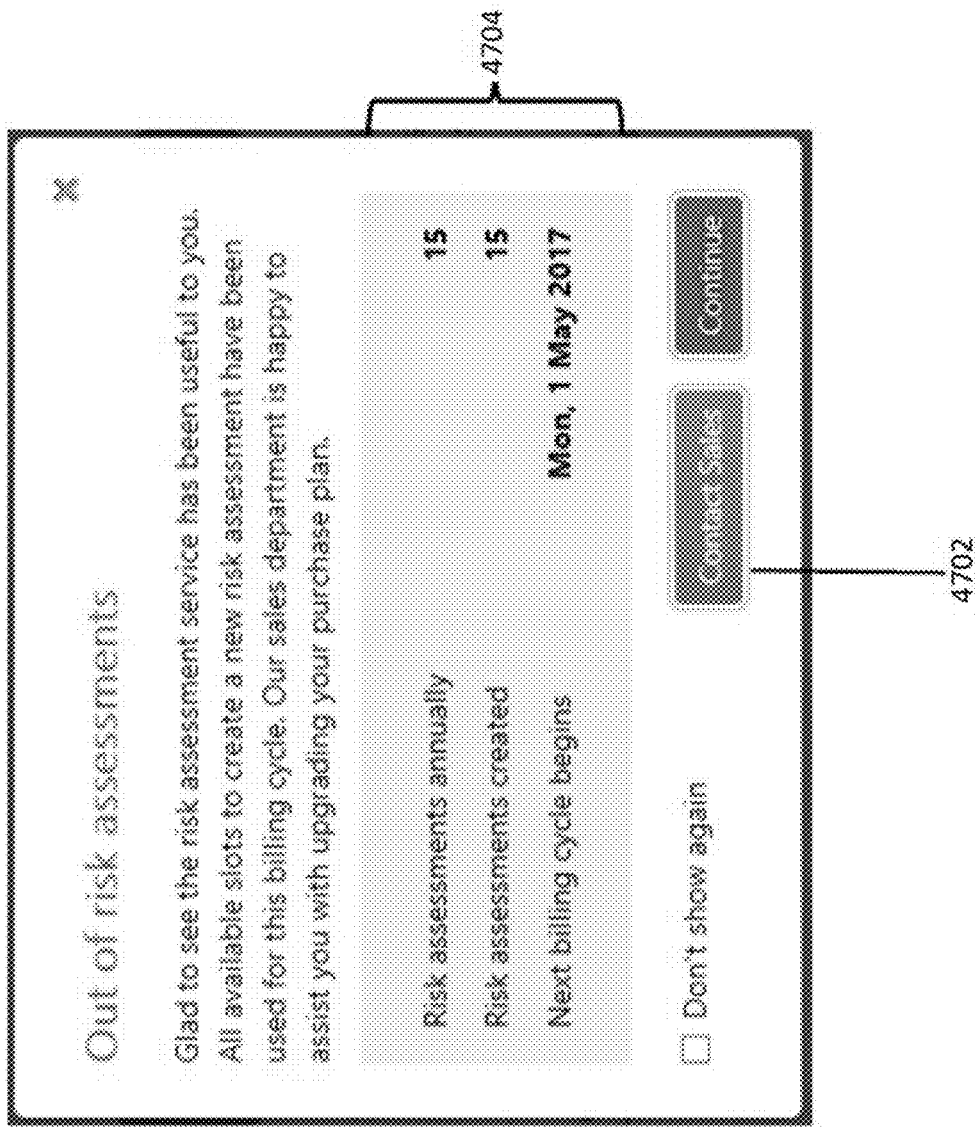
FIG. 47 is an example slot information modal window in accordance with an embodiment of the invention.

FIG. 47 is an example slot information modal window in accordance with an embodiment of the invention. In certain embodiments, clients who purchased a finite number (or "slots") of risk assessments will be notified of their usage (e.g., table 4704), including the remaining number of available risk assessments left upon completion of the current risk assessment. In the example shown in FIG. 47, all slots have been used and the user is directed to sales (e.g., by clicking button 4702) to purchase additional slots. If there are available slots, the user may proceed with the current risk assessment. In some embodiments, a slot usage counter on the Risk Assessment Home page will automatically update as slots are used.

Figure 48:
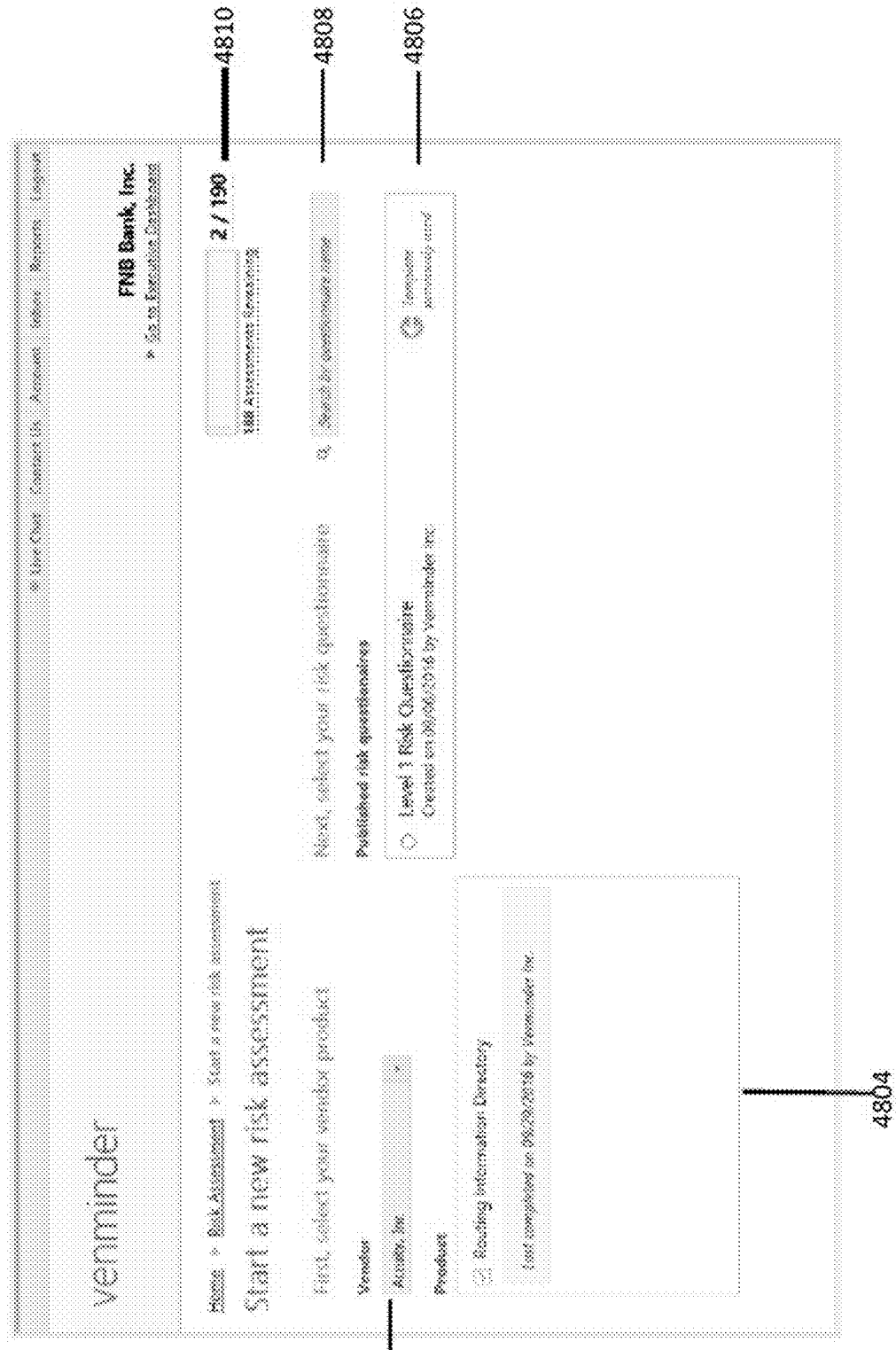
FIG. 48 is an example new risk assessment workspace in accordance with an embodiment of the invention.

FIG. 48 is an example new risk assessment workspace in accordance with an embodiment of the invention. In certain embodiments, users (e.g., clients) will be asked to select a vendor from a drop down list 4802 of all vendors with whom the FI has a relationship. Following selection of a vendor, the client can further select from a list of products associated with that vendor. If a risk assessment has already been performed for the vendor or product, a checkmark can be displayed along with information regarding the previous assessment (e.g., field 4804). A user may choose to redo an assessment or to create a new risk assessment by checking the unchecked vendor product box. In certain embodiments, a new risk assessment cannot be initiated for vendors or products associated with an already-in-progress risk assessment. In certain embodiments, creating a new risk assessment will cause a list 4806 of all published questionnaires to be displayed, from which the user can identify one or more questionnaires to be used for the new risk assessment. In certain embodiments, in the event that a plurality of published questionnaires are available, a search bar 4808 is provided. The search results will appear underneath the published risk questionnaires heading. In certain embodiments, selecting the "template previously used" button for a given questionnaire can allow the user to open a view only module to review the template contents. In certain embodiments, the new risk assessment workspace displays the slot usage (e.g., counter 4810).

Figure 49:
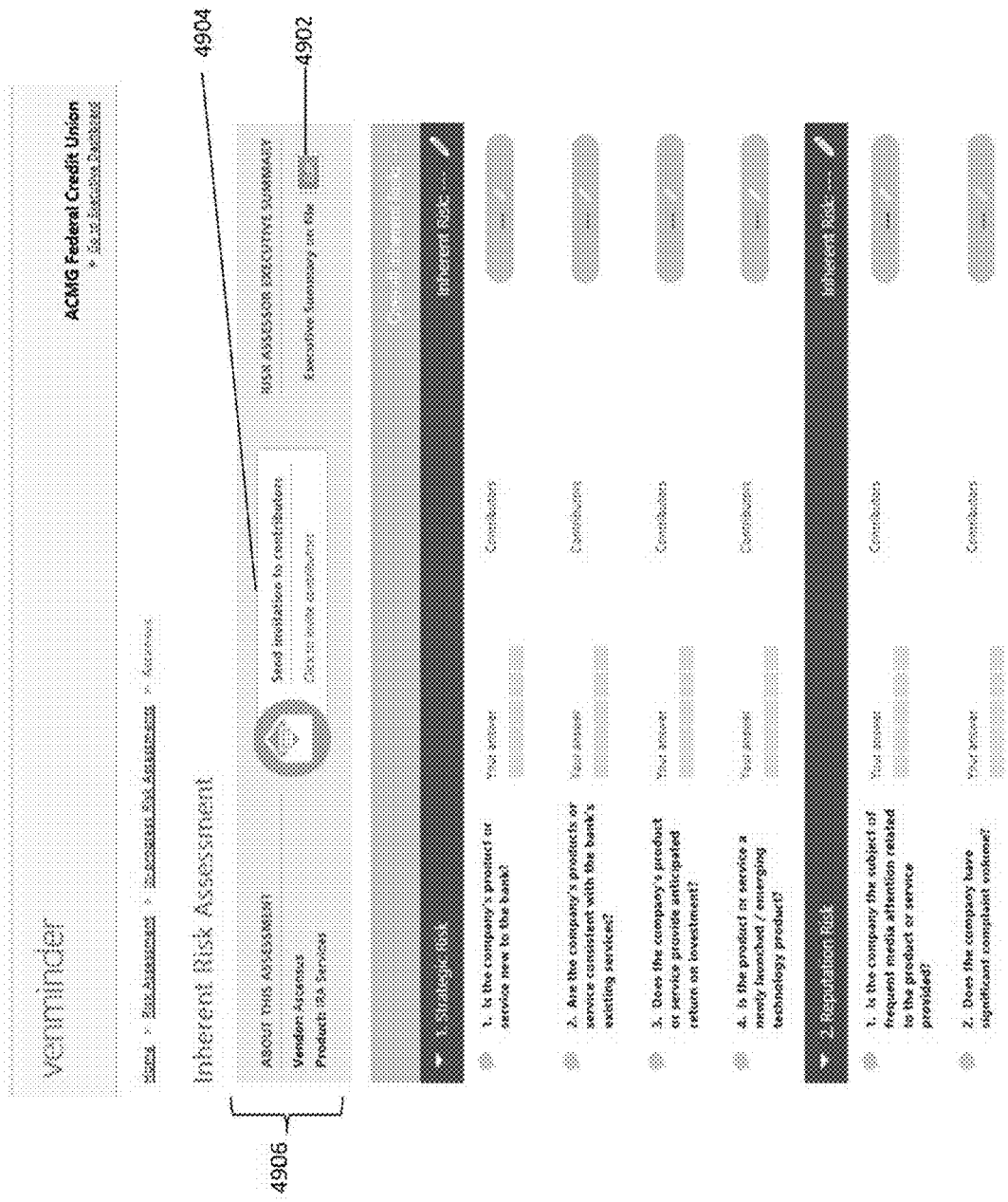
FIG. 49 is an example inherent risk assessment workspace in accordance with an embodiment of the invention.

FIG. 49 is an example inherent risk assessment workspace in accordance with an embodiment of the invention. In certain embodiments, upon creation of a new risk assessment, the system applies the characteristics developed in the published questionnaire and presents an inherent risk assessment section to the owner for review and update. In certain embodiments, the inherent risk assessment section contains a header and a body, with a footer and action buttons. The header can contain information about the assessment (e.g., field 4906) and can provide the user (e.g., owner) the opportunity to invite contributors (e.g., clicking button 4904) and to edit the executive summary (e.g., clicking button 4902).

Figure 50:
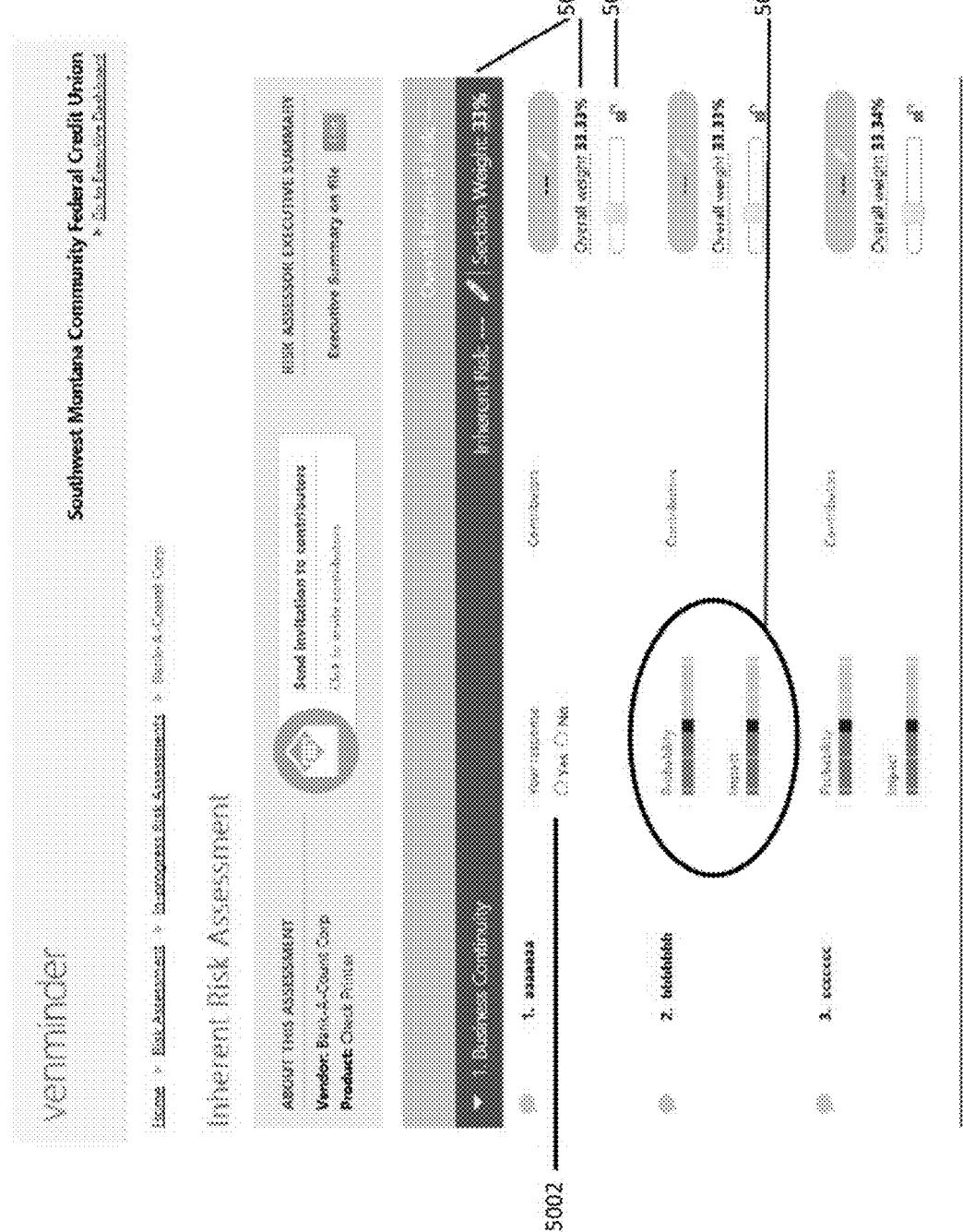
FIG. 50 shows another example inherent risk assessment workspace in accordance with an embodiment of the invention.

FIG. 50 shows another example inherent risk assessment workspace in accordance with an embodiment of the invention. In some embodiments, for templates that have been created with different global settings, questionnaires that have a different appearance will be displayed depending on those settings. In the example shown in FIG. 50, the responses have been set for a combination of Yes/No (e.g., buttons 5002) and Probability-Impact (e.g., widgets 5004) answer formats. In certain embodiments, weights at the question and section level may be applied and displayed (e.g., 5006). These weights may default to spread evenly across all questions and across all sections, and may be changed by moving a slider bar 5008. In certain embodiments, owners and collaborators may override many attributes, including weights. In certain embodiments, only the owners can lock weights by electing a lock icon. In certain embodiments, areas of risk assessment questionnaires are editable as a result of subjective judgements made by owners, collaborators, contributors, approvers, or other users. In certain embodiments, the Risk Assessment process is meant to be a collaborative process, but the module allows a hierarchy of edits that may occur. In a preferred embodiment, owners may override edits performed by contributors, and approvers may override all other edits. In certain embodiments, an approver has final say over edits and may withhold approval until recommended changes are made.

Figure 51:
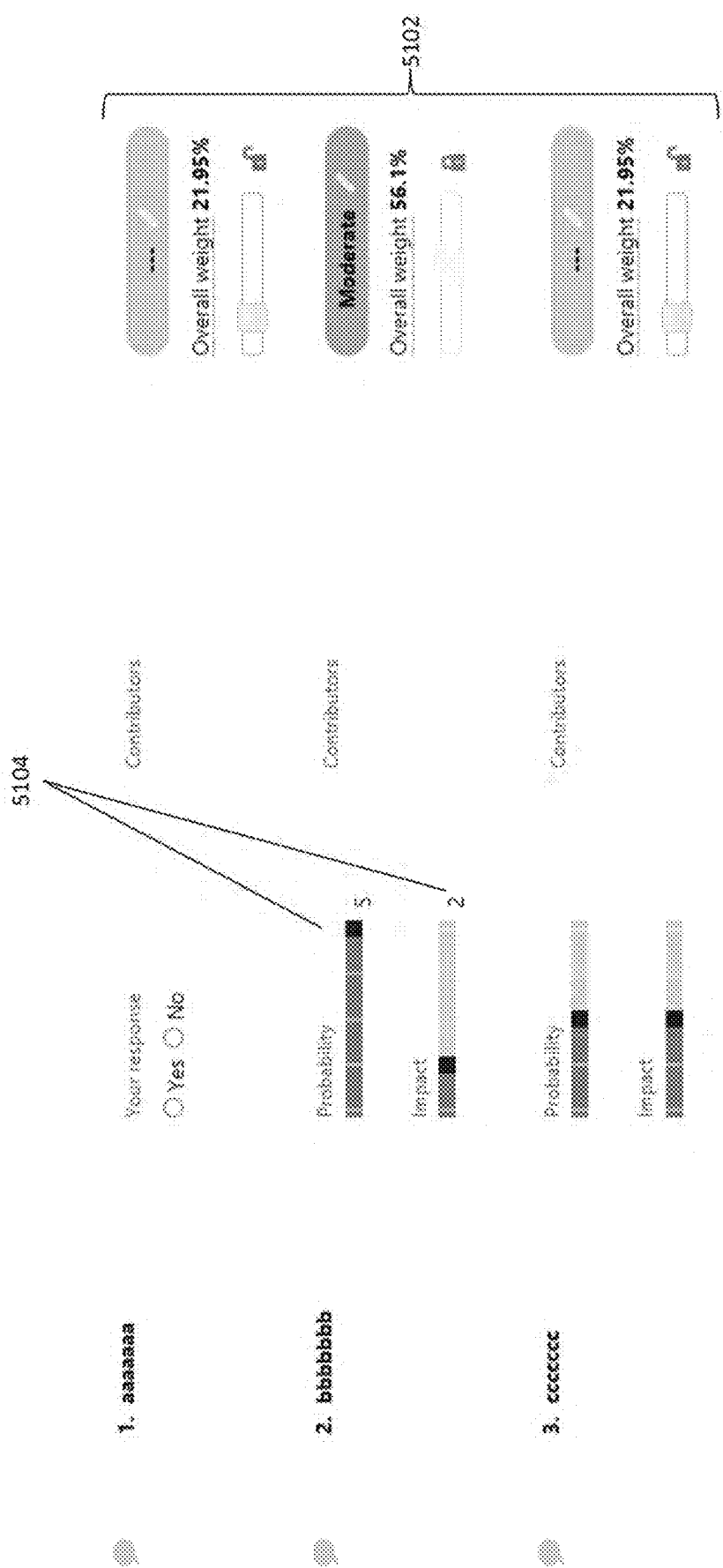
FIG. 51 shows an example inherent risk assessment in accordance with an embodiment of the invention.

FIG. 51 shows an example inherent risk assessment in accordance with an embodiment of the invention. In some embodiments, a list of questions 5102 is displayed. The inherent risk assessment workspace displays information regarding inherent risk, including: "how likely is something to happen, and what is the effect of that event if it should happen?" In certain embodiments, rating bars are preset at mid-range which is determined by the number of settings on the risk assessment scale that were specified within the template. In certain embodiments, 3-5 levels of risk may be identified (e.g., low, moderate, and high) (see, e.g., widgets 5104). In certain embodiments, the user (e.g., contributor) must hover over and select the rating of choice, while leaving it at the default value will mark the question incomplete. In certain embodiments, upon a user (e.g., contributor) providing a probability and impact response to a question, the question will be scored based upon a combination of the probability and impact. In certain embodiments, any override to default weighting for a single question will result in real-time adjustments to the weights assigned for all other questions within that section. In certain embodiments, actions such as weight reassignment or individual probability/impact ratings may greatly affect the overall Risk Assessment.

Figure 52:
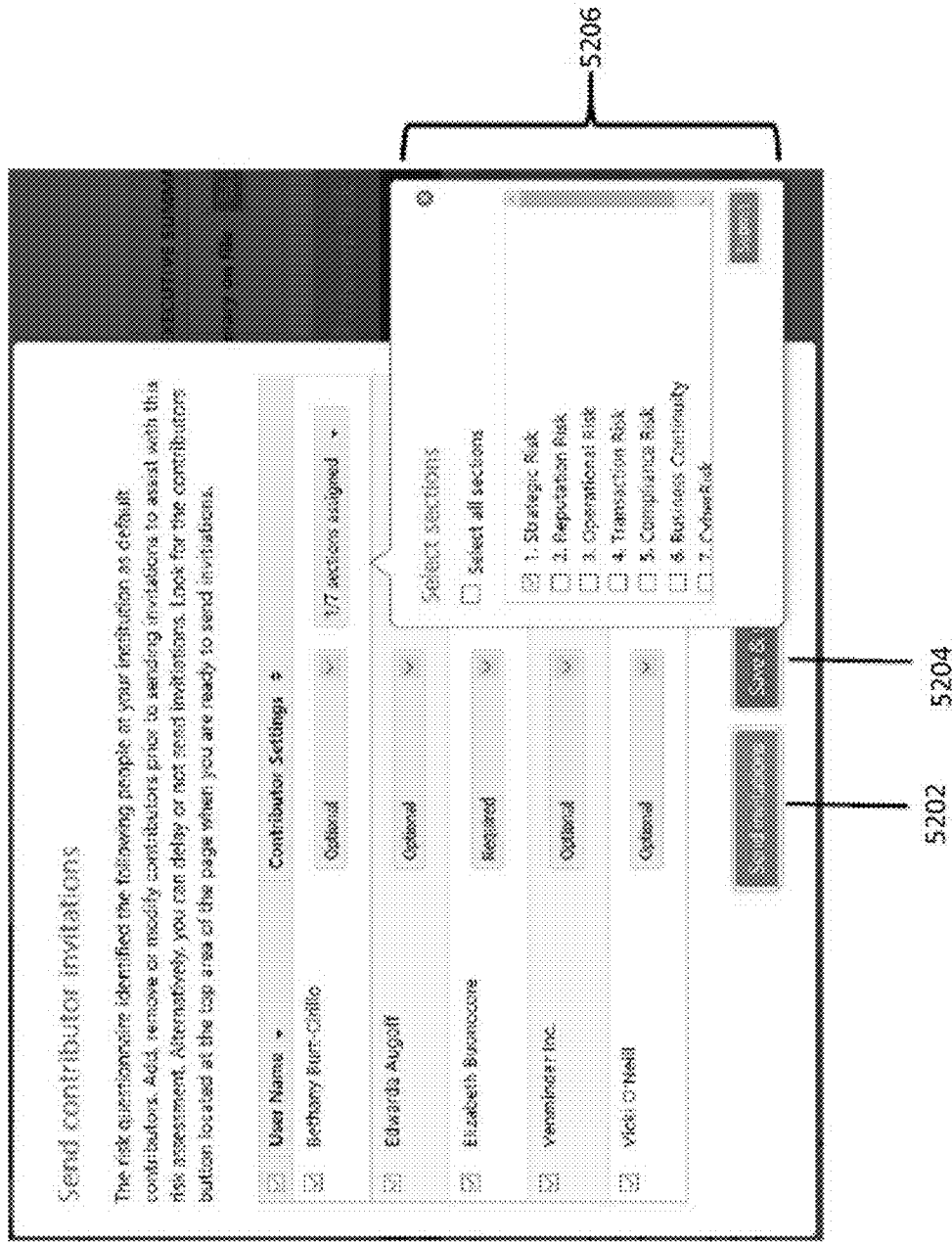
FIG. 52 is an example send contributor invitations modal window in accordance with an embodiment of the invention.

FIG. 52 is an example send contributor invitations modal window in accordance with an embodiment of the invention. The send contributor invitations modal window allows the user (e.g., owner) of the risk assessment to both: (a) edit the list of preselected contributors, add or delete contributors, change their level of participation and their coverage by section 5206, and (b) trigger the generation of emails to all contributors notifying them that a risk assessment has been prepared and is awaiting their input (e.g., clicking button 5202). Alternatively, the owner may "Save & Send later" (e.g., by clicking button 5204), giving the owner the opportunity to further edit the questionnaire's contents prior to asking for contributor input. All changes made to the send contributor invitations modal window may be "reset", returning it to the state it was in at the time of the last save action. In certain embodiments, additional contributors may be added at any time prior to completion of the Risk Assessment process.

Figure 53:
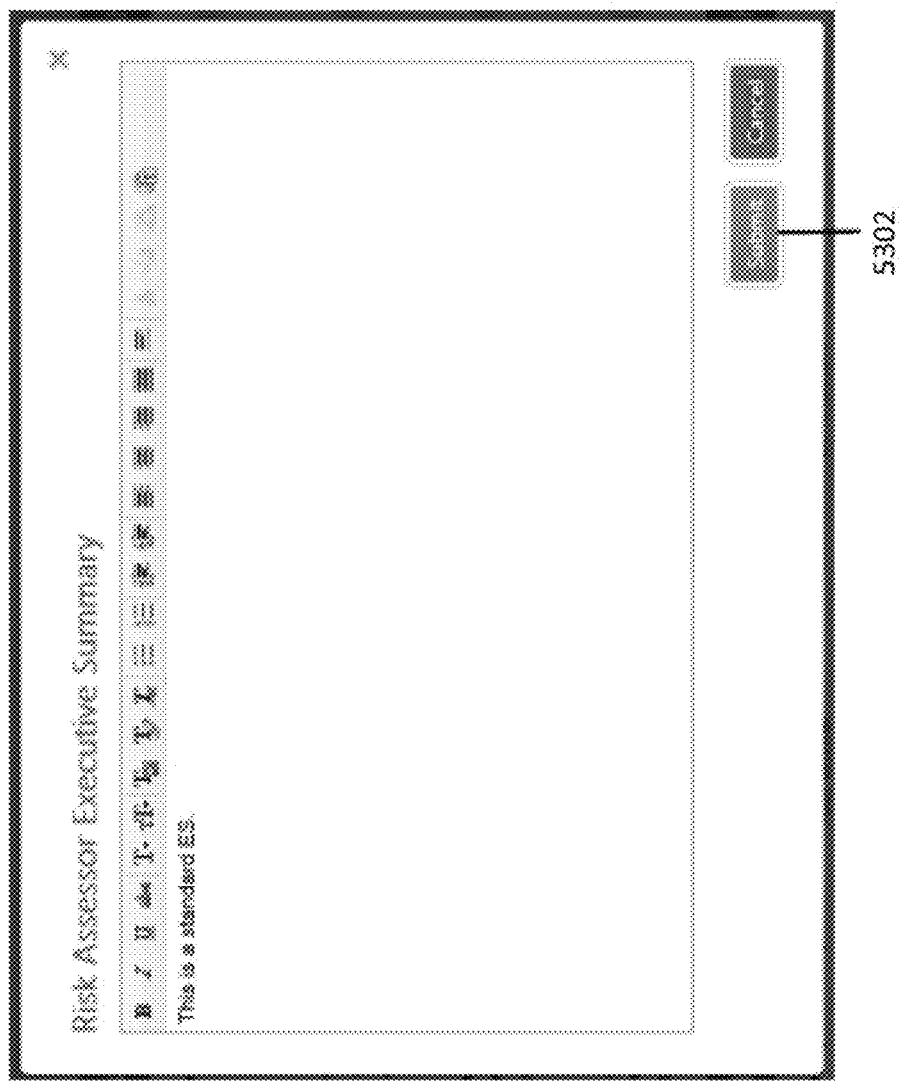
FIG. 53 is an example edit executive summary modal window in accordance with an embodiment of the invention.

FIG. 53 is an example edit executive summary modal window in accordance with an embodiment of the invention, and may be accessed by selecting a "pencil" icon. In certain embodiments, the edit executive summary modal window allows fully formatted text entry that will serve as an introduction to the risk assessment that will be visible in view-only mode to all other users who access the risk assessment. In certain embodiments, the default setting for the executive summary is the text entered at the time the template was created. In certain embodiments, the executive summary may be edited at any time on a per-risk assessment basis. In certain embodiments, an executive summary may be submitted clicking button 5302.

Figure 54:
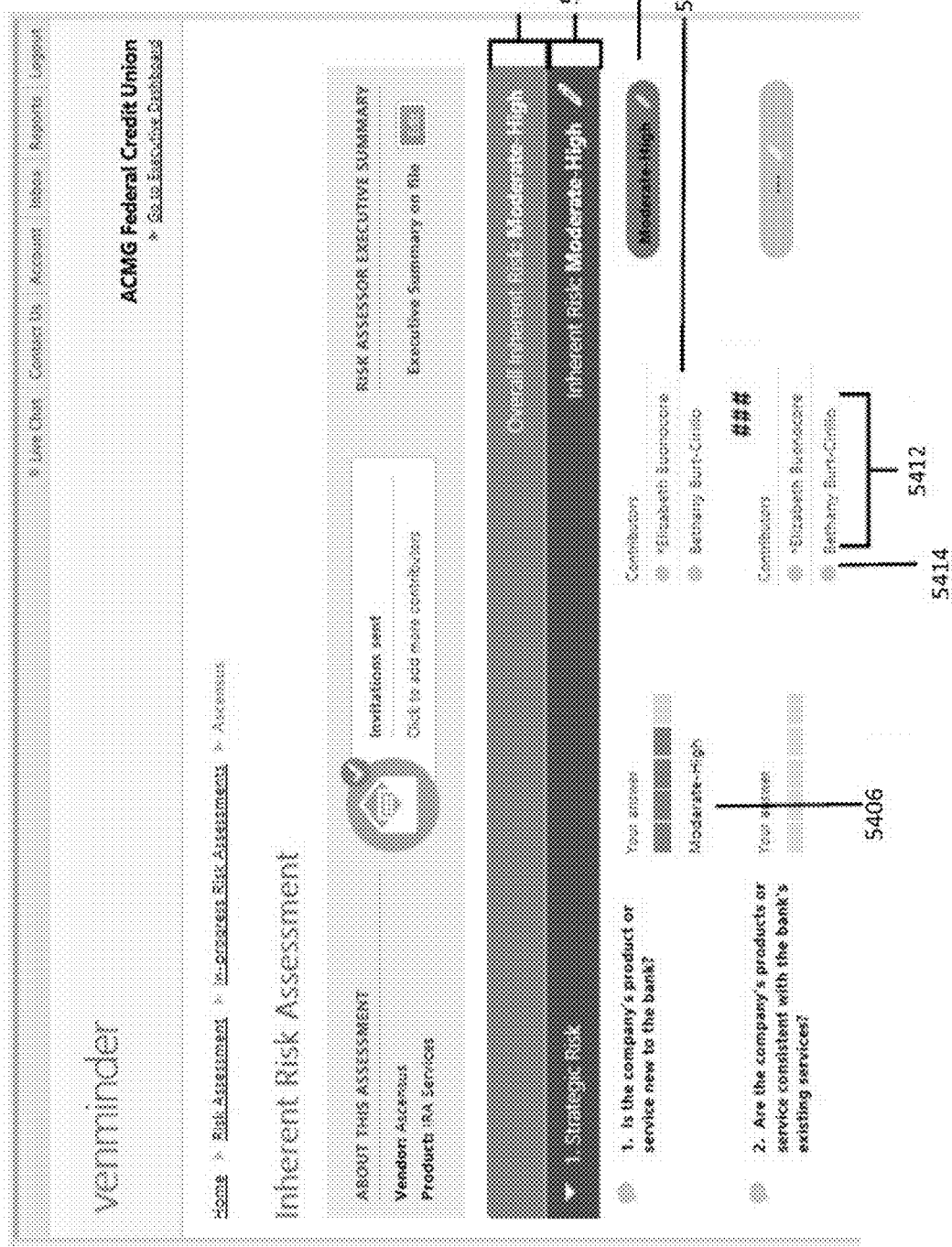
FIG. 54 is another example of an inherent risk assessment workspace in accordance with an embodiment of the invention.

FIG. 54 is another example of an inherent risk assessment workspace in accordance with an embodiment of the invention. In the exemplary embodiment illustrated in FIG. 54, the inherent risk assessment workspace comprises a questionnaire heading which reflects the current overall score (e.g., heading 5402), and may use color coding as well as a label. A second heading can reflect the current scoring (e.g., heading 5404) for a given section, e.g., Strategic Risk. The answer format for each risk assessment depends on the template and can vary; e.g., in the illustrated example, there are five levels of scoring from low to high. In certain embodiments, the user may hover over the scoring bar 5406 and drag to the left or right to "set" the score. In certain embodiments, the score may be changed by editing the label 5408 (not the pencil icon). In certain embodiments, a contributor list 5410 is displayed based on submissions made via the contributor modal windows. Each contributor may be assigned on or more sections. In certain embodiments, required contributors may be identified using an asterisk or similar identifier. In certain embodiments, contributor names 5412 appear in alphabetical order by last names. In certain embodiments, a button 5414 is displayed next to each contributor's name 5412. In certain embodiments, the button changes color to match the color of the response to the question the contributors answered. For example, should they agree with the moderate-high rating, the button 5414 will change to orange (as long as they have moused over the response and set it themselves). If they chose low, then the button 5414 would change to green.

Figure 55:
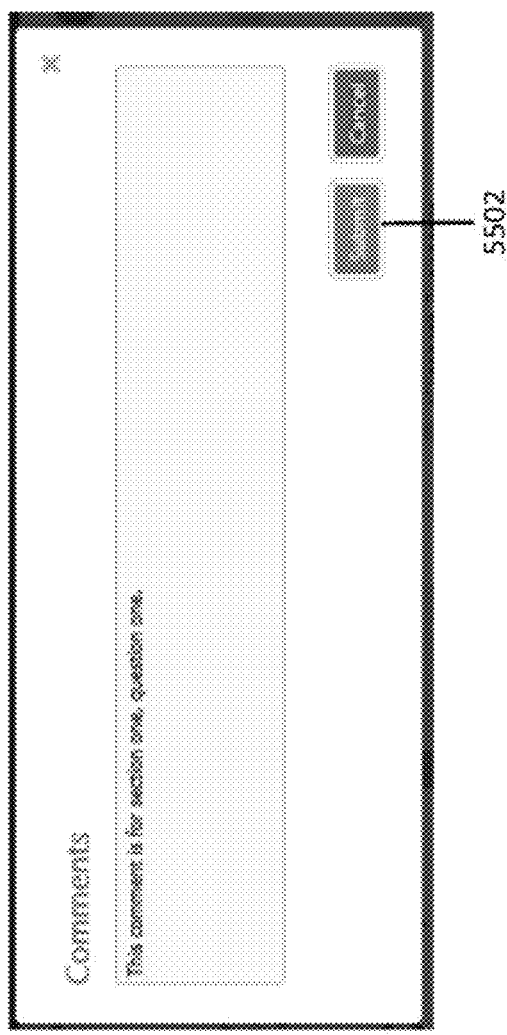
FIG. 55 is an example question comment modal window in accordance with an embodiment of the invention.

FIG. 55 is an example question comment modal window in accordance with an embodiment of the invention. In certain embodiments, the question comment modal window is activated by a user selecting a balloon dialog icon at the far left of each question. The question comment modal window allows each contributor or user to add a comment to the question. Upon selecting the submit button 5502 the comment is s saved. In certain embodiments, when returning to the Risk Assessment home page, a green dialog icon is displayed to indicate comments. Subsequent users (e.g., contributors) may edit comments, add their own comments, or overwrite previous comments.

Figure 56:
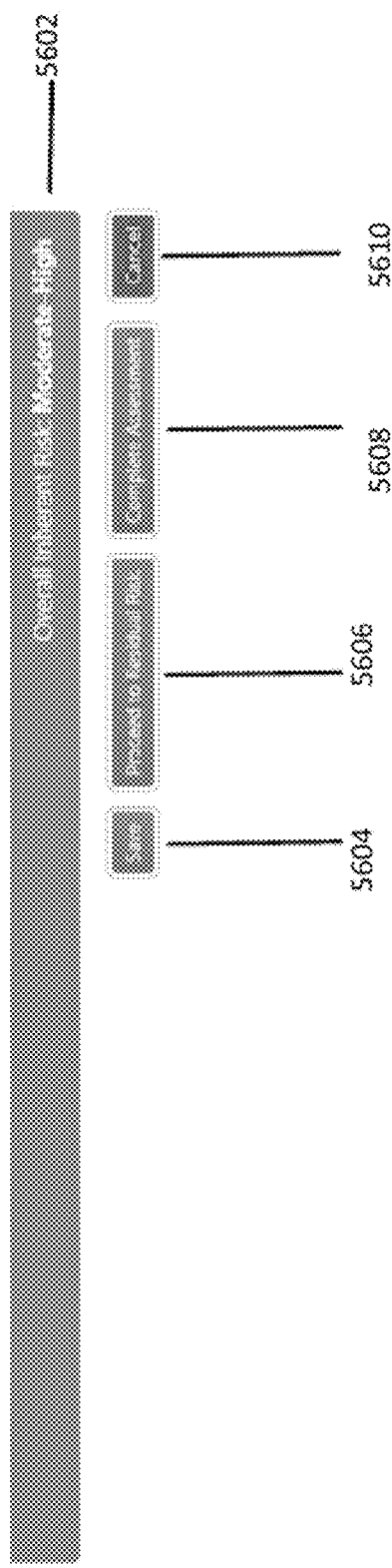
FIG. 56 shows an example footer portion of an example inherent risk assessment workspace in accordance with an embodiment of the invention.

FIG. 56 shows an example footer portion of an example inherent risk assessment workspace in accordance with an embodiment of the invention. In certain embodiments, the interactive footer reflects scoring as it changes with each entry or edited response. In the example illustrated in FIG. 56, only one question has been answered as Moderate-High, so the overall rating (e.g., in header 5602) is Moderate-High. Incremental changes may be saved, which allows the questionnaire to remain in progress; for those templates that were set up to include residual risk, a "proceed to residual risk" button 5606 allows the user to toggle this portion of the questionnaire. In certain embodiments, after all questions are answered and all required contributors have contributed, the complete assessment button 5608 may be selected. A cancel button 5610 is provided to discard any unsaved changes and returns the user to the Risk Assessment Home page, from where they can navigate to other portions of the module.

Figure 57:
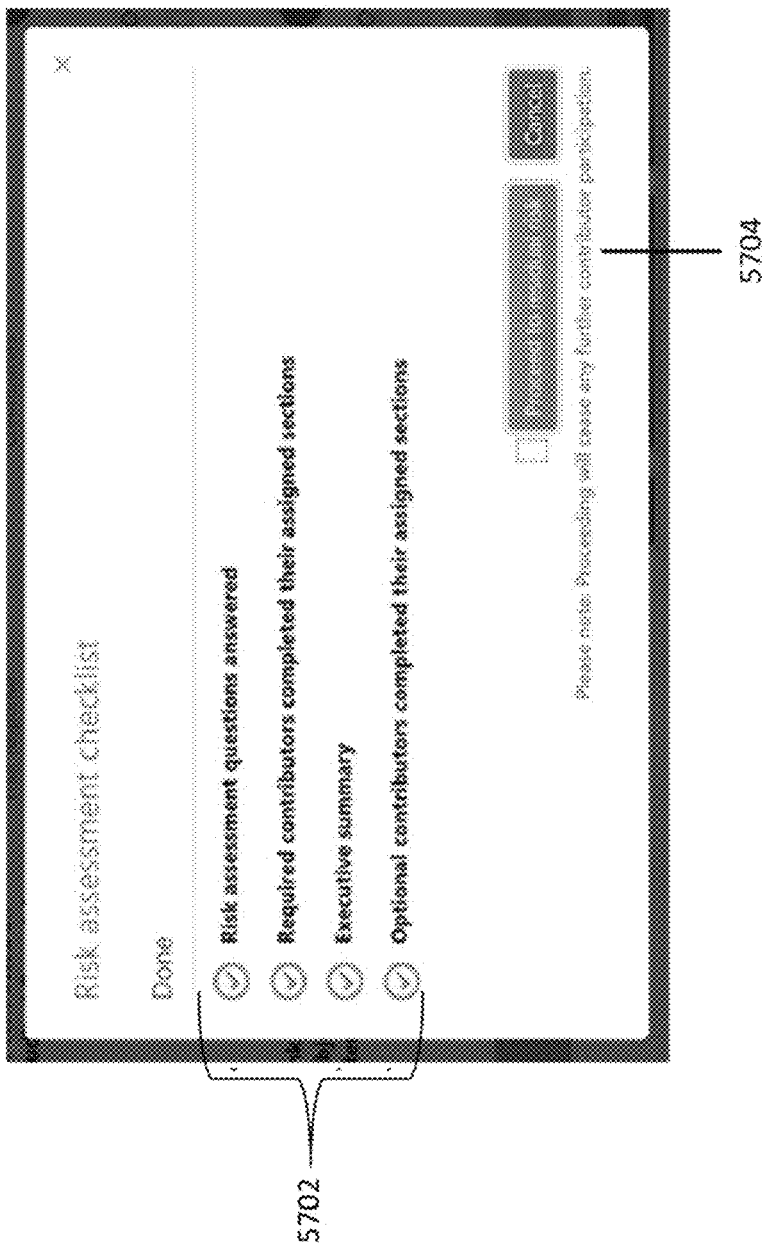
FIG. 57 is an example complete assessment checklist in accordance with an embodiment of the invention.

FIG. 57 is an example complete assessment checklist in accordance with an embodiment of the invention. In certain embodiments, upon selection of complete assessment button 5608 a complete assessment checklist is presented to the user which displays the status of four distinct items that should or must be completed in order to (a) mark the Risk Assessment questionnaire as complete or (b) mark the inherent risk portion of the assessment complete and provide the option to move to residual risk. These items can include: all questions have been answered, all required contributors have completed their contributions, an Executive Summary has been added, and/or all optional contributors have completed their contributions. In the example embodiment illustrated in FIG. 57, checkmarks 5702 are displayed to indicate that all four items have been completed. In certain embodiments, if the template requires a review of residual risk, all required input for inherent risk assessment must be completed. In some embodiments, this modal will appear each time the Complete Assessment option is chosen.

In certain embodiments, once the "proceed to residual risk" button 5704 is selected, no further contributions from either optional contributors, or required contributors who may wish to update their responses, are allowed.

Figure 58:
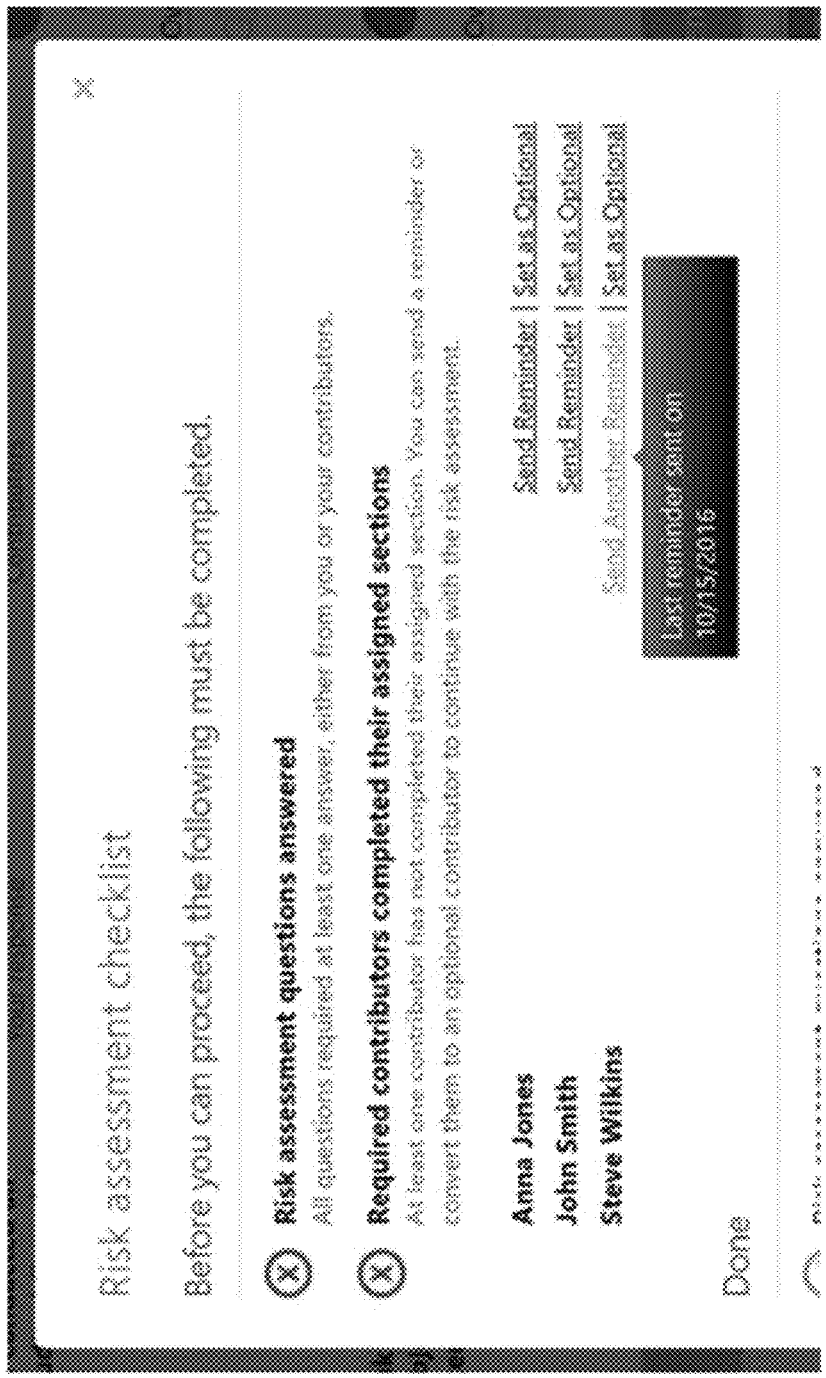
FIG. 58 is an example complete assessment checklist in accordance with an embodiment of the invention in the case in which one or more required contributors have not contributed.

FIG. 58 is an example complete assessment checklist in accordance with an embodiment of the invention in the case in which one or more required contributors have not contributed. In this case, the checklist may display a name and provide the user options with how to proceed. In certain embodiments, the Risk Assessment owner may either send a reminder or reset the contributor as optional. In certain embodiments, if a reminder has previously been sent to the contributor, the verbiage mar change to "send another reminder"; when the user hovers over this option, the date of the last reminder is displayed.

Figure 59:
FIG. 59 is another example of a Risk Assessment Home page in accordance with an embodiment of the invention.

FIG. 59 is another example of a Risk Assessment Home page in accordance with an embodiment of the invention. In certain embodiments, incomplete assessments that have been saved can be viewed by accessing the continue risk assessment module, e.g., by clicking the continue tile 5902.

Figure 60:
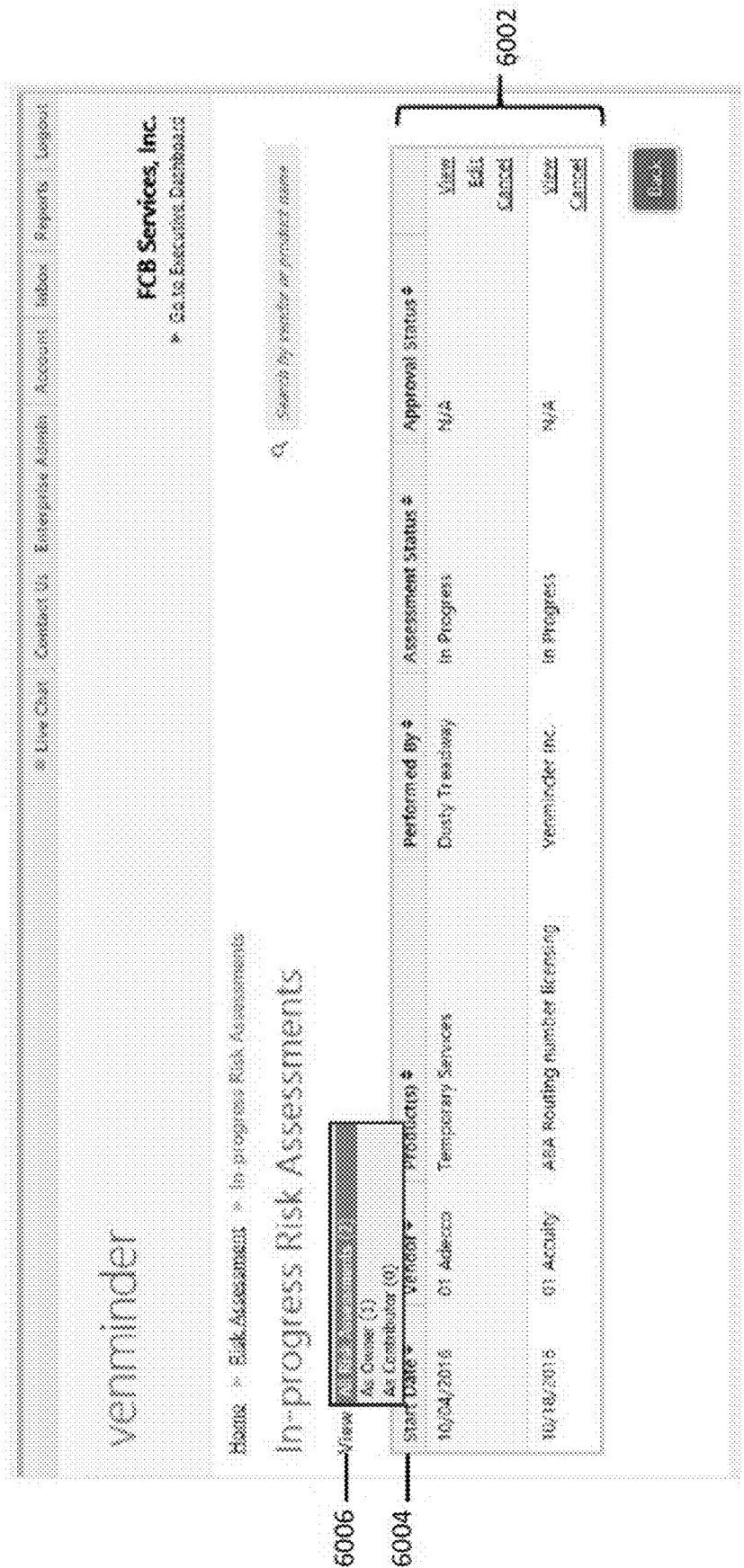
FIG. 60 is an example of an in-progress risk assessment grid in accordance with an embodiment of the invention.

FIG. 60 is an example of an in-progress risk assessment grid in accordance with an embodiment of the invention. In certain embodiments, the grid of filtered (or unfiltered) results corresponding to risk assessments which have been created but not completed is displayed to the user in start date order by default. All columns 6004, except for the action link column in list 6002 on the far right, are sortable. In certain embodiments, users (e.g., owners) may select actions including view, contribute, edit, and cancel, while contributors may select only from view or contribute. In certain embodiments, not all collaborators have unique rolls across questionnaires. For example, some owners may be contributors to other owner's Risk Assessments. In certain embodiments, the view of risk assessments can be limited by the drop-down menu 6006. For example, users may select view all, view risk assessments only for which they are a contributor, or view risk assessments only for which they are approvers. The drop down 6006 may also include the number of in progress assessments for each category in parentheses.

Figure 61:
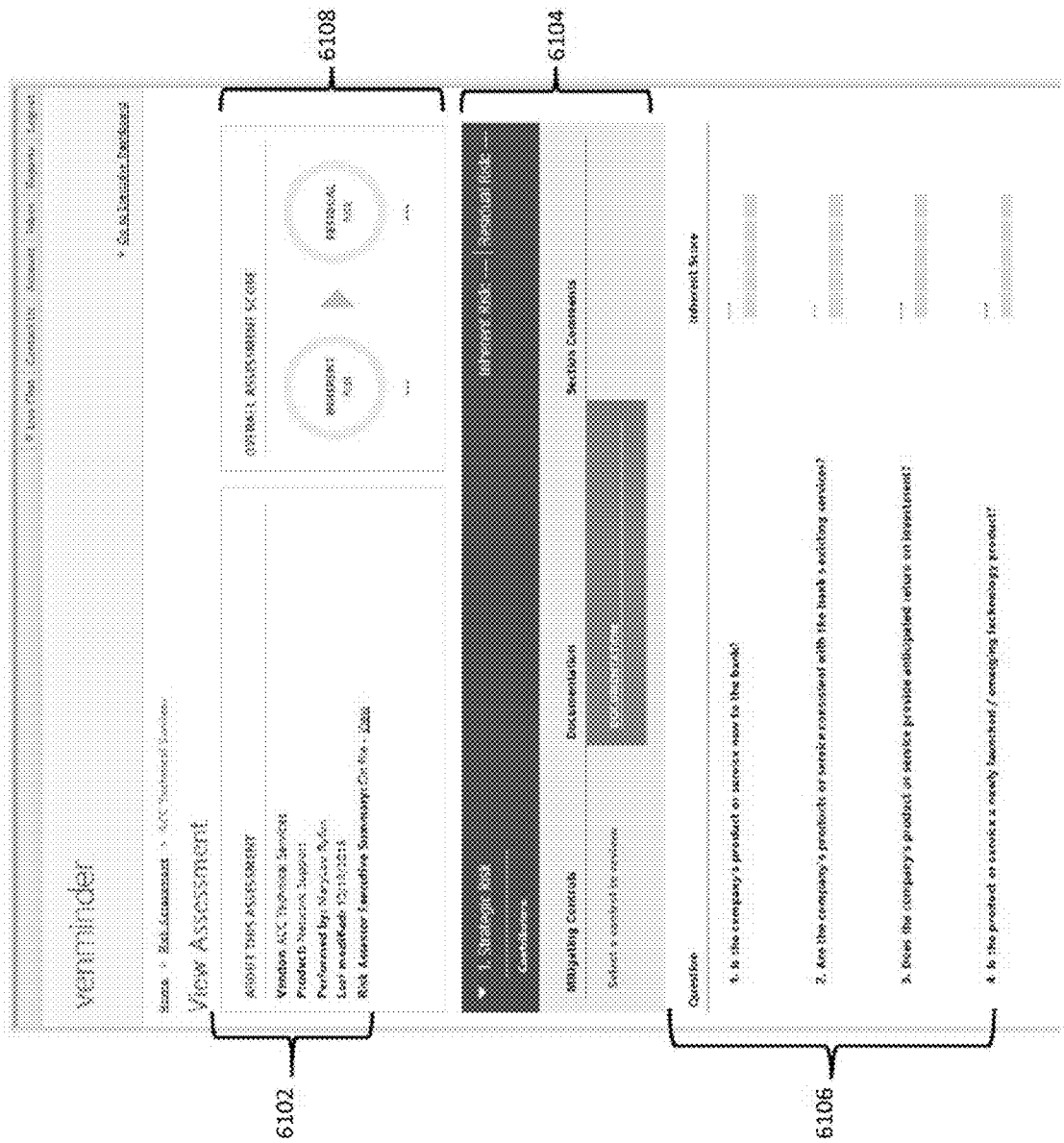
FIG. 61 is an example view assessment modal window in accordance with an embodiment of the invention.

FIG. 61 is an example view assessment modal window in accordance with an embodiment of the invention. In certain embodiments, this is a read only full page display of the Risk Assessment. It may include header information 6102, a panel for the current overall assessment score 6108, section headers 6104 to include scoring and residual mitigation (e.g., control) information, and questions/responses (e.g., workspace 6106). Closing this page can return a user to the In Progress grid.

Figure 62:
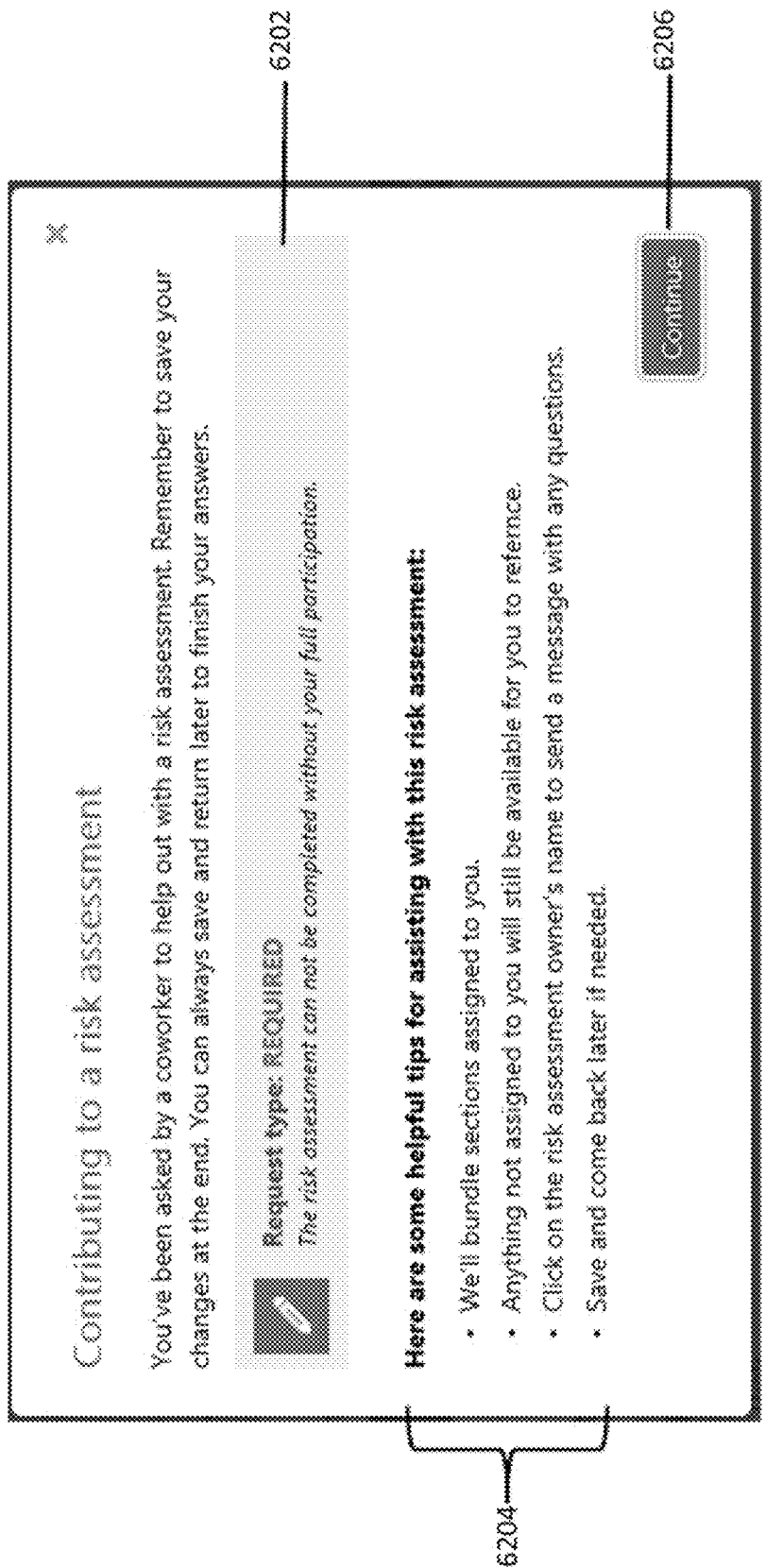
FIG. 62 is an example contributor modal window in accordance with an embodiment of the invention.

In certain embodiments, a user is a contributor. FIG. 62 is an example contributor modal window in accordance with an embodiment of the invention. Contributors may either already be a registered user of the software suite or they may have been added as a new user. Depending on their status, the text of the notification sent to them will direct them to either log in using existing credentials or to follow a link to create new credentials that they will use going forward. In certain embodiments, once credentialed, users may navigate to the Risk Assessment via one of two portals, e.g., on the Main Dashboard. The Risk Assessment Home page will show that there are Risk Assessments in progress. In certain embodiments, when a contributor selects the option to contribute to a Risk Assessment, they will be presented with the contributor modal window which comprises of their level of participation ("optional" or "required") (e.g., panel 6202) along with helpful tips list 6204 about how the information in the assessment will be presented to them. In certain embodiments, the user may select a continue button 6206 to proceed to the actual risk assessment questionnaire.

Figure 63:
FIG. 63 is an example contributor view workspace in accordance with an embodiment of the invention.

FIG. 63 is an example contributor view workspace in accordance with an embodiment of the invention. A summary can be presented in panel 6308. Contributors are presented with the sections assigned to them (e.g., panel 6302) to which they may or must contribute, e.g., depending on their participation level. Any unassigned sections of the assessment may also be listed (e.g., list 6304). In some embodiments, current scoring 6306 is displayed as is header/footer information and as a part of each section header. Sections may be expanded or collapsed by clicking on arrows adjacent to each section 6310. When the arrow adjacent to a section 6310 is selected, the section is expanded to allow the contributor to input responses to each question of the section.

Figures 64, 65:
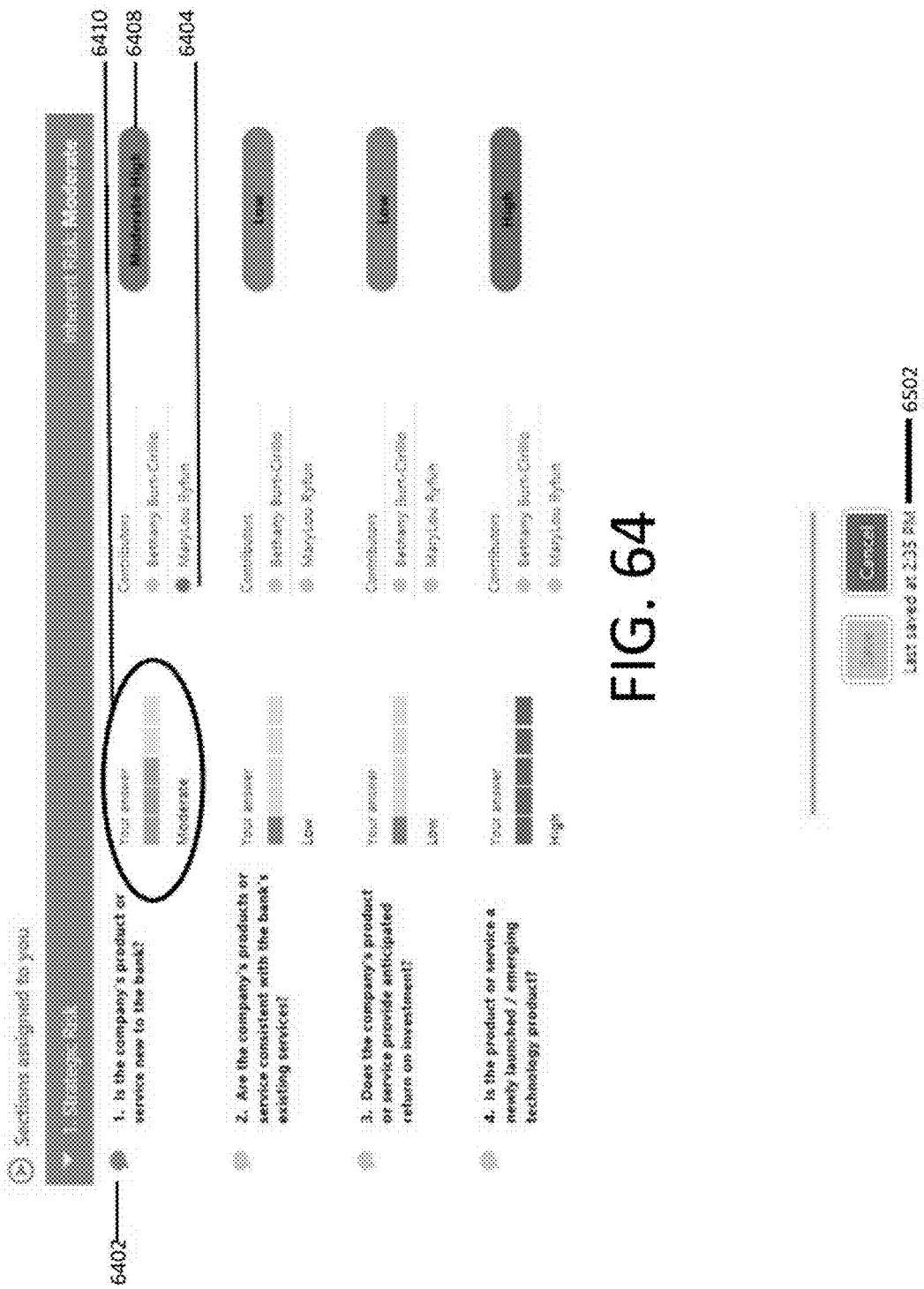
FIG. 64 is an example expanded contributor section view in accordance with an embodiment of the invention.
FIG. 65 is an example saved response display in accordance with an embodiment of the invention.

FIG. 64 is an example expanded contributor section view in accordance with an embodiment of the invention. In certain embodiments, question comments can be viewed/input (e.g., sample question 6402), and previous contributors are noted by their colored button 6404. In the exemplary embodiment of FIG. 64, the owner's answer appears under the contributors list as they have already provided a response to the first question. In an illustrative example, the contributor changed this answer from Moderate-High (see, e.g., field 6408) to Moderate (see, e.g., bar 6410). When the owner views this response, the button next to that contributor's name will be yellow to reflect this.

FIG. 65 is an example saved response display in accordance with an embodiment of the invention. In certain embodiments, upon save, the "last saved at" notation 6502 at the bottom of the page is updated. Contributors may save and edit as often as they wish until the assessment is marked as complete. In certain embodiments, the contributor button does not change color for the contributor; however, it will reflect those contributions and the owner will see the button (with the color attributed to input risk level) upon their review.

Figure 66:
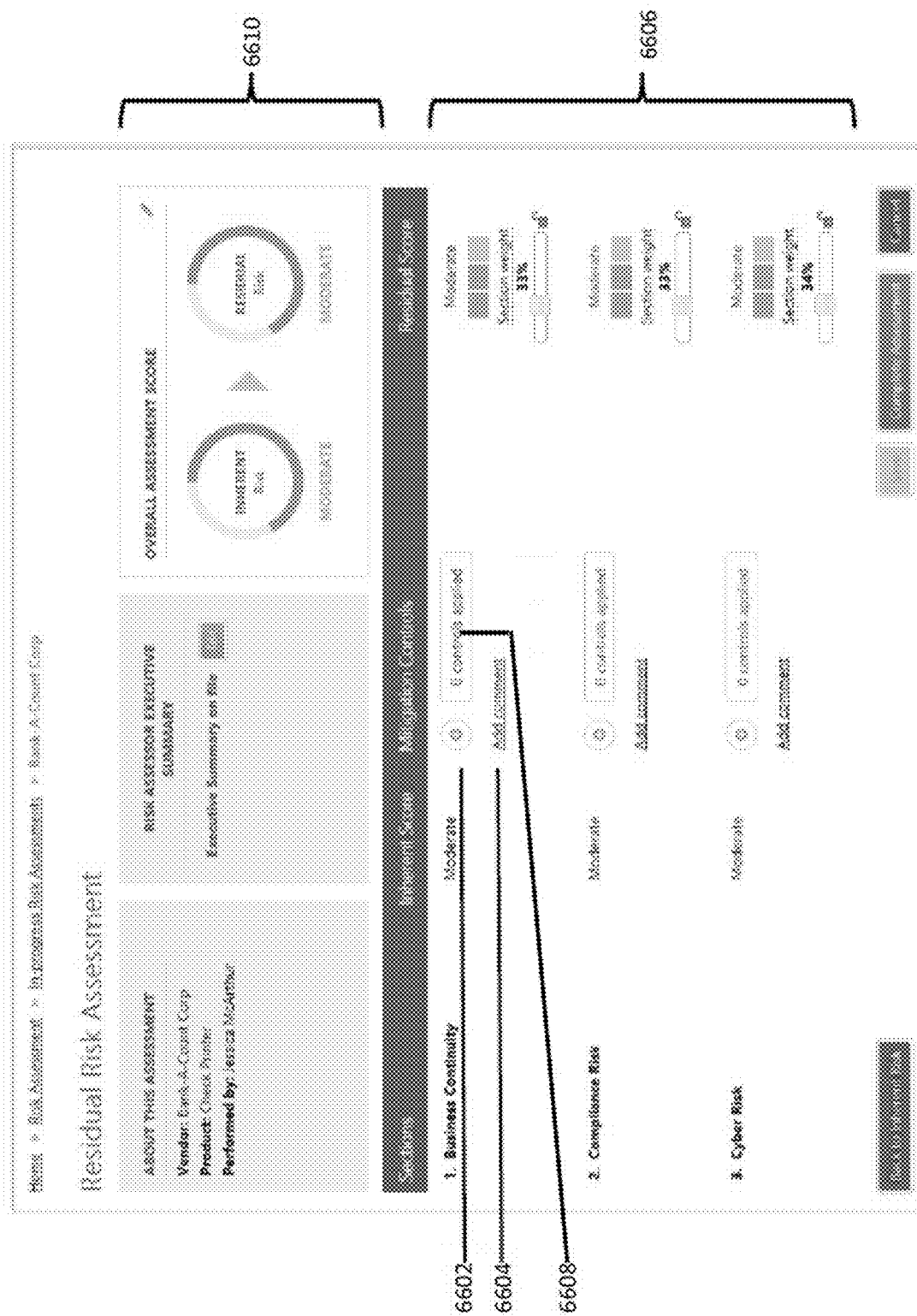
FIG. 66 is an example residual risk assessment workspace in accordance with an embodiment of the invention.

FIG. 66 is an example residual risk assessment workspace in accordance with an embodiment of the invention. In certain embodiments, residual risk assessment may be conducted after completion of inherent risk assessment. In certain embodiments, residual risk assessment may be conducted only after completion of inherent risk assessment. In some embodiments, a summary and/or overall assessment scores may be displayed, e.g., in residual risk header panel 6610. In certain embodiments, the owner may configure the template to include or not include residual risk assessment. In the exemplary embodiment of FIG. 66, the residual risk assessment workspace displays a header and section summary and allows users to enter the controls 6602 used to mitigate any inherent risk, to append any supporting documentation, to add comments (e.g., through link 6604), to adjust section weighting, and to change the residual score by moving one or more scroll bars 6606. In some embodiments, as controls are added, they will be listed in the controls applied area 6608 and the section will expand to accommodate the length of the list.

Figure 67:
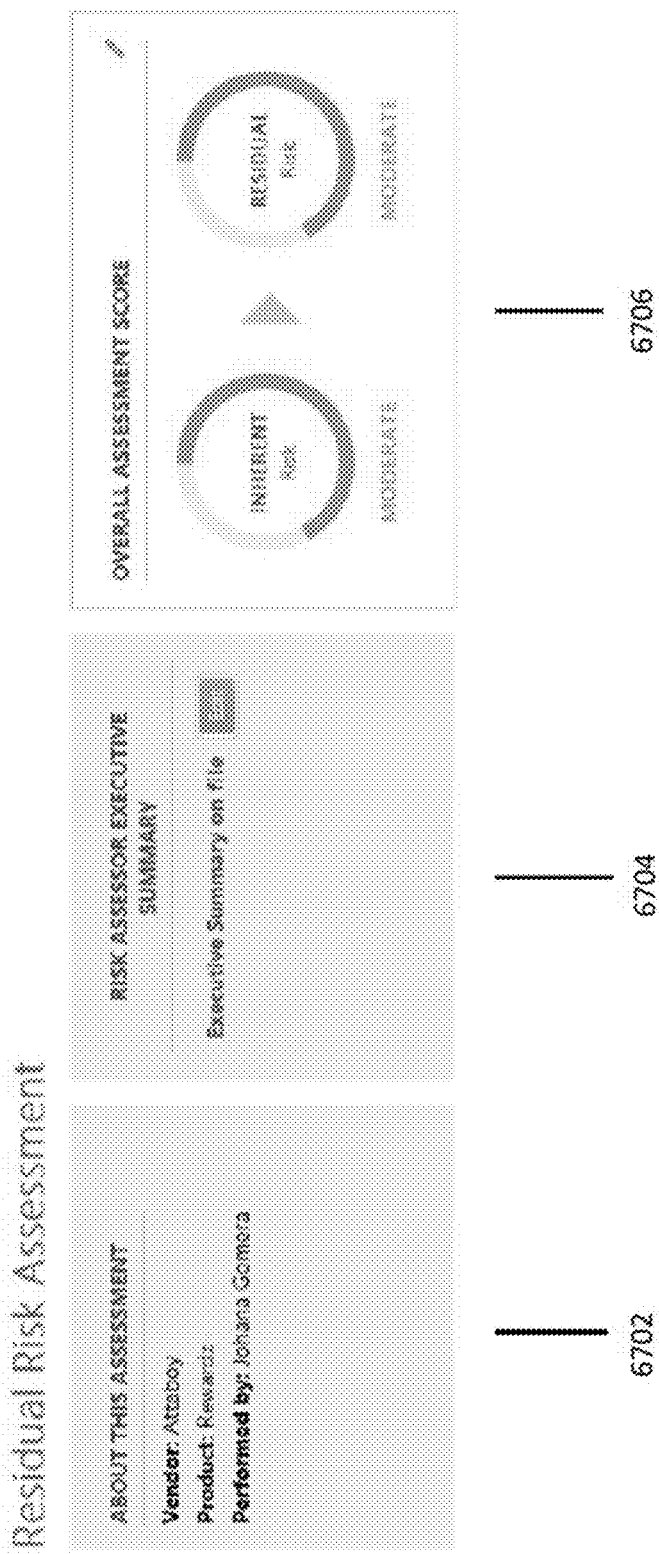
FIG. 67 is an example residual risk header in accordance with an embodiment of the invention.

FIG. 67 is an example residual risk header in accordance with an embodiment of the invention. In certain embodiments, the header may comprise basic information about the assessment (e.g., panel 6702), the ability to edit the executive summary (e.g., panel 6704), and a graphic to indicate both inherent and residual risk scores (e.g., panel 6706). In certain embodiments, the graphic/panel 6706 may reflect the overall scoring for each element of risk and may be color coded.

Figure 68:
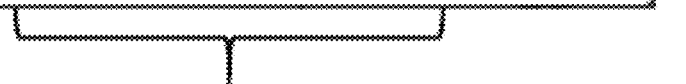
FIG. 68 is an example control selection modal window in accordance with an embodiment of the invention.

FIG. 68 is an example control selection modal ("Select Controls Modal") window in accordance with an embodiment of the invention. In certain embodiments, users may choose one or more controls to apply to the inherent risk for a section by selecting a plus icon within the section summary. These controls can be selected to mitigate the impact of any inherent risks identified. In certain embodiments, a list 6802 of selectable controls is displayed corresponding to controls identified as industry standard due diligence tasks performed to help assess overall risk factors. Additionally, users may add new controls (e.g., through link 6804) not appearing on this list that reflect their own best practices.

Figure 69:
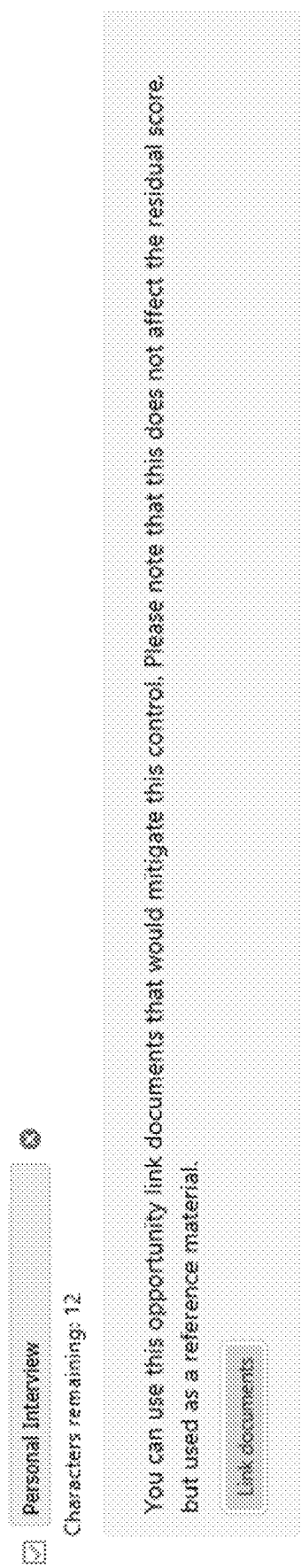
FIG. 69 is an example "add new control-name" workspace in accordance with an embodiment of the invention.

FIG. 69 is an example "add new control-name" workspace in accordance with an embodiment of the invention. In certain embodiments, new controls have a 30-character limit.

FIG. 70A is an example "add new control-link documents" workspace in accordance with an embodiment of the invention. In certain embodiments, a list of controls 7002 is displayed and a user may link documents to controls. In certain embodiments, the "add new control-link" documents workspace reflects the client's Document Storage folder structure, and the vendor/product folder of the entity being assessed is visible in the viewing frame.

FIG. 70B is an example "link documents" workspace in accordance with an embodiment of the invention. In certain embodiments, clicking on the top level folder will reveal all subfolders (e.g., in panel 7004) for a given product. In this way, users may search for anything that has been uploaded to their Document Storage area (e.g., systematically or manually) and attach it to their risk assessment.

FIG. 70C is an example "link documents-confirmation" modal window in accordance with an embodiment of the invention. In certain embodiments, upon document selection, the link documents confirmation modal window will appear (e.g., comprising list 7006) prompting the user to verify that the appropriate document has been selected. In certain embodiments, when closed, the user is returned to the control selection modal where they can submit their entry. All selected controls will allow the user to link documents in this way, whether they are controls added by the user or are selected from the preset list.

Figure 71A:
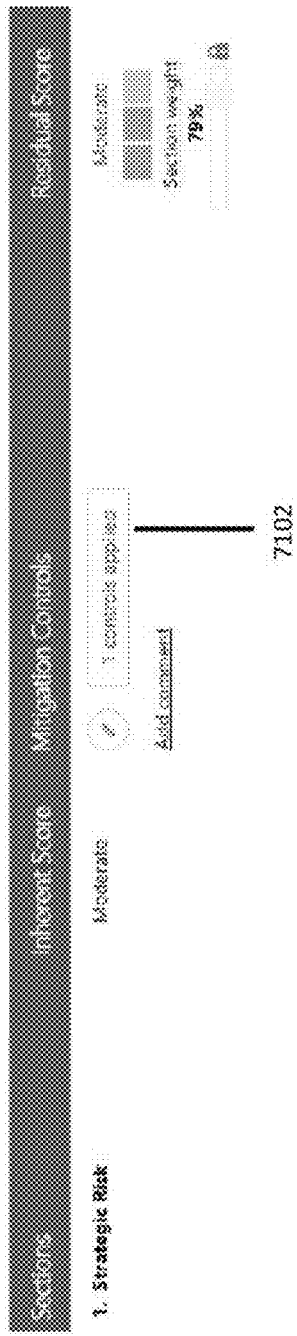
FIG. 71A is an example controls applied workspace in accordance with an embodiment of the invention.

FIG. 71A is an example controls applied workspace in accordance with an embodiment of the invention. In certain embodiments, the number of controls applied 7102 is reflected for that section. In certain embodiments, clicking this notation causes the control selection modal window to display with the appropriate controls checked and the linked documents listed beneath them.

Figure 71B:
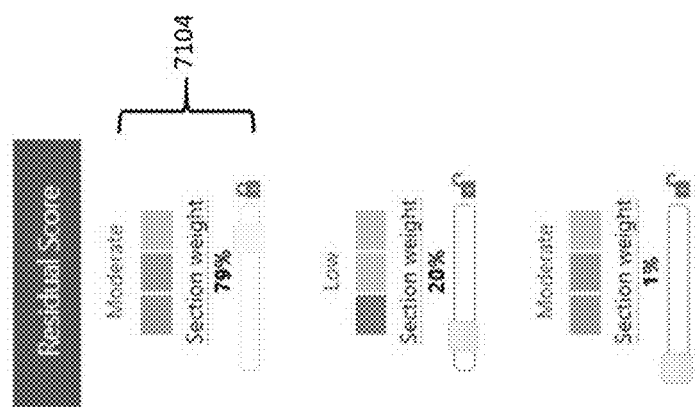
FIG. 71B shows a closer view of the adjustment section of the Residual Risk Assessment workspace shown in FIG. 66.

FIG. 71B shows a closer view of the adjustment section of the Residual Risk Assessment workspace shown in FIG. 66. In certain embodiments, users may adjust the residual score (e.g., bar/slider 7104) of a section based on a number of factors, including the weight applied to any section and the number and type of mitigating controls applied to it. In certain embodiments, certain rules may apply such as: a new residual score may not result in a higher score than that calculated for inherent risk. In certain embodiments, a user can lock a score and the bar beneath the rating scale will be grayed out. In certain embodiments, adjusted scores are reflected in real time on the header graphic for this page.

FIG. 72A is an example of a submission approval modal window in accordance with an embodiment of the invention. In certain embodiments, as part of a client's setup, users may be assigned the role of Approver. If users (e.g., Enterprise Admins) have established that approvals are ON for the client, then upon completion of a risk assessment (all questions answered, all contributors contributed, inherent or inherent+residual portions done), this "submission approval modal" window becomes active and the user may choose to submit the risk assessment. When submit is chosen, the submission approval modal window modal appears displaying a list 7202 all of the users at the institution who have been identified as approvers. In certain embodiments, users must select one or more approvers from the list 7202.

FIG. 72B is an example approver confirmation modal window in accordance with an embodiment of the invention. In certain embodiments, after approver(s) have been selected by the user, the approver confirmation modal window is presented to confirm this action that lists all approvers selected along with their email addresses.

Figure 73A:
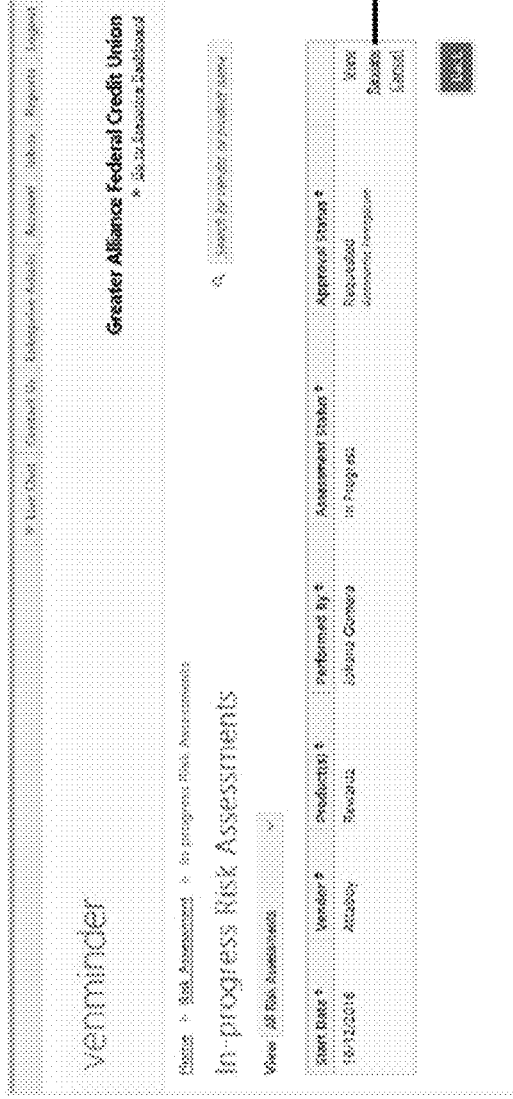
FIG. 73A is an example approver view in accordance with an embodiment of the invention.

FIG. 73A is an example approver view in accordance with an embodiment of the invention. In certain embodiments, approvers are presented with a list 7302 of all in-progress risk assessments or may filter to view only those risk assessments for which they are required approvers. In certain embodiments, approvers are presented with options for each risk assessment including view only, review for approval, and cancel.

Figure 73B:
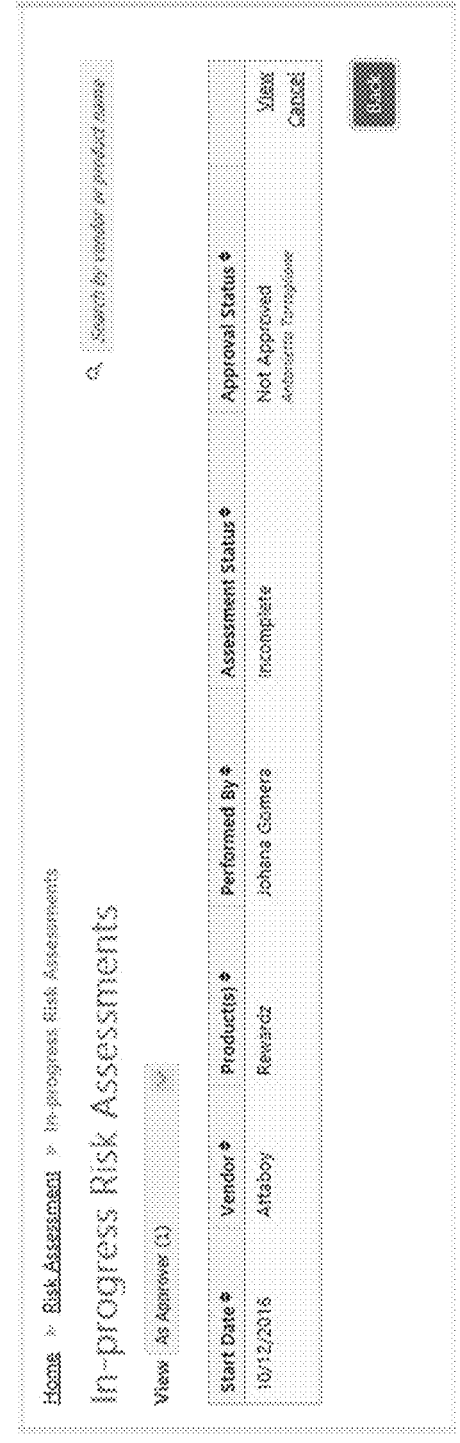
FIG. 73B is another example of an in-progress risk assessment grid in accordance with an embodiment of the invention.

FIG. 73B is another example of an in-progress risk assessment grid in accordance with an embodiment of the invention. In certain embodiments, when a risk assessment has not been approved (e.g., it has been disapproved) it remains visible on the in-progress risk assessment grid and displays a "not approved" status along with the approver's name.

Figure 74:
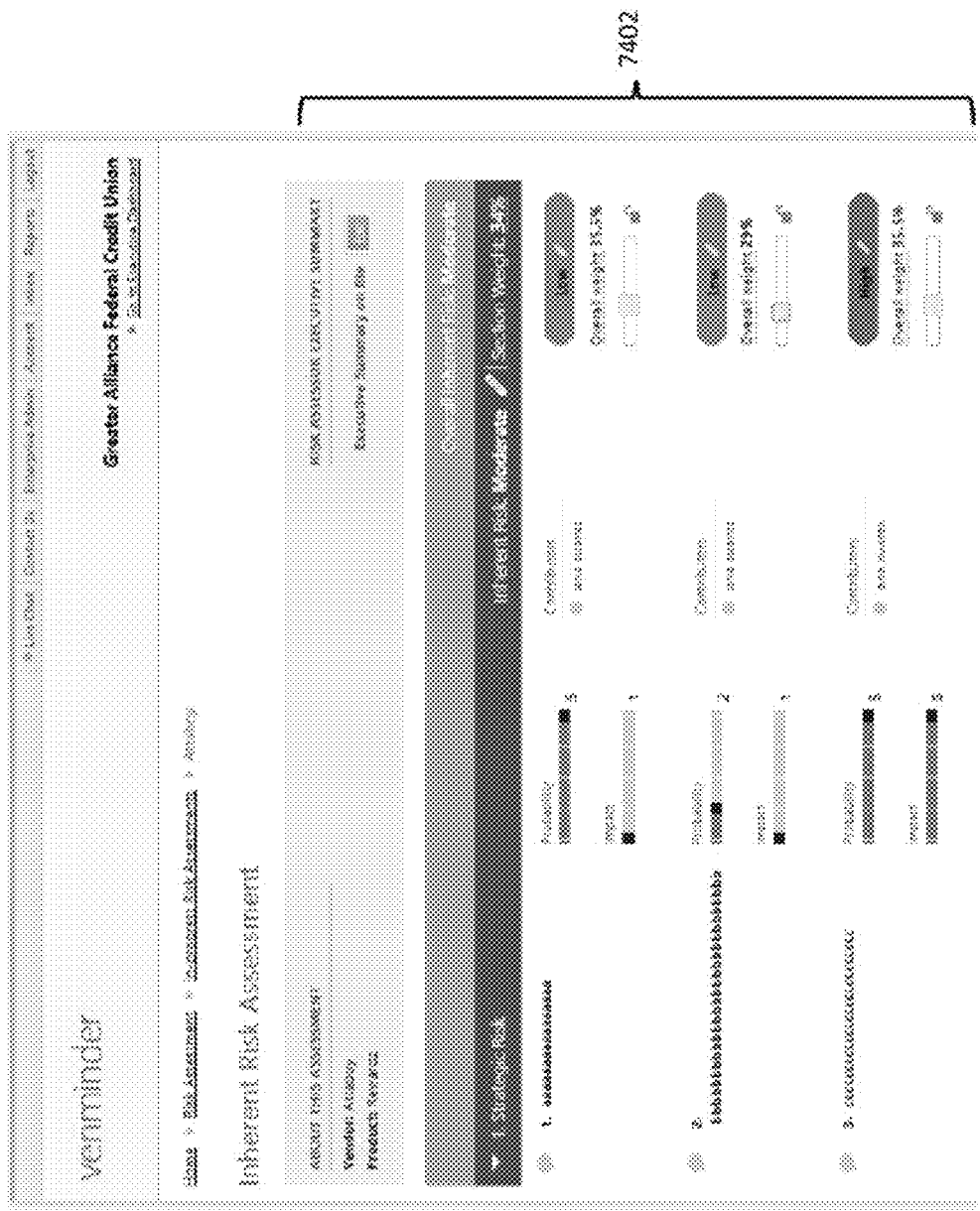
FIG. 74 is an example approver risk assessment workspace in accordance with an embodiment of the invention.

FIG. 74 is an example approver risk assessment workspace in accordance with an embodiment of the invention. In certain embodiments, the approver's view is identical to that of a contributor. Approvers may perform a range of edits and overrides on the interface 7402 to the information presented within a risk assessment, including: edit executive summary, edit section and question weights, lock question weights, edit question and section scoring, edit question responses regardless of answer format (e.g., probability-impact, yes/no, multiple choice, etc.). In certain embodiments, if an approver proceeds from inherent to residual risk assessment, the inherent risk portion of the assessment will be "frozen" such that any contributors that have not yet contributed to the risk assessment will be precluded from doing so.

Figure 75A:
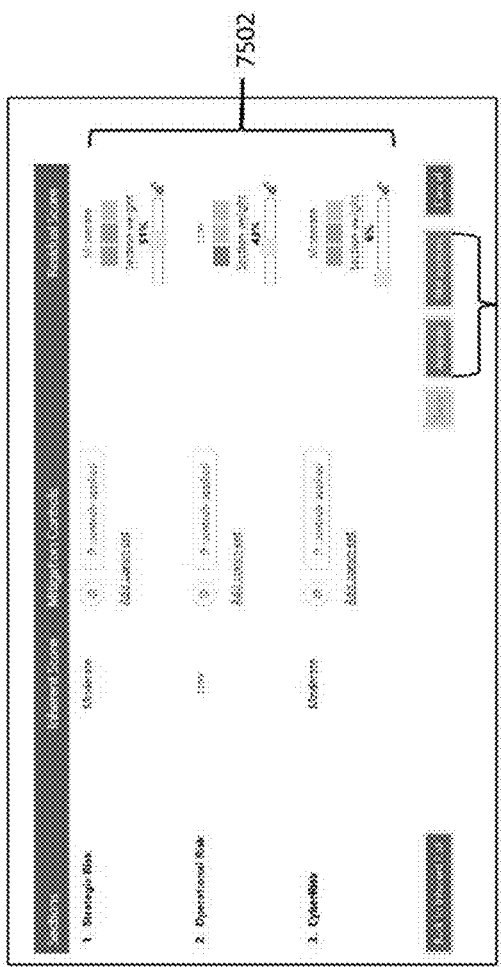
FIG. 75A shows a closer view of the example approver risk assessment workspace in accordance with an embodiment of the invention.

FIG. 75A shows a closer view of the example approver risk assessment workspace in accordance with an embodiment of the invention. Approvers may edit final scoring (e.g., bar/slider 7502), weights, and/or add controls and comments. Approvers are presented with option buttons 7504, including the options to approve or not approve the risk assessment. In certain embodiments, selection of the approve option or not approve option causes the module to display an approval confirmation modal window or a disapproval confirmation modal window, respectively.

Figure 75C:
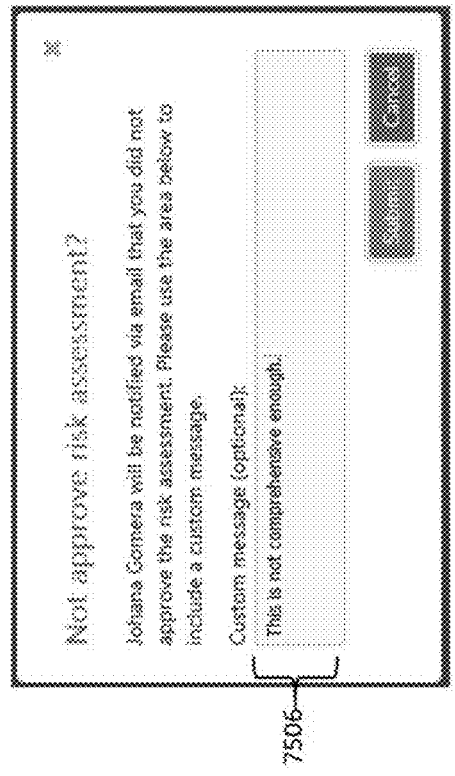
FIG. 75C is an example disapproval confirmation modal window in accordance with an embodiment of the invention.
Figure 75B:
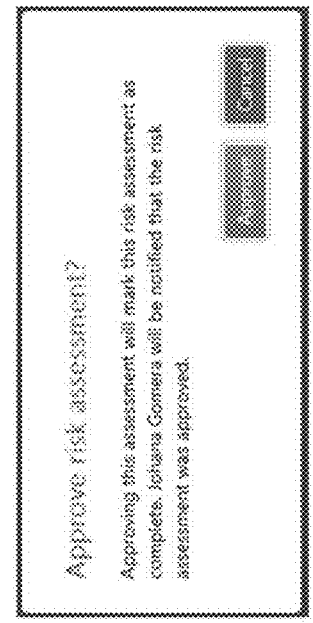
FIG. 75B is an example approval confirmation modal window in accordance with an embodiment of the invention.

FIG. 75B is an example approval confirmation modal window in accordance with an embodiment of the invention.

FIG. 75C is an example disapproval confirmation modal window in accordance with an embodiment of the invention. In certain embodiments, the disapproval confirmation modal window comprises a section 7506 into which the approver can input comments that will be visible, e.g., to the risk assessment owner.

Figure 76:
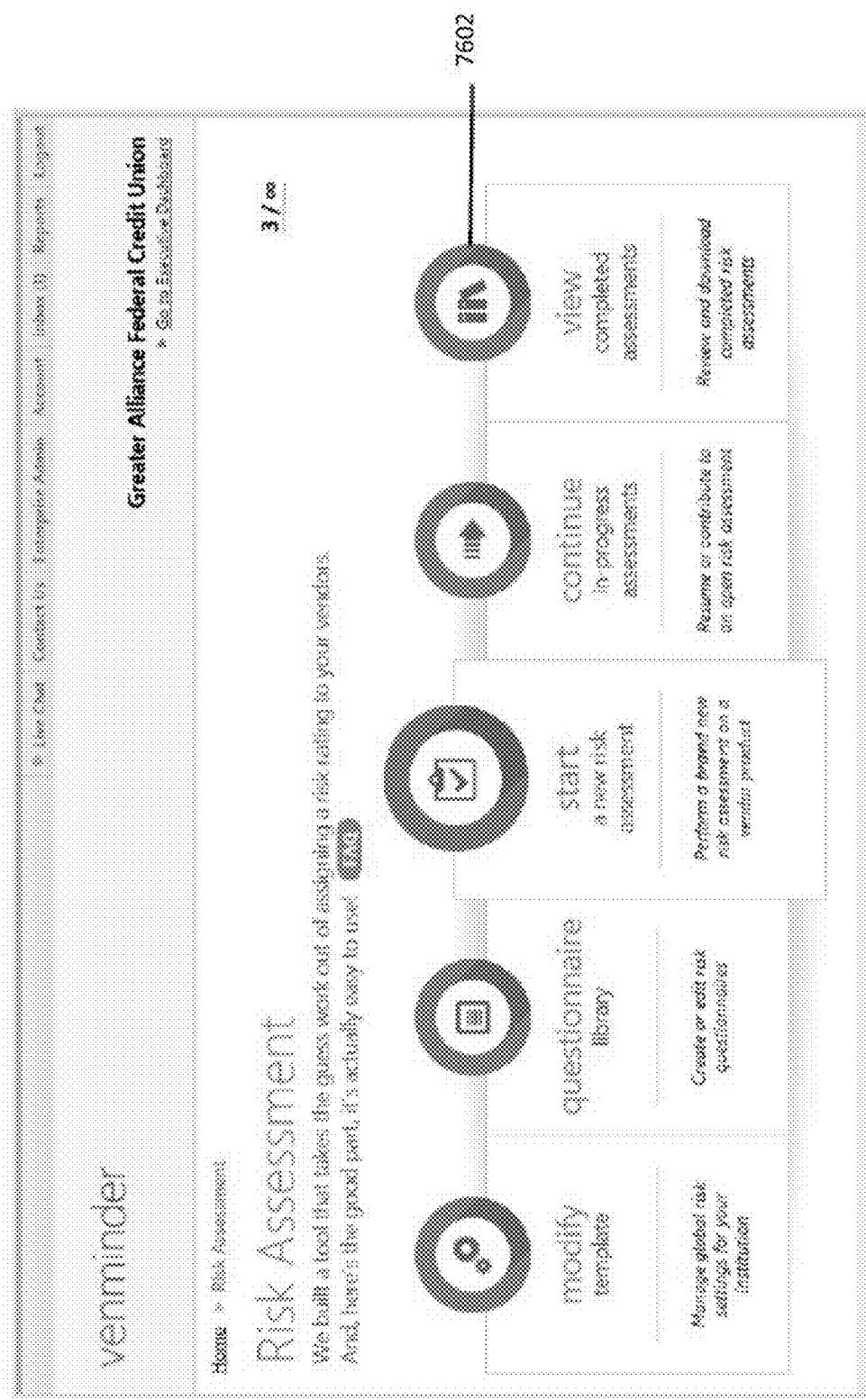
FIG. 76 is another example of a Risk Assessment Home page in accordance with an embodiment of the invention.

FIG. 76 is another example of a Risk Assessment Home page in accordance with an embodiment of the invention. In certain embodiments, completion of a risk assessment and, if required, approval by an approver, the risk assessment becomes available for review in the assessment viewing module, e.g., by selecting the view tile 7602 on the Risk Assessment Home page.

Figure 77:
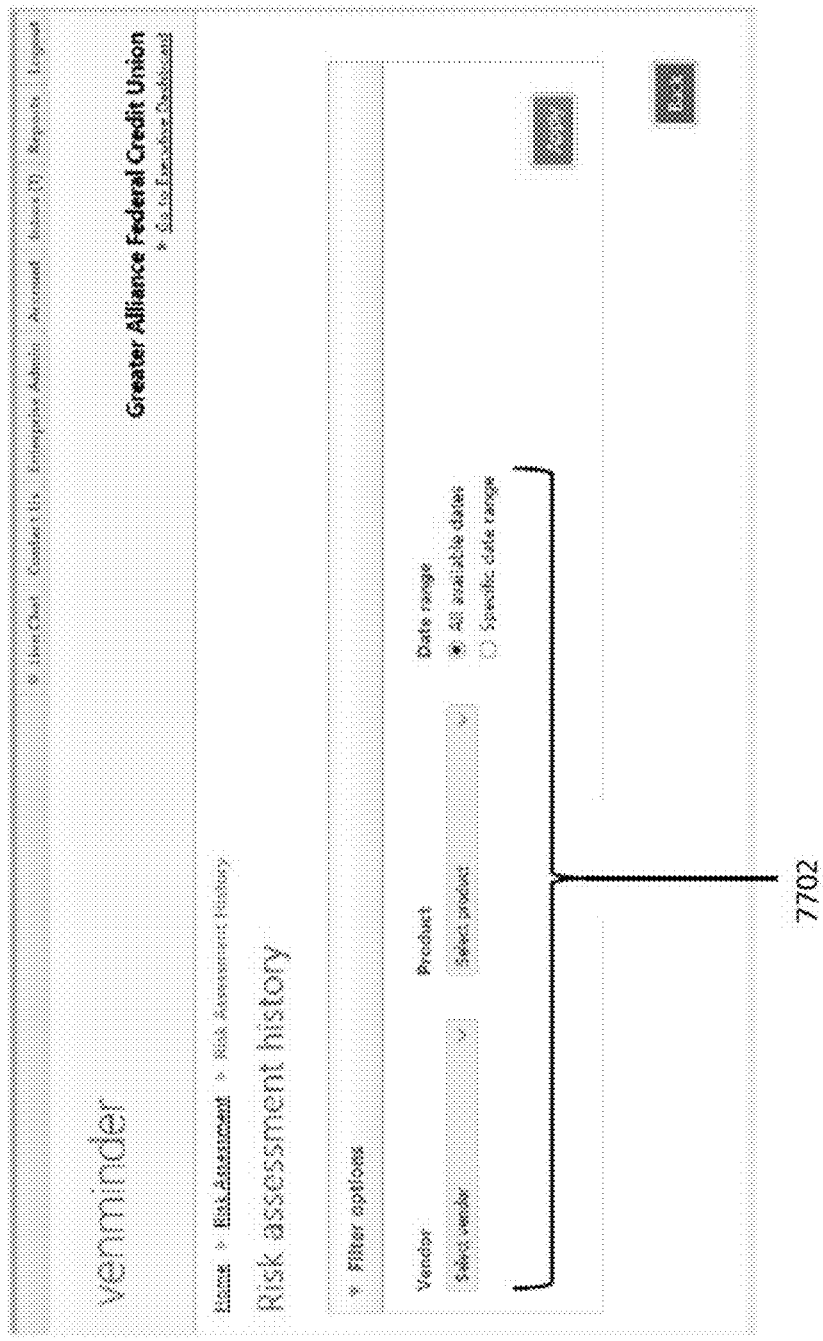
FIG. 77 is an example of filter options available for reviewing completed risk assessments in accordance with an embodiment of the invention.

FIG. 77 is an example of filter options available for reviewing completed risk assessments in accordance with an embodiment of the invention. In certain embodiments, users may filter by one or more filters 7702 completed risk assessments by all or one available vendors, all or one available products, and all available dates or a limited date range in which to search for completed risk assessments. In certain embodiments, all three filters default to "all." Once the filters 7702 have been applied, the filter portion of the screen will collapse and all completed risk assessments meeting the filter criteria will be displayed as part of a completed risk assessment grid.

Figure 78:
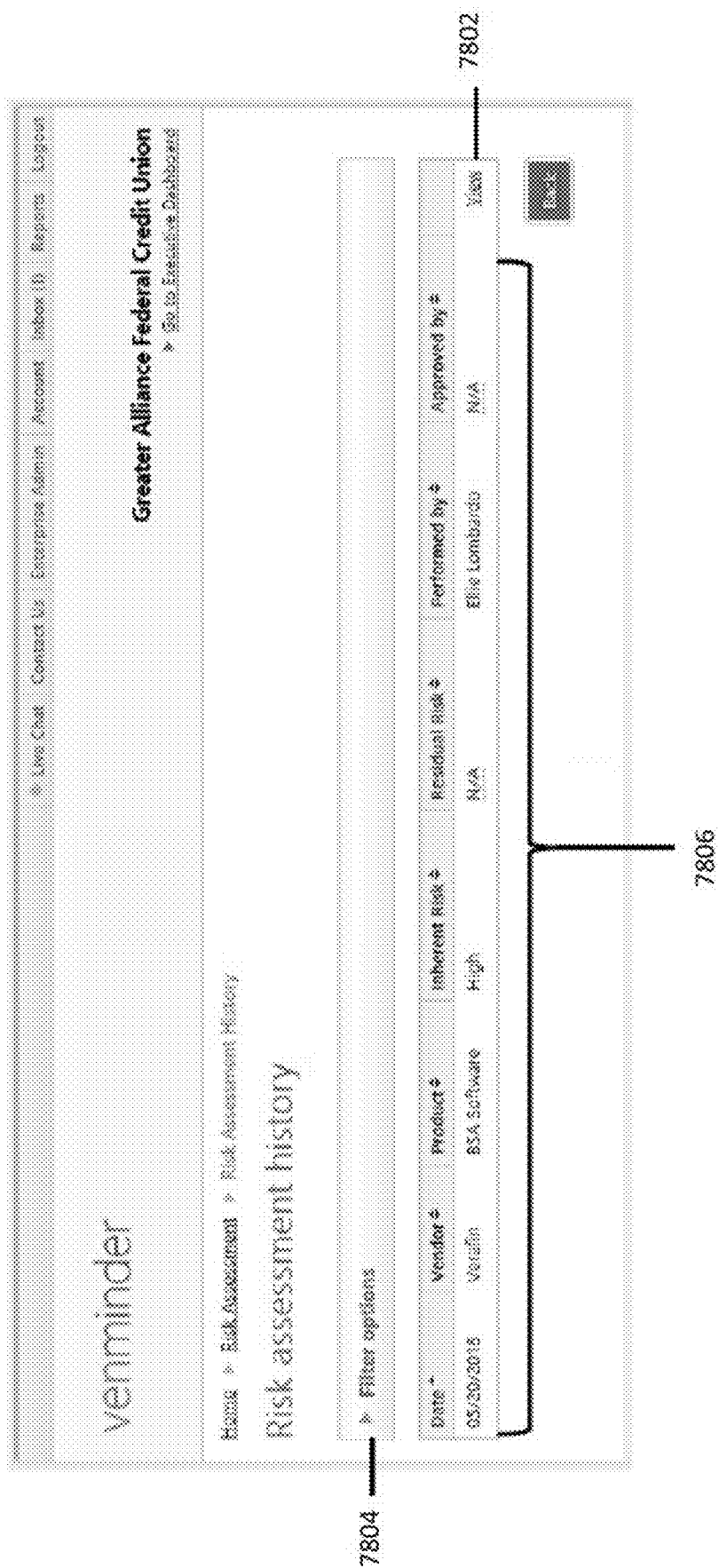
FIG. 78 is an example completed risk assessment grid in accordance with an embodiment of the invention.

FIG. 78 is an example completed risk assessment grid in accordance with an embodiment of the invention. In certain embodiments, all columns 7806 of the completed risk assessment grid are sortable. In certain embodiments, column headings that do not apply, such as Residual Risk or Approved by, will display as N/A. In certain embodiments, all completed risk assessments may be accessed through this history grid. Clients may have assessments that were performed prior to the implementation of this module; in certain embodiments, those will undergo a conversion process and will be viewable through this module post-conversion. In certain embodiments, when a user selects the View option (e.g., link 7802), a pdf download is created that can be saved, opened and reviewed. The user may update their filter selections by clicking on the arrow appearing in the header 7804. This can expand the filters and enable them to be changed.

Calendar Notifications: In the preferred embodiment, a calendar item is created for any risk assessment that is due (the date having been set based on when the previous risk assessment was completed plus one year). This item can be included in a user's regular weekly notifications/reminders email as an entry. Calendar items can appear on the Main Dashboard page within the calendar widget of the software suite. In certain embodiments, the weekly notification email is sent to active users, e.g., every Wednesday as a reminder of outstanding notifications that are still active for them.

News and Alerts: In certain embodiments, contributors can be sent a News and Alert item upon being invited to contribute to a risk assessment, e.g.: '[Owner Name] is asking for your help on a risk assessment for [Vendor Product Name]' with a link to contribute. In certain embodiments, this News and Alert is triggered by the Send Invitations action that appears when creating or editing a questionnaire. In certain embodiments, this alert will be updated if the linked risk assessment has been marked as complete, so as not to cause the contributor to attempt to update completed questionnaires.

Emails: There are a variety of user notifications associated with the Risk Assessment process. In certain embodiments, these user notifications may take the form of emails. A table of exemplary notifications associated with the Risk Assessment process is provided below in Table 7.

TABLE 7

| Email | Description | Trigger | Comment |
|---|---|---|---|
| Contributor Invitation-New User | For contributors added within the contributor modal | New user is added, then selected, then the selection is applied | Includes link with credentials to help the new user set up their account for access |
| Contributor Invitation-Existing User | For contributors selected from the existing list within the contributor modal | Existing user is added, then selected, then the selection is applied | Includes link to existing login screen to which the user already has access |
| Contributors Not Contributing | Notifies owner when contributors have not performed the work requested of them | First initiated two weeks after initial invitation sent, batched daily thereafter | Owner receives daily email to include all contributors across all risk assessments |
| All Contributions Completed | Notifies owner that all contributors have completed their tasks | Last contributor in list (optional or required) supplies their input and Saves it | Serves as a reminder to the owner that they can mark their risk assessment as complete |
| Approval Request | For users that have been earmarked as an approver on a risk assessment | User completes and submits assessment for approval | |
| Reminder to Approver | Sent to approvers who have outstanding approver tasks to complete | Initiated two weeks after initial approval request sent; batched daily thereafter | |
| Risk Assessment Approved | Approver has approved the assessment | Approver selects Approve button and submits | Can include optional comments |
| Risk Assessment Not Approved | Approver has not approved the assessment | Approver selects Not Approve button and submits | Can include optional comments |

Figure 79:
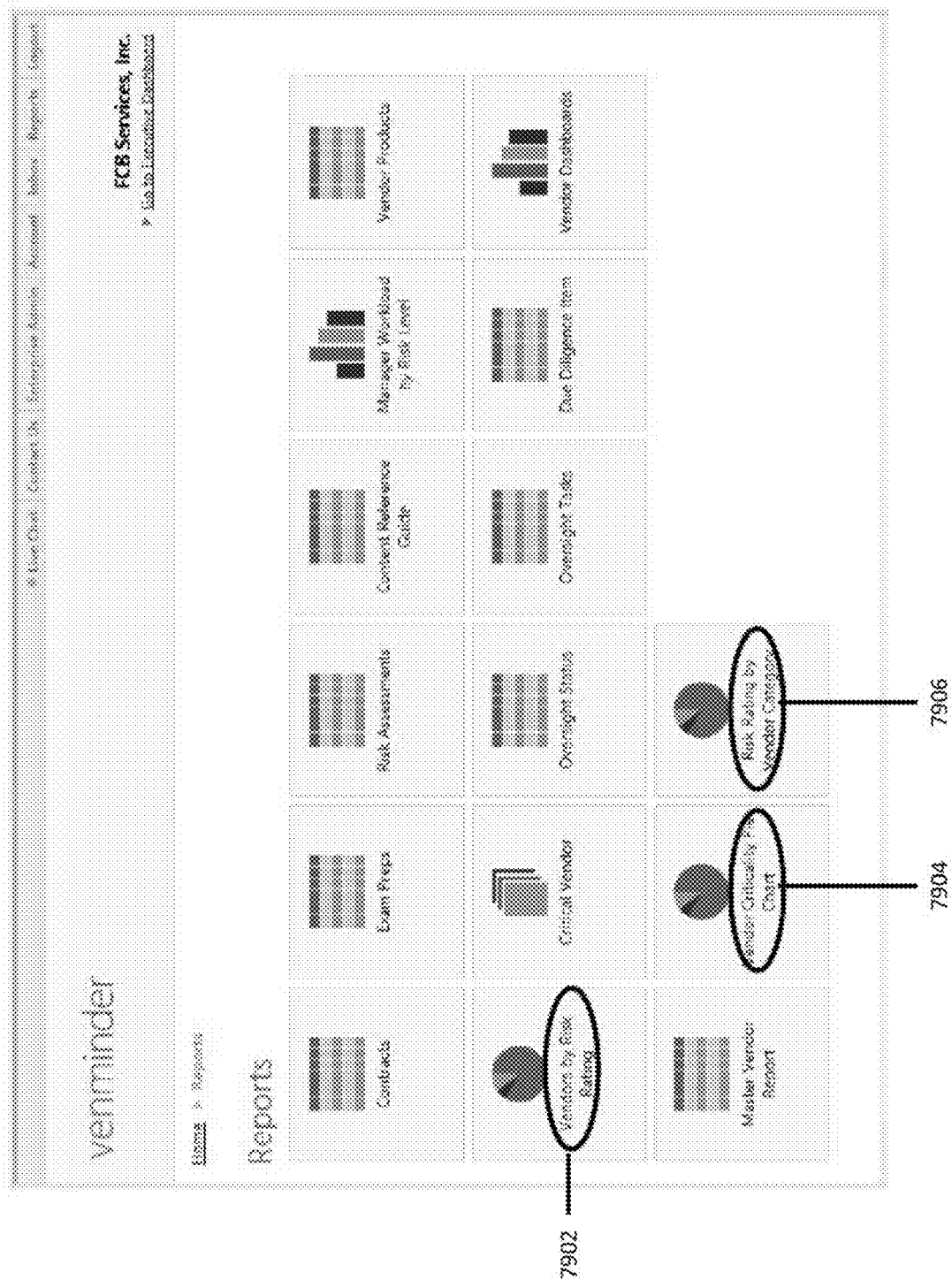
FIG. 79 is an example reports interface in accordance with an embodiment of the invention.

Reports: In certain embodiments, users may view completed risk assessments and historical risk assessments by accessing the reports module. FIG. 79 is an example reports interface in accordance with an embodiment of the invention. In certain embodiments, the reports interface displays a number of tiles from which the user may select, including a "vendors by risk rating" tile 7902, a "vendor criticality pie chart" tile 7904, and a "risk rating by vendor category" tile 7906.

Figure 80A:
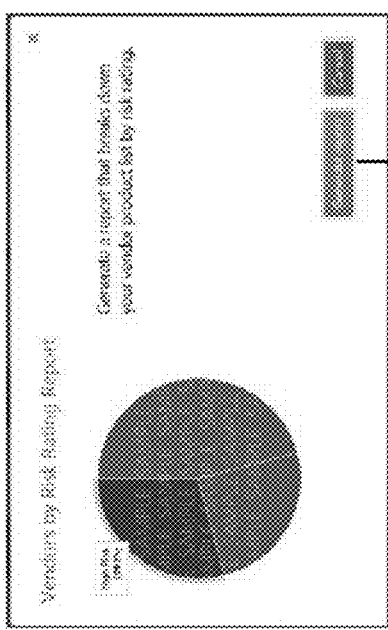
FIG. 80A is an example vendors by risk rating modal window in accordance with an embodiment of the invention.

FIG. 80A is an example vendors by risk rating modal window in accordance with an embodiment of the invention. In certain embodiments, selection of the vendor by risk rating tile 7902 causes the system to display the vendors by risk rating modal window. In certain embodiments, the user may select a generate report button 8002 to display a pie chart and data grid enumerating figures supporting the chart.

Figure 80B:
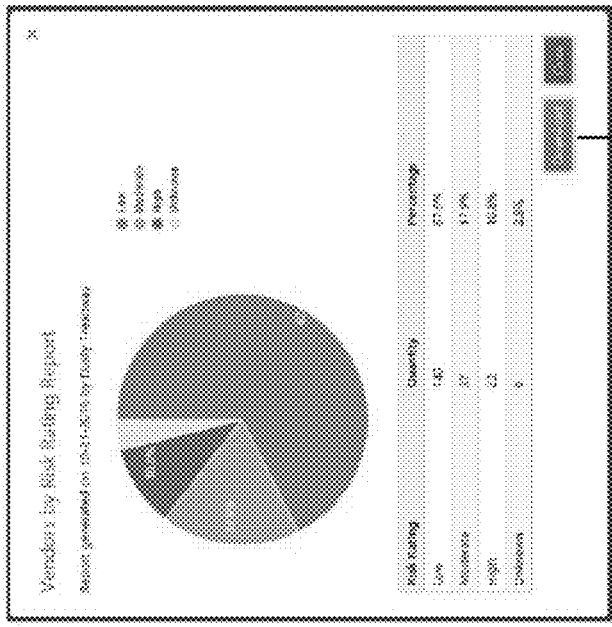
FIG. 80B is an example report preview in accordance with an embodiment of the invention.

FIG. 80B is an example "vendors by risk rating" report preview in accordance with an embodiment of the invention. In certain embodiments, a user may select a download button 8004 to generate a pdf of the data grid.

Figure 80C:
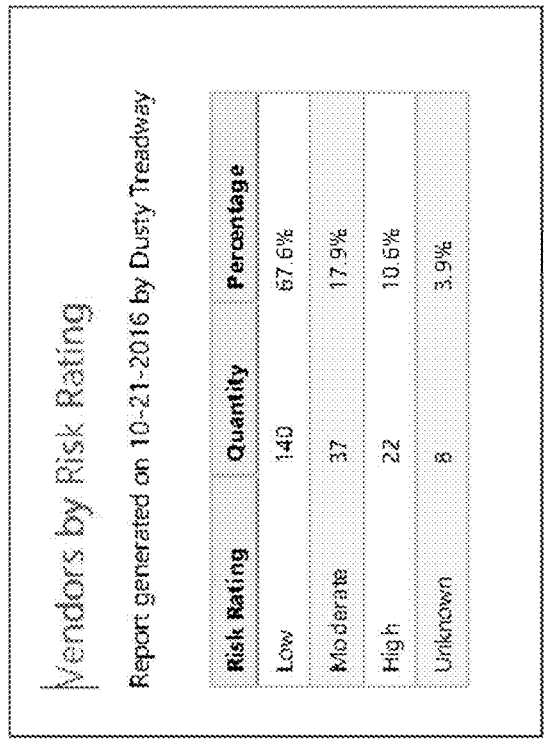
FIG. 80C is an example PDF report displaying vendors by risk rating in accordance with an embodiment of the invention.

FIG. 80C is an example PDF report displaying vendors by risk rating in accordance with an embodiment of the invention.

Figure 81B:
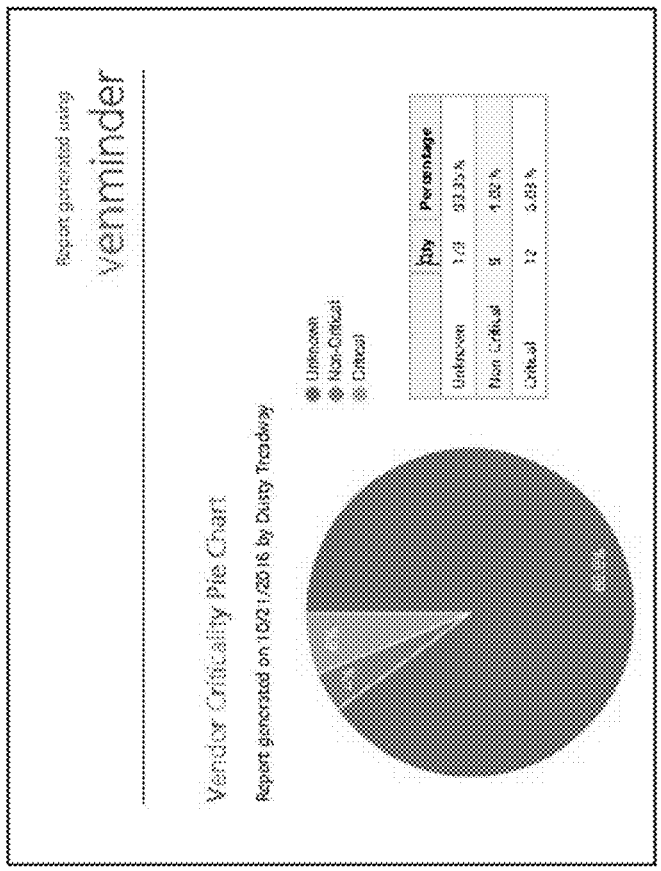
FIG. 81B is an example PDF report displaying the vendor criticality pie chart and data grid in accordance with an embodiment of the invention.
Figure 81A:
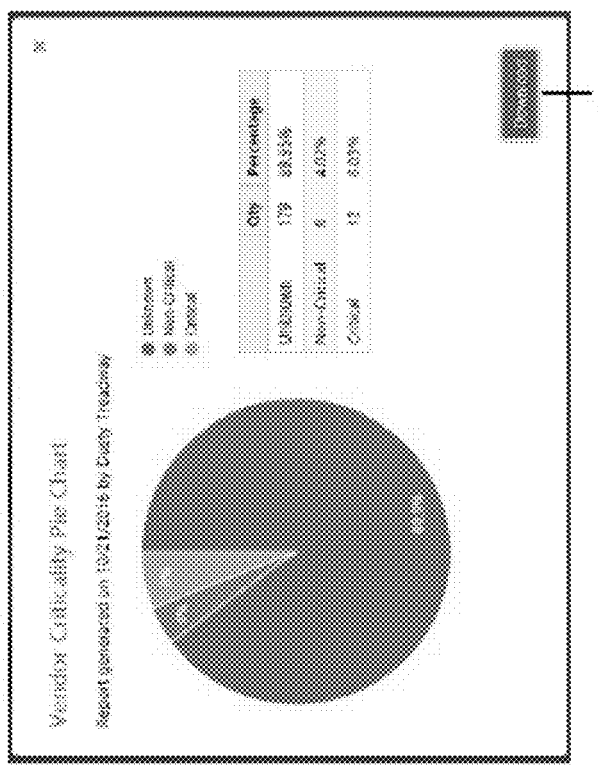
FIG. 81A is an example vendor criticality pie chart in accordance with an embodiment of the invention.

FIG. 81A is an example vendor criticality pie chart in accordance with an embodiment of the invention. In certain embodiments, each vendor is assigned a critical or non-critical flag. This categorization is designed to assist risk managers who need to determine which vendors require an assessment due to the critical nature of the product or service they provide. In certain embodiments, the user can select the download button 8102 to generate a pdf of the pie chart and data grid.

FIG. 81B is an example PDF report displaying the vendor criticality pie chart and data grid in accordance with an embodiment of the invention.

Figure 82:
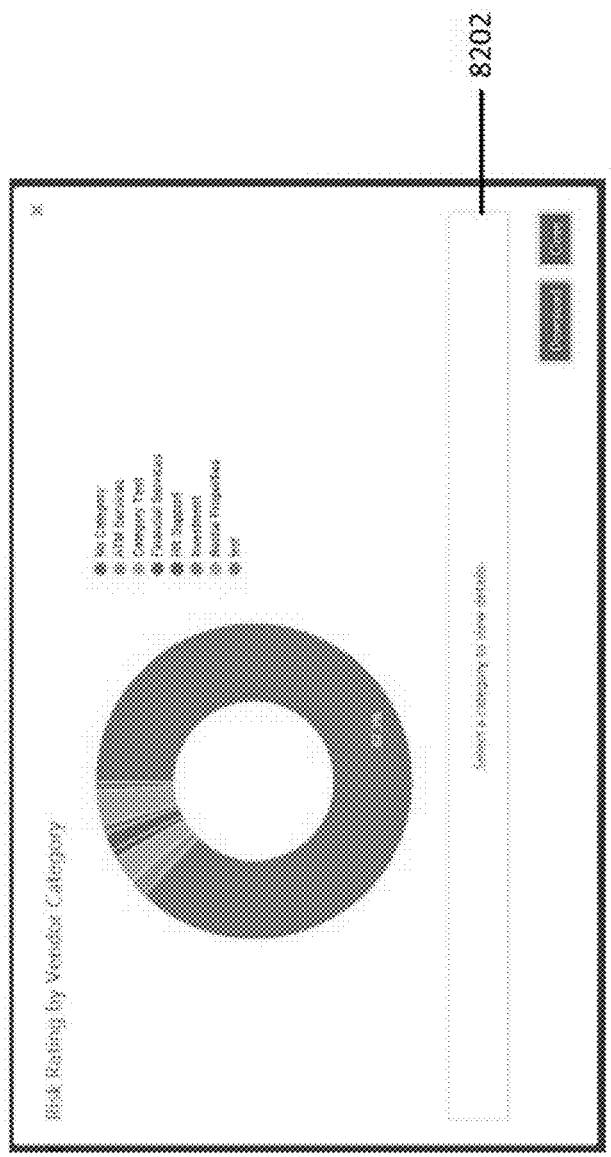
FIG. 82 is an example report of risk rating by vendor category in accordance with an embodiment of the invention.

FIG. 82 is an example report of risk rating by vendor category in accordance with an embodiment of the invention. In certain embodiments, a donut chart is displayed which represents all reviewed vendors by FI-defined vendor category with the associated color-key. The number of categories is dependent upon the number of categories established by the FI itself as it adds its vendors. This may result in a fair number of discrete categories with a correspondingly large key. In certain embodiments, hovering over the outer edge of any section will reveal a "fly-out" that reveals the category name, the number, and the percentage of total vendors that this category represents. In certain embodiments, a user may select a category to view details by clicking button 8202.

Figure 83B:
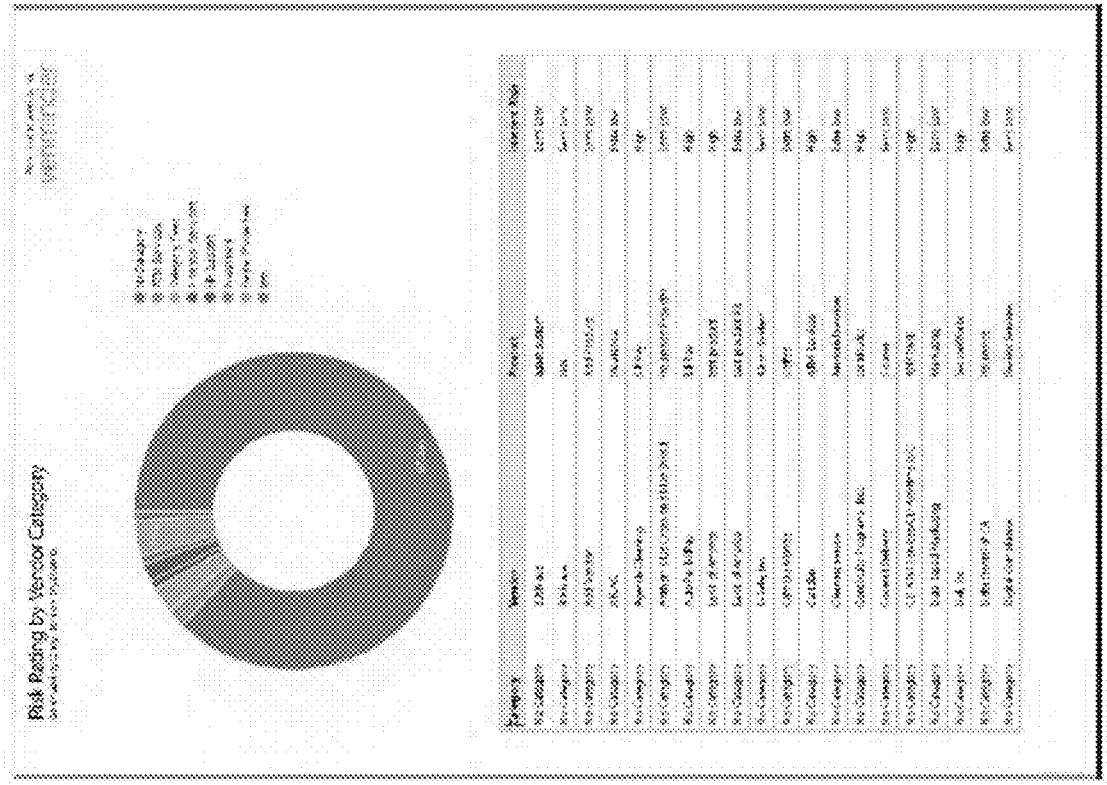
FIG. 83B is an example PDF report representing risk rating by vendor category.
Figure 83A:
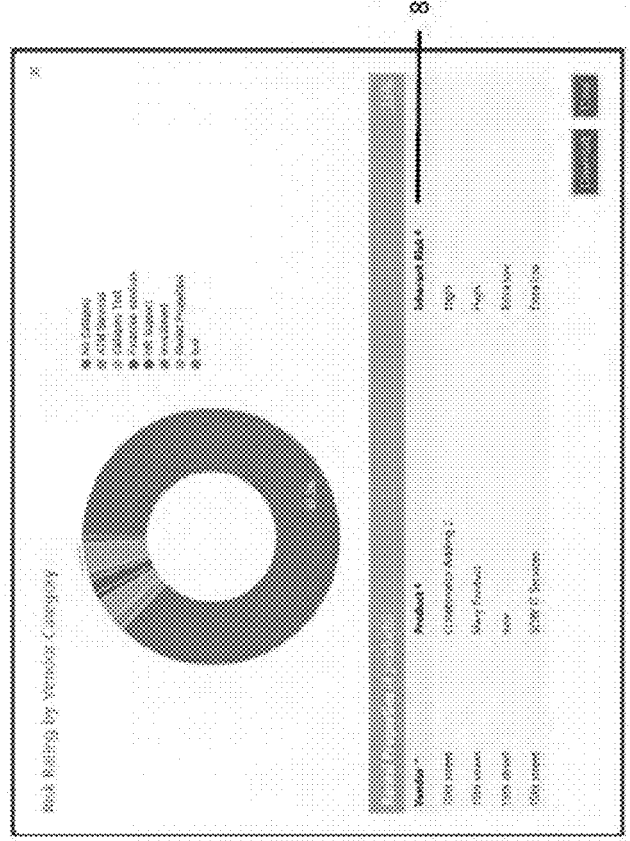
FIG. 83A is another example report representing a risk rating by vendor category in accordance with an embodiment of the invention.

FIG. 83A is another example report representing a risk rating by vendor category in accordance with an embodiment of the invention. In this embodiment, a data grid is revealed beneath the donut chart for a selected category indicating vendor, product, and risk rating 8302. For risk assessments involving residual as well as inherent risk, a column for residual risk can also be displayed.

FIG. 83B is an example PDF report representing risk rating by vendor category.

Exemplary Steps for Set Up and Performance of a Risk Assessment

An exemplary step-by-step set of instructions to set up and perform an exemplary risk assessment in accordance with certain embodiments of the present invention is given below:

1. As an Enterprise Admin, a client user can select a setting to determine if all Risk Assessments performed by the FI will require Approvals.

2. Upon first entering a module (a.k.a. Onboarding), an FI user can select one of three options depending upon how mature the FI's Risk Assessment processes are. They range from getting most everything set up for the user by the application to having complete control over the template, questionnaires, and settings for all Risk Assessments.

3. A Template may be required. This exemplary template consists of a set of global variables that apply to all questionnaires created by the FI. They include, but are not limited to: type of question response, executive summary, inherent+residual risk assessment, range of results (e.g., 3 to 5), question weights, etc.

4. Once a template has been built, a questionnaire may be created. This may have either been preloaded based upon which onboarding path was selected, it may be loaded from samples made available by the application, or it can be created by the user based on the outline contained in the template. In all cases every questionnaire may be fully editable by the user. In some embodiments, in order to edit global template settings there must be no outstanding questionnaires in progress that have used that template in its original form.

5. If at least one questionnaire has been created and saved, then a Risk Assessment may be performed for any vendor/product.

6. The user can select their vendor/product for assessment and chooses from a list of available published questionnaires for this assessment.

7. The owner may begin by selecting who may or who must contribute responses, based upon their institutional knowledge and familiarity with the vendor in question.

8. Once the owner/creator has included all of the information they wish to add, contributors are invited to provide their own answers to questions within specific sections or the entire assessment. Owners may view these responses and override the answers given with their own. Contributors may override owner responses as well. The owner can establish the final answer or leave as is before marking the assessment as complete.

9. A two-part assessment can include Inherent as well as Residual risk. Inherent risk can refer to the existing risk that comes from working in a particular space. For example, there's an inherent level of information security risk for those vendors who handle data such as personally identifiable information (PII). Residual risk can refer to the amount of risk left after mitigation has been applied. For example, the same vendor who handles PII may have deployed the latest firewall technology to prevent hackers from gaining access to their servers. This can reduce the risk by a certain amount, which is determined by the industry/institutional knowledge of the user assessing the risk. The final risk score can be a calculation based on inherent/residual risk scores, section/question weighting, and any prevailing score setting.

10. Once one or more (e.g., every) user has given their input, the owner may then mark the assessment as Complete.

11. If Approvals are "ON," this can alert the approvers that they have assessments to review. They can approve or reject an assessment and provide commentary to support their decision.

12. If approved, the assessment can become part of that vendor's overall documentation and is stored in a Risk Assessment history location. Users may refer to them, download them, and share them with others. Disapprovals may either generate a new Risk Assessment or the owner may revise their current assessment based upon the approver's comments and resubmit. Assessments for which no approval is required can be marked as complete by the owner and stored where they can be referred to and used as documentation to support other processes in the application.

13. "Old format" risk assessments (completed prior to the deployment of the new module) can be converted and stored along with any current completed assessments.

14. Actors in the risk assessment process can be kept up-to-date with call-to-action or reminder emails that are triggered by specific events such as being invited to act as a contributor or having an assessment waiting for approval.

15. A set of standardized reports may be available to convey information on completed risk assessments and appear in the Reports module of the application.

Advanced Risk Assessment

In another aspect of an embodiment, the system 100 provides an advanced risk assessment enhancement set or module that may create a new product tier within an assessment module. A user (e.g., a client) with authorization to access advanced level risk assessment software may have access to updated features for (advanced) risk assessment. The advanced risk assessment enhancement set or module may be implemented in one or more workspaces and may allow a user to further customize their risk assessment to align with their current vendor management practices.

Figure 84:
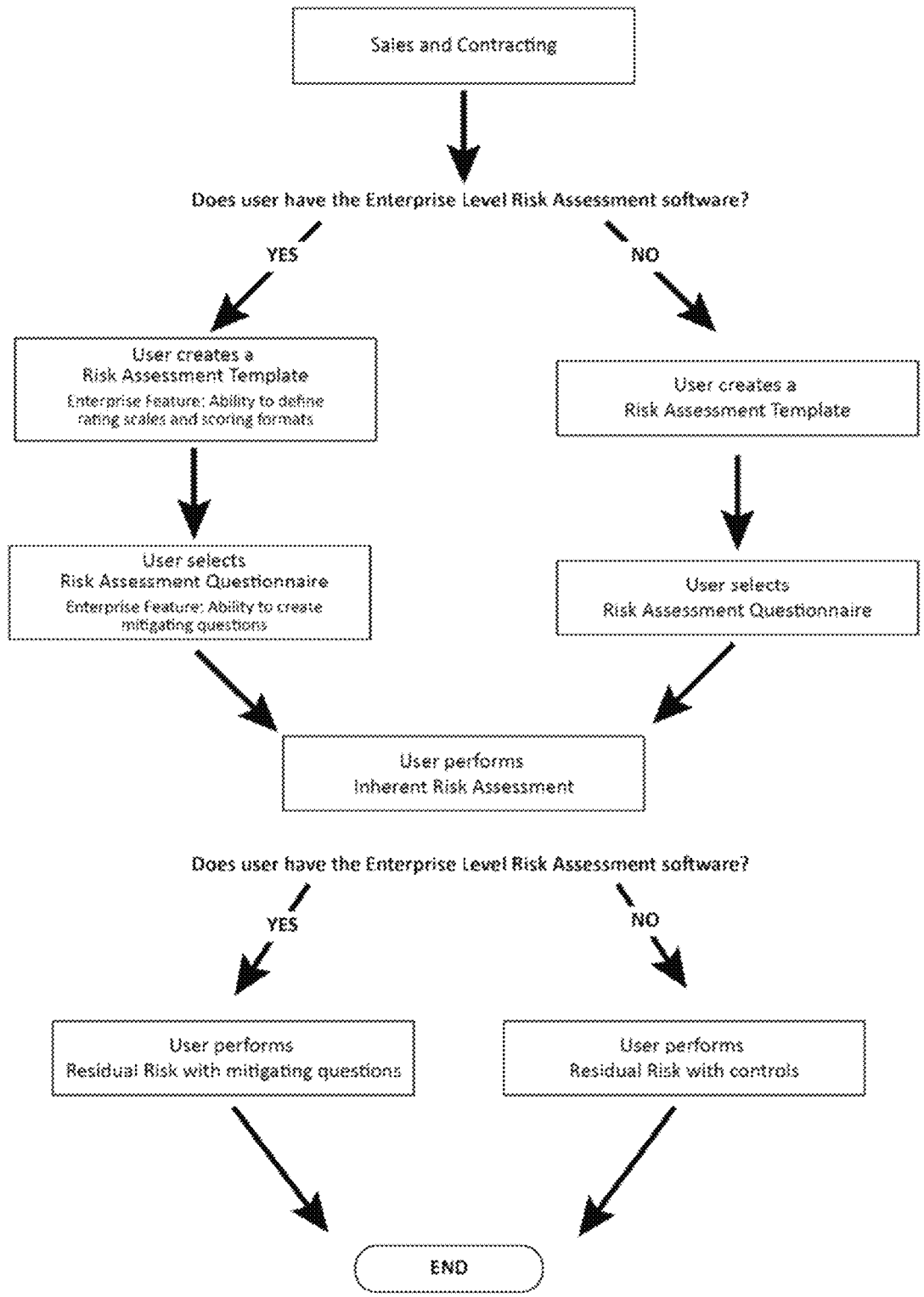
FIG. 84 is an example workflow of the system to guide a user to conduct an advanced risk assessment associated with one or more vendors or products in accordance with an embodiment of the invention.

For example, the advanced risk assessment enhancement set or module may provide a user with the ability to set scoring points when indicating the risk level. Additionally, a user may be provided with the ability to add residual risk questions and/or the ability to set the percentage for how each residual question mitigates the overall risk. An example workflow for risk assessment, with or without advanced (or enterprise) capabilities, is shown in FIG. 84.

Figure 85:
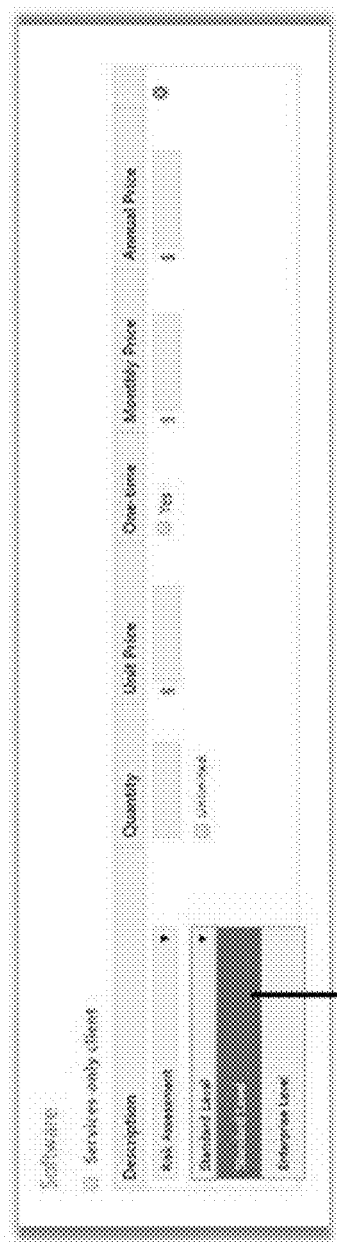
FIG. 85 is a software level selection workspace in accordance with an embodiment of the invention.

A system 100 may include workspaces to manage a client's level of risk assessment software, e.g., through one or more sales and contracting workspaces. In some implementations, when the risk assessment software is ordered by a user, then a system, e.g., system 100 or a system connected to system 100, may indicate whether the software is enterprise level (advanced) or standard level. If the enterprise level was selected, then client users may have access to the enterprise (e.g., updated or advanced) version of the risk assessment software with the new and/or enhanced features. If the standard level was selected, then a client user may have access to the existing risk assessment software without the new (e.g., updated or advanced) features. FIG. 85 depicts a software level selection workspace with level selection drop-down menu widget 8501.

Figure 86:
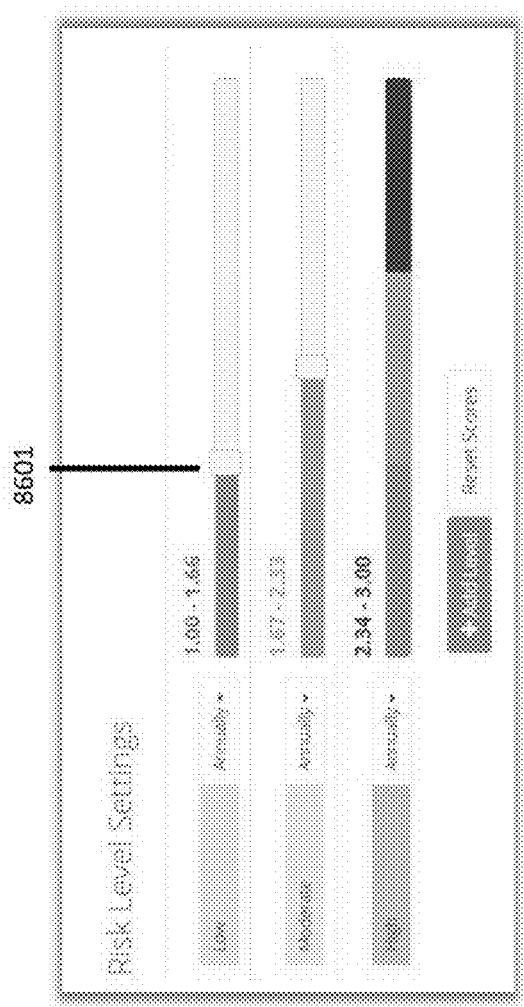
FIG. 86 is risk level settings workspace in accordance with an embodiment of the invention.

Client users may access the risk assessment software, e.g., as described above, by logging into a system application (e.g., system 100). Selecting an assessments link may direct a user to the risk assessment page or workspace. In some embodiments, a clients may need to set up a risk assessment template before beginning a risk assessment. Client users may set up the risk levels and may have the ability to define risk level settings, e.g., three to five risk level settings. The risk level settings can be identified by applying the risk level terminology used at a client's institution. In some embodiments, a client user may be provided with the ability to define a rating scale and/or set each risk level's point thresholds using a sliding scale, e.g., using a slider widget 8601 on a risk level settings workspace, e.g., as shown in FIG. 86.

Figure 87:
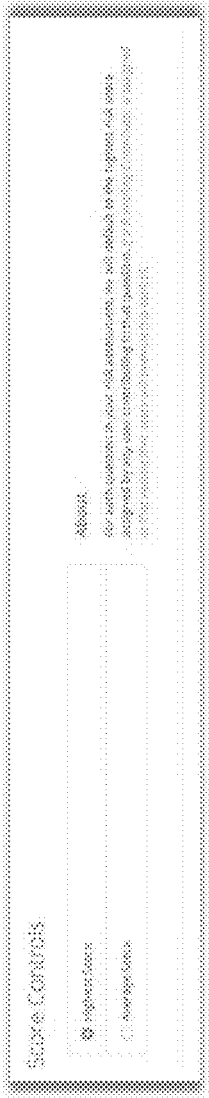
FIG. 87 is a score control workspace in accordance with an embodiment of the invention.

FIG. 87 shows an example score control workspace. In some embodiments, score controls (e.g., for risk scores as described above) may be determined on a risk assessment template. The options for scoring may be to score by the highest score or by the average score. When the highest score is selected, then for each question in a risk assessment, a system (e.g., system 100) will default to the highest risk score assigned by any user contributing to that question.

When the average score is selected, then for each question in a risk assessment, the system (e.g., system 100) will average the risk score assigned by all users contributing to that question.

Figure 88:
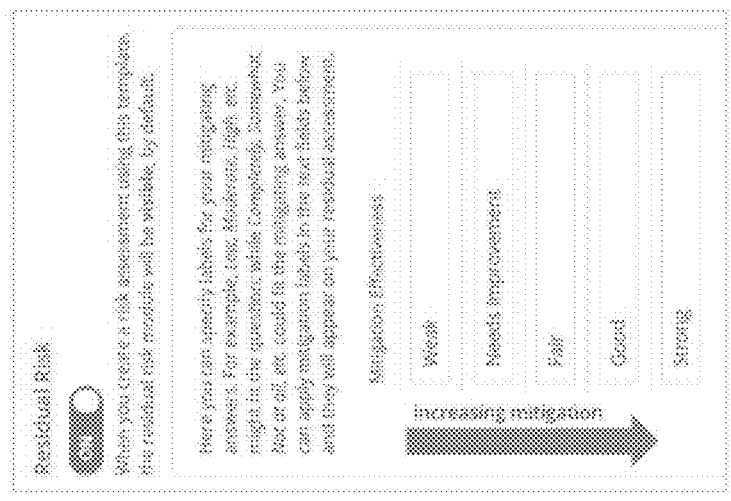
FIG. 88 is a risk template—mitigation effectiveness workspace in accordance with an embodiment of the invention.

FIG. 88 shows an example risk template—mitigation effectiveness workspace. In some embodiments, on a risk template workspace, a (client) user can define custom labels that describe the mitigation effectiveness. These values may be used when performing their residual risk assessment, e.g., as described above.

In some embodiments, after setting up the template, a client may need to create an assessment questionnaire, e.g., a risk assessment questionnaire as described above. Two or more questionnaires may be created and saved to use in assessments. With the advanced experience using an advanced risk assessment enhancement set or module, when residual risk assessment (e.g., a residual risk assessment module) is selected, a client may add residual question(s), e.g., to each inherent question, (e.g., where each question is designated inherent to a (residual) risk assessment module). In some embodiments, mitigation allowance for residual question(s) may default to a percentage based on the number of risk levels defined in the template, e.g., as shown in Table 8.

TABLE 8

| Number of Risk Levels | Default Percentage |
| --- | --- |
| 3 | 67% |
| 4 | 75% |
| 5 | 80% |

Figure 89:
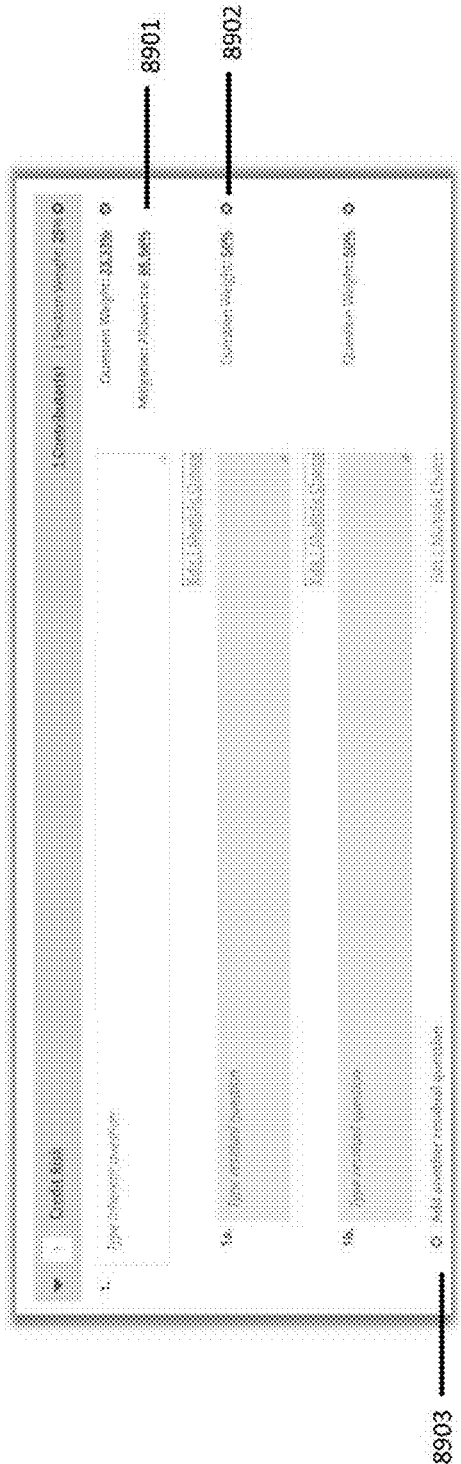
FIG. 89 is an inherent and/or residual question workspace in accordance with an embodiment of the invention.
Figure 90:
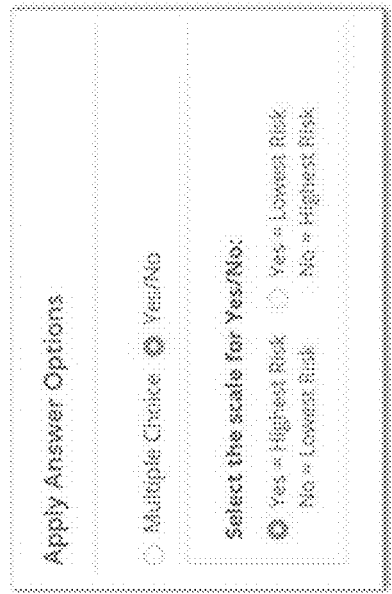
FIG. 90 is a manage answer format workspace in accordance with an embodiment of the invention.

FIG. 89 shows an example inherent and/or residual question workspace. Each mitigating question may have a question weight (8902) towards the mitigation allowance (8901), e.g., as assigned by a client user. Additional residual questions may be added using an add another residual question widget 8903. Question weights for all mitigation question(s) assigned to an inherent risk question will equal 100%. In some embodiments, the answer format may be changed to a Yes/No format for both inherent questions and residual questions, e.g., through a manage answer format workspace as shown in FIG. 90. In some embodiments, the format may default to multiple choice.

Figure 91:
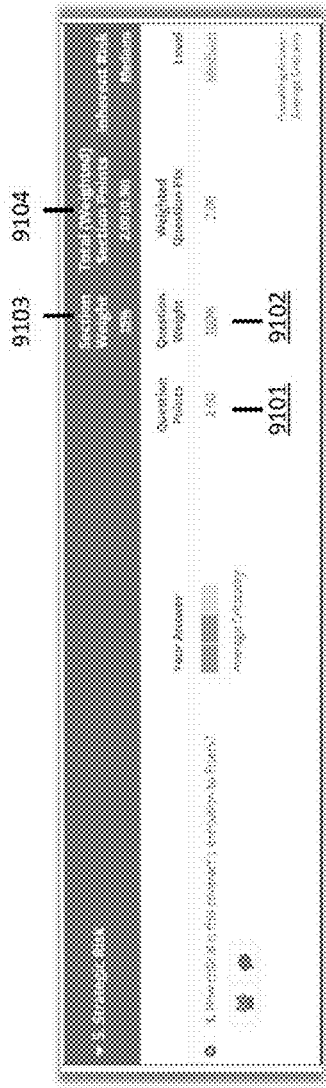
FIG. 91 is an example inherent risk question workspace in accordance with an embodiment of the invention.

In some embodiments, an inherent risk assessment page may display the questions that were added to the questionnaire, e.g., as shown in FIG. 91. In some embodiments of the inherent risk assessment module (e.g., an advanced or enterprise inherent risk assessment module), the module may include one or more displays displaying the question points (9101) and question weight (9102) towards the overall risk score. In some embodiments, the question weight may be edited. The section weight (9103) and total section points (9104) may be displayed for clear understanding of how the score is derived.

Figure 92:
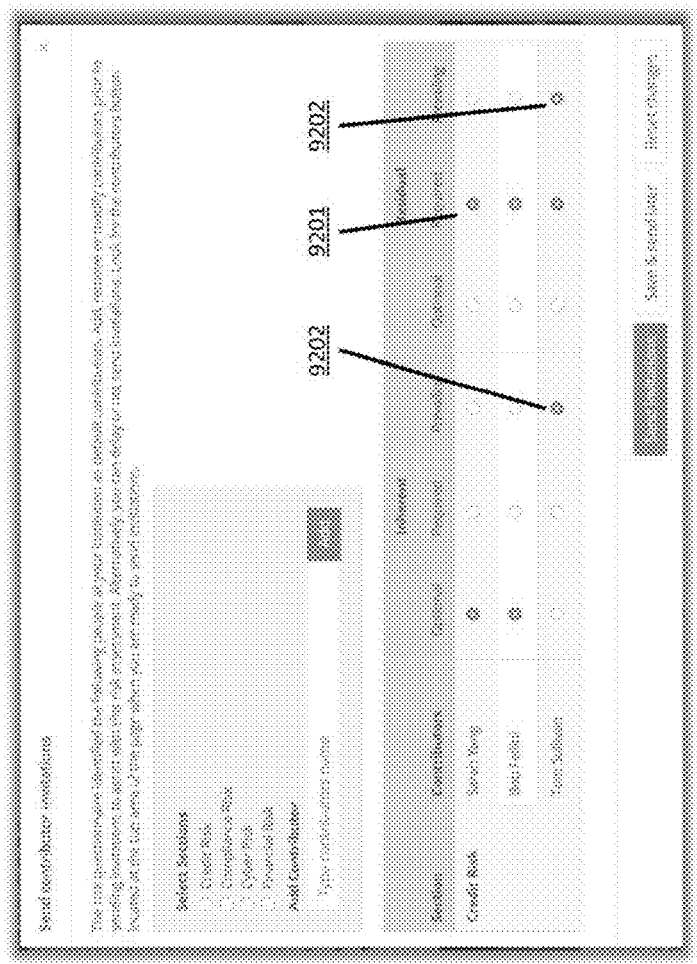
FIG. 92 is an invite contributor workspace in accordance with an embodiment of the invention.

In some embodiments, a client user can invite contributors to assist in completing an assessment. In some embodiments, e.g., in an advanced risk assessment enhancement module or environment, contributors can be added to inherent and residual questions, e.g., using an invite contributor workspace, e.g., as shown in FIG. 92. A contributor may be designated as optional or required, e.g., by selecting an appropriate radio button (e.g., button 9201). In some embodiments, e.g., in advanced risk assessment, a prevailing contributor can be established e.g., by selecting an appropriate radio button (e.g., buttons 9202). In some embodiments, when a prevailing contributor is invited to participate in the assessment, the answer given by the prevailing contributor may always determine the risk score.

Figure 93:
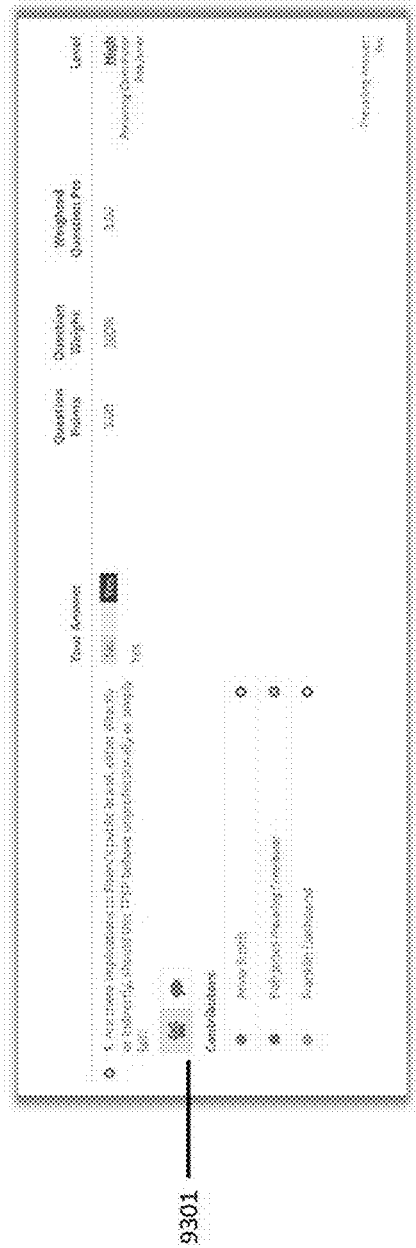
FIG. 93 is an example contributor workspace in accordance with an embodiment of the invention.
Figure 94:
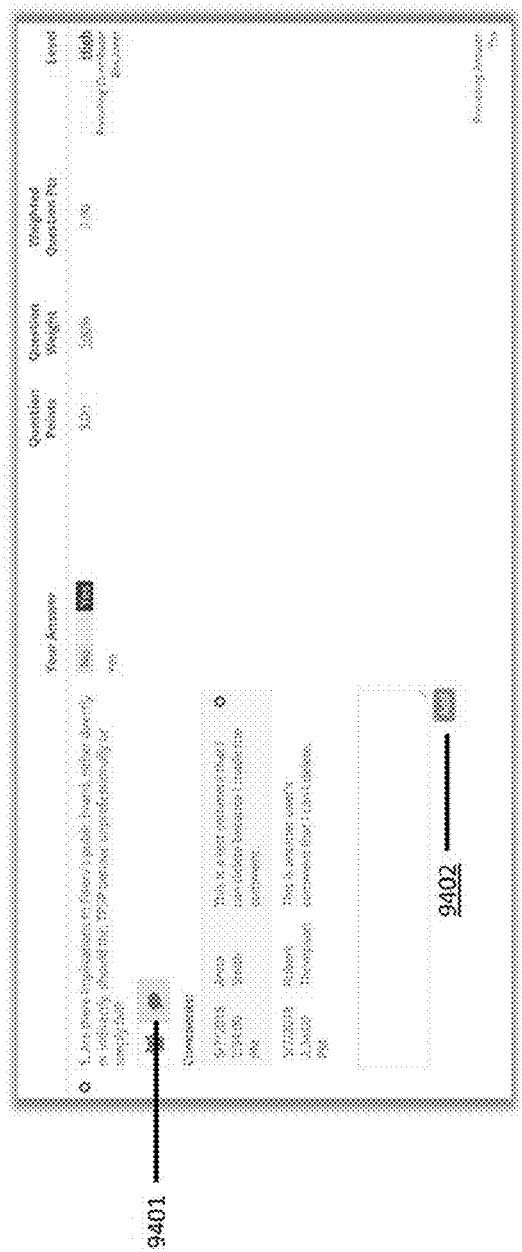
FIG. 94 is an example comment workspace in accordance with an embodiment of the invention.

In some embodiments, when a contributor(s) has been invited then the contributor icon or button 9301 for a question displayed in an appropriate workspace may be green to indicate there is a contributor(s), e.g., as shown in FIG. 93. When the icon or button is selected, a list of contributors may be displayed. In some embodiments, after a user has selected button 9401, comments may be added to each question, e.g., by selecting add button 9402, e.g., as shown in FIG. 94. A history of comments may be displayed with a date/time stamp and the user's name that entered the comment.

Figure 95:
FIG. 95 is an example residual risk question workspace in accordance with an embodiment of the invention.

In some embodiments, when a residual risk assessment module is active, e.g., in an assessment template, a client user may be directed to residual risk questions after completing inherent risk questions. In some embodiments, e.g., in an advanced risk assessment enhancement module or environment, an inherent question may be displayed in a read only format with the mitigating question(s) displayed underneath, e.g., as shown in FIG. 95 showing an example residual risk question workspace. In some embodiments, each mitigating question 9501 may be displayed with a subtraction value of points 9502 associated with that question. Total mitigated points may displayed (9503), which may represent the total mitigated points that were applied to the inherent risk points. In some embodiments, at the bottom of each section, (total) points may be displayed (9504). The total points may represent the residual points for the section. The formula used may be: total points=total section points− total mitigated points.

Figure 96B:
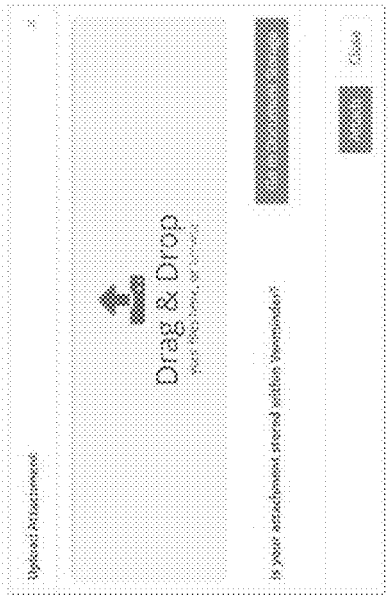
FIG. 96A and FIG. 96B are example attachment workspaces in accordance with an embodiment of the invention.
Figure 96A:
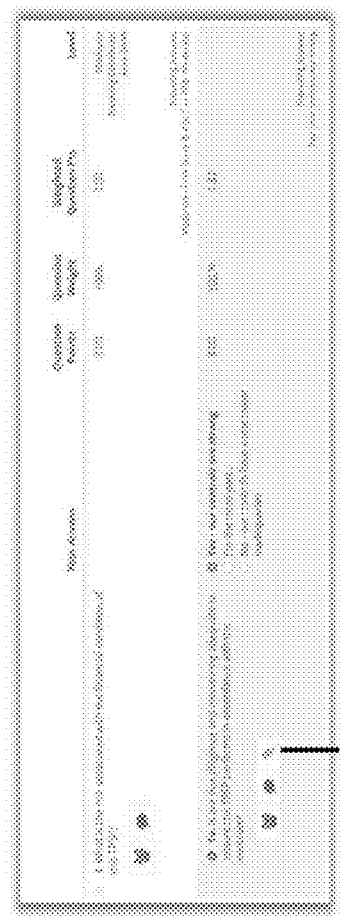

In some embodiments, contributor and comment icons may be displayed and may function the same way as those displayed inherent risk assessment page, e.g., as shown in FIG. 91. In some embodiments, an advanced risk assessment enhancement workspace may display an added icon 9601 to attach documents, e.g., as shown in FIG. 96A. In some embodiments, a client may attach documents from document storage and from their computer, e.g., using an upload attachment widget as shown in FIG. 96B.

Figure 97:
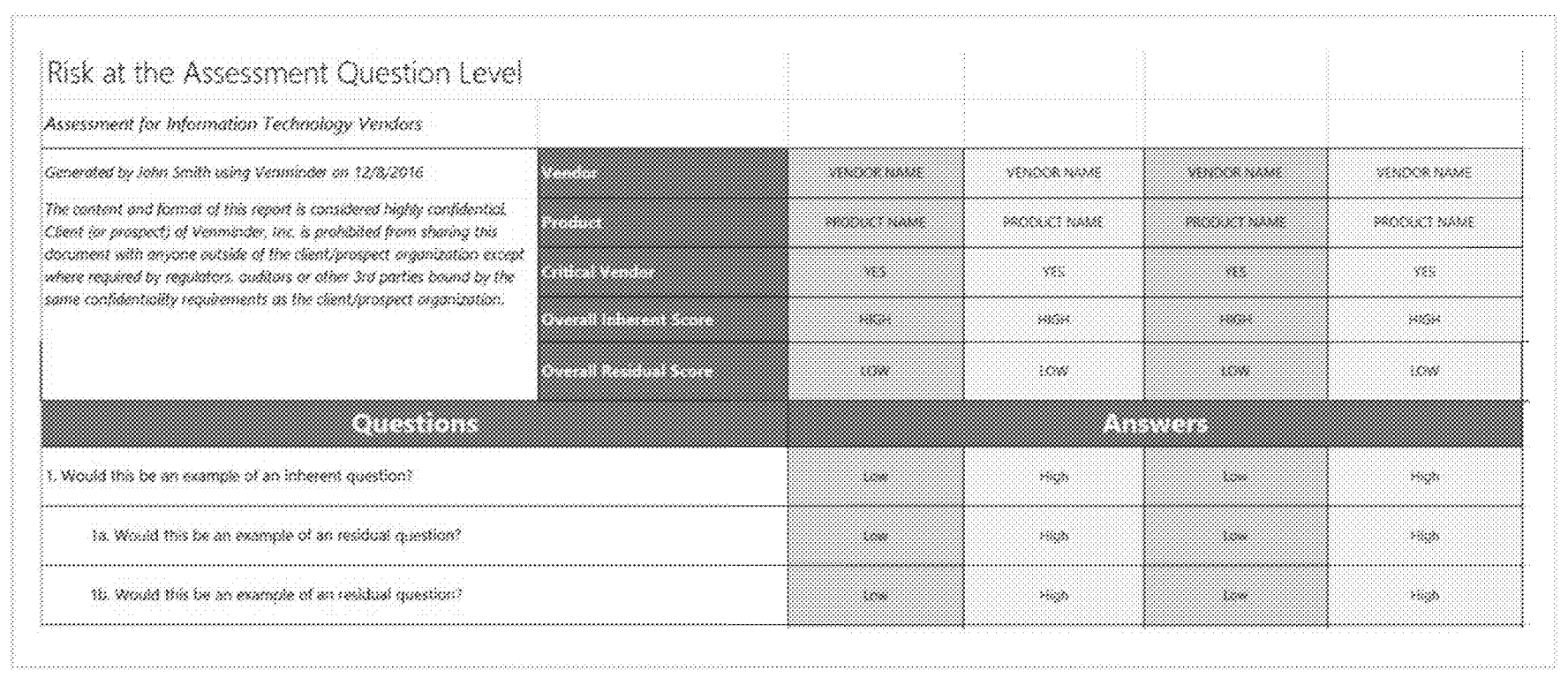

In some embodiments, a report may be generated from an assessment. In some embodiments, a PDF-file including a report may be generated once a risk assessment is completed. In some embodiments, e.g., when an advanced risk assessment enhancement module is active, an advanced version of the PDF-file may include residual risk questions and answers. The PDF-file may include and/or display all the comments entered and list the attachments. For all risk assessment client users, a risk at the assessment question level report may display mitigation questions and the corresponding answers. In some embodiments, the questions may be displayed on the vertical axis and vendor products are displayed along the horizontal axis, e.g., as shown in the example risk report shown in FIG. 97.

Exemplary Network Environment and Computing Device

Figure 98:
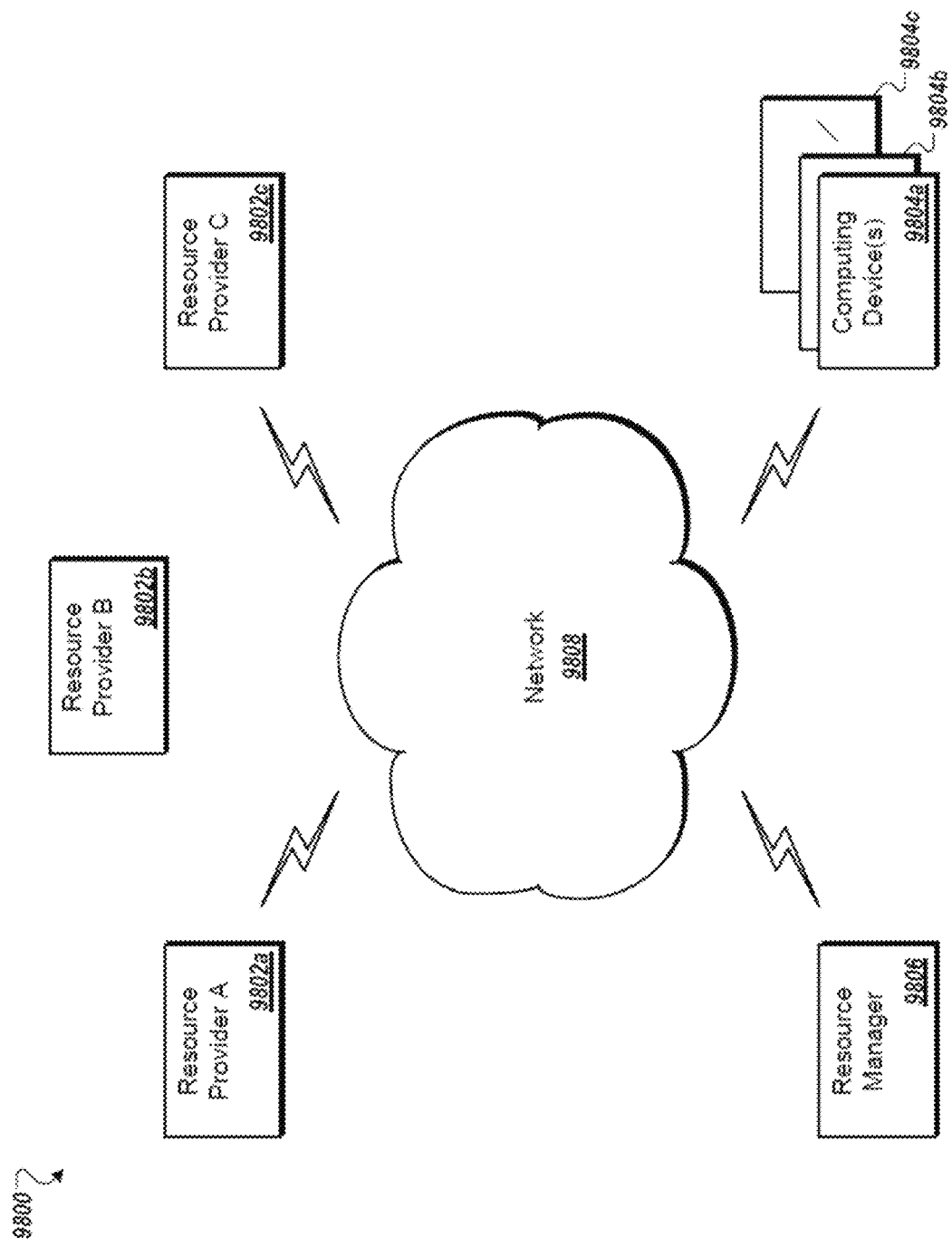
FIG. 98 is a block diagram of an example network environment for use in the methods and systems for analysis of spectrometry data, according to an illustrative embodiment.

FIG. 98 shows an illustrative network environment 9800 for use in the methods and systems described herein. In brief overview, referring now to FIG. 98, a block diagram of an exemplary cloud computing environment 9800 is shown and described. The cloud computing environment 9800 may include one or more resource providers 9802*a*, 9802*b*, 9802*c* (collectively, 9802). Each resource provider 9802 may include computing resources. In some implementations, computing resources may include any hardware and/or software used to process data. For example, computing resources may include hardware and/or software capable of executing algorithms, computer programs, and/or computer applications. In some implementations, exemplary computing resources may include application servers and/or databases with storage and retrieval capabilities. Each resource provider 9802 may be connected to any other resource provider 9802 in the cloud computing environment 9800. In some implementations, the resource providers 9802 may be connected over a computer network 9808. Each resource provider 9802 may be connected to one or more computing device 9804a, 9804b, 9804c (collectively, 9804), over the computer network 9808.

The cloud computing environment 9800 may include a resource manager 9806. The resource manager 9806 may be connected to the resource providers 9802 and the computing devices 9804 over the computer network 9808. In some implementations, the resource manager 9806 may facilitate the provision of computing resources by one or more resource providers 9802 to one or more computing devices 9804. The resource manager 9806 may receive a request for a computing resource from a particular computing device 9804. The resource manager 9806 may identify one or more resource providers 9802 capable of providing the computing resource requested by the computing device 9804. The resource manager 9806 may select a resource provider 9802 to provide the computing resource. The resource manager 9806 may facilitate a connection between the resource provider 9802 and a particular computing device 9804. In some implementations, the resource manager 9806 may establish a connection between a particular resource provider 9802 and a particular computing device 9804. In some implementations, the resource manager 9806 may redirect a particular computing device 9804 to a particular resource provider 9802 with the requested computing resource.

Figure 99:
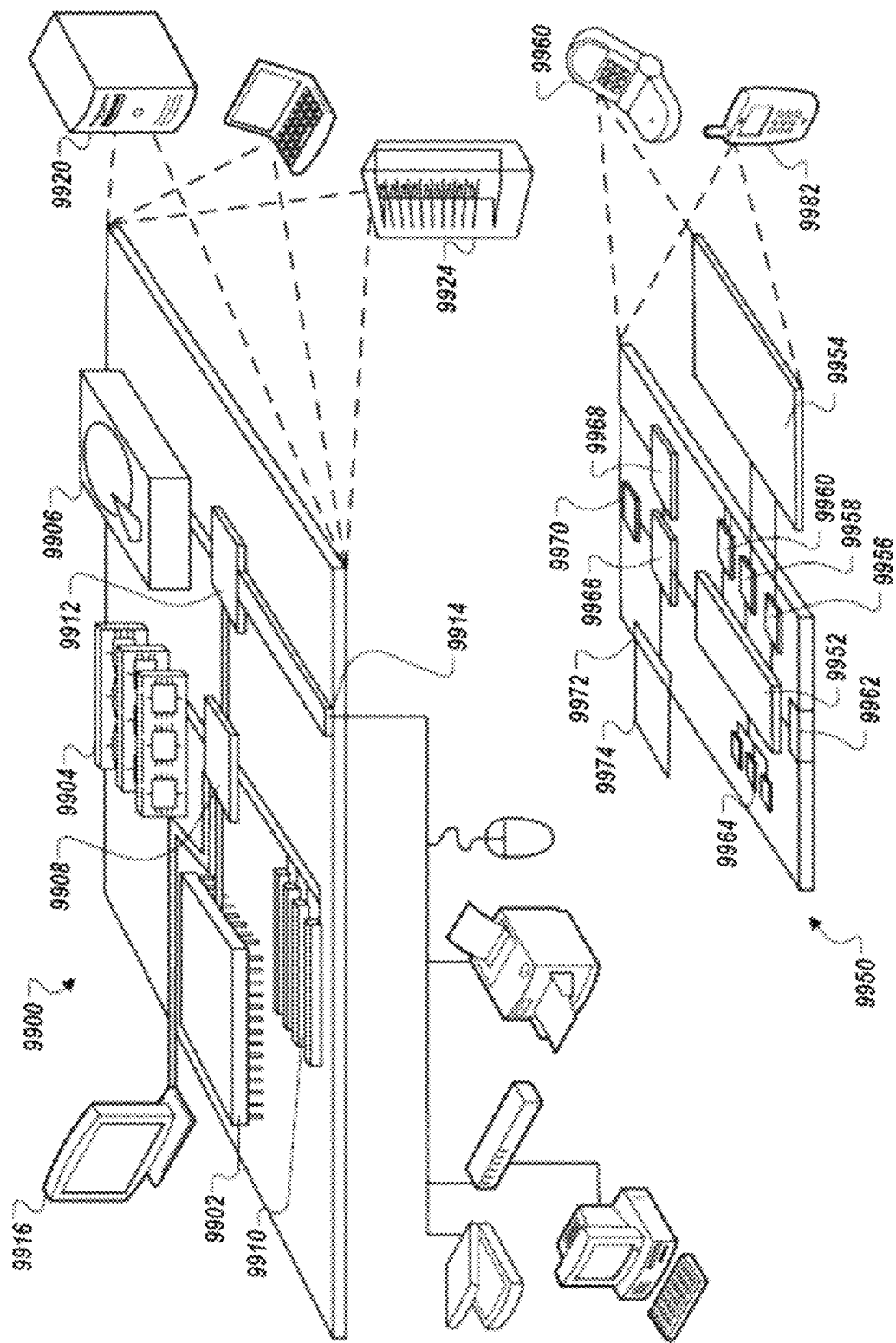
FIG. 99 is a block diagram of an example computing device and an example mobile computing device, for use in illustrative embodiments of the invention.

FIG. 99 shows an example of a computing device 9900 and a mobile computing device 9950 that can be used in the methods and systems described in this disclosure. The computing device 9900 is intended to represent various forms of digital computers, such as laptops, desktops, workstations, personal digital assistants, servers, blade servers, mainframes, and other appropriate computers. The mobile computing device 9950 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 9900 includes a processor 9902, a memory 9904, a storage device 9906, a high-speed interface 9908 connecting to the memory 9904 and multiple high-speed expansion ports 9910, and a low-speed interface 9912 connecting to a low-speed expansion port 9914 and the storage device 9906. Each of the processor 9902, the memory 9904, the storage device 9906, the high-speed interface 9908, the high-speed expansion ports 9910, and the low-speed interface 9912, are interconnected using various busses, and may be mounted on a common motherboard or in other manners as appropriate. The processor 9902 can process instructions for execution within the computing device 9900, including instructions stored in the memory 9904 or on the storage device 9906 to display graphical information for a GUI on an external input/output device, such as a display 9916 coupled to the high-speed interface 9908. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 9904 stores information within the computing device 9900. In some implementations, the memory 9904 is a volatile memory unit or units. In some implementations, the memory 9904 is a non-volatile memory unit or units. The memory 9904 may also be another form of computer-readable medium, such as a magnetic or optical disk.

The storage device 9906 is capable of providing mass storage for the computing device 9900. In some implementations, the storage device 9906 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 9902), perform one or more methods, such as those described above. The instructions can also be stored by one or more storage devices such as computer- or machine-readable mediums (for example, the memory 9904, the storage device 9906, or memory on the processor 9902).

The high-speed interface 9908 manages bandwidth-intensive operations for the computing device 9900, while the low-speed interface 9912 manages lower bandwidth-intensive operations. Such allocation of functions is an example only. In some implementations, the high-speed interface 9908 is coupled to the memory 9904, the display 9916 (e.g., through a graphics processor or accelerator), and to the high-speed expansion ports 9910, which may accept various expansion cards (not shown). In the implementation, the low-speed interface 9912 is coupled to the storage device 9906 and the low-speed expansion port 9914. The low-speed expansion port 9914, which may include various communication ports (e.g., USB, Bluetooth®, Ethernet, wireless Ethernet) may be coupled to one or more input/output devices, such as a keyboard, a pointing device, a scanner, or a networking device such as a switch or router, e.g., through a network adapter.

The computing device 9900 may be implemented in a number of different forms, as shown in the figure. For example, it may be implemented as a standard server 9920, or multiple times in a group of such servers. In addition, it may be implemented in a personal computer such as a laptop computer 9922. It may also be implemented as part of a rack server system 9924. Alternatively, components from the computing device 9900 may be combined with other components in a mobile device (not shown), such as a mobile computing device 9950. Each of such devices may contain one or more of the computing device 9900 and the mobile computing device 9950, and an entire system may be made up of multiple computing devices communicating with each other.

The mobile computing device 9950 includes a processor 9952, a memory 9964, an input/output device such as a display 9954, a communication interface 9966, and a transceiver 9968, among other components. The mobile computing device 9950 may also be provided with a storage device, such as a micro-drive or other device, to provide additional storage. Each of the processor 9952, the memory 9964, the display 9954, the communication interface 9966, and the transceiver 9968, are interconnected using various buses, and several of the components may be mounted on a common motherboard or in other manners as appropriate.

The processor 9952 can execute instructions within the mobile computing device 9950, including instructions stored in the memory 9964. The processor 9952 may be implemented as a chipset of chips that include separate and multiple analog and digital processors. The processor 9952 may provide, for example, for coordination of the other components of the mobile computing device 9950, such as control of user interfaces, applications run by the mobile computing device 9950, and wireless communication by the mobile computing device 9950.

The processor 9952 may communicate with a user through a control interface 9958 and a display interface 9956 coupled to the display 9954. The display 9954 may be, for example, a TFT (Thin-Film-Transistor Liquid Crystal Display) display or an OLED (Organic Light Emitting Diode) display, or other appropriate display technology. The display interface 9956 may comprise appropriate circuitry for driving the display 9954 to present graphical and other information to a user. The control interface 9958 may receive commands from a user and convert them for submission to the processor 9952. In addition, an external interface 9962 may provide communication with the processor 9952, so as to enable near area communication of the mobile computing device 9950 with other devices. The external interface 9962 may provide, for example, for wired communication in some implementations, or for wireless communication in other implementations, and multiple interfaces may also be used.

The memory 9964 stores information within the mobile computing device 9950. The memory 9964 can be implemented as one or more of a computer-readable medium or media, a volatile memory unit or units, or a non-volatile memory unit or units. An expansion memory 9974 may also be provided and connected to the mobile computing device 9950 through an expansion interface 9972, which may include, for example, a SIMM (Single In Line Memory Module) card interface. The expansion memory 9974 may provide extra storage space for the mobile computing device 9950, or may also store applications or other information for the mobile computing device 9950. Specifically, the expansion memory 9974 may include instructions to carry out or supplement the processes described above, and may include secure information also. Thus, for example, the expansion memory 9974 may be provided as a security module for the mobile computing device 9950, and may be programmed with instructions that permit secure use of the mobile computing device 9950. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier and, when executed by one or more processing devices (for example, processor 9952), perform one or more methods, such as those described above. The instructions can also be stored by one or more storage devices, such as one or more computer- or machine-readable mediums (for example, the memory 9964, the expansion memory 9974, or memory on the processor 9952). In some implementations, the instructions can be received in a propagated signal, for example, over the transceiver 9968 or the external interface 9962.

The mobile computing device 9950 may communicate wirelessly through the communication interface 9966, which may include digital signal processing circuitry where necessary. The communication interface 9966 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 9968 using a radio-frequency. In addition, short-range communication may occur, such as using a Bluetooth®, Wi-Fi™, or other such transceiver (not shown). In addition, a GPS (Global Positioning System) receiver module 9970 may provide additional navigation- and location-related wireless data to the mobile computing device 9950, which may be used as appropriate by applications running on the mobile computing device 9950.

The mobile computing device 9950 may also communicate audibly using an audio codec 9960, which may receive spoken information from a user and convert it to usable digital information. The audio codec 9960 may likewise generate audible sound for a user, such as through a speaker, e.g., in a handset of the mobile computing device 9950. Such sound may include sound from voice telephone calls, may include recorded sound (e.g., voice messages, music files, etc.) and may also include sound generated by applications operating on the mobile computing device 9950.

The mobile computing device 9950 may be implemented in a number of different forms, as shown in the figure. For example, it may be implemented as a cellular telephone 9980. It may also be implemented as part of a smart-phone 9982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

What is claimed is:

1. A method for determining risk levels associated with a vendor, the method comprising the steps of:
    causing to display, by a processor of an enterprise system, one or more graphical user interfaces (GUIs) associated with one or more risk assessment modules, the risk assessment modules comprising a template management module for managing questionnaire templates;
    receiving, by a processor of an enterprise system, a first input from a first client, the first input comprising instructions to access a selected module of the one or more risk assessment modules;
    performing, by the first client, a multi-step risk assessment comprising:
        (a) determining an inherent risk score based on an inherent risk associated with the vendor by answering, by the first client, a plurality of inherent risk questions based on at least one attribute that is specific to the vendor;
        (b) assessing mitigating controls for the vendor by answering a plurality of residual risk questions, the residual risk questions being based on at least one of the following analyses of the vendor: financial analyses, cyber-security reviews, expert reviews, and assessment of regulatory requirements, wherein each of the inherent risk questions and each of the residual risk questions fall within one of a plurality of risk levels upon which the vendor is evaluated; and
        (c) determining a residual risk score representative of a residual risk associated with the vendor after application of the mitigating controls to the vendor, the residual risk score being equal to the inherent risk score after adjusting for a mitigation allowance, the mitigation allowance being determined based on answers to the residual risk questions;
    receiving, by the processor of the enterprise system, subsequent input from the first client specific to the selected risk assessment module, the subsequent input comprising answers to at least one of the inherent risk questions and the residual risk questions; and
    updating, in a memory of the enterprise system, risk assessments information stored in association with the first client, based on the subsequent input, the risk assessments information comprising at least one of (1) the inherent risk score, and (2) the residual risk score;
    wherein the template management module comprises a residual risk flag which:
        when turned "off," hides a residual risk module in which the residual risk questions are displayed, and
        when turned "on," causes a weighted question feature for the inherent risk score to be visible within the risk assessments module.

2. The method of claim 1, wherein the method comprises providing to a user a create questionnaire GUI in which the user can define the inherent risk questions and/or the residual risk questions for the vendor.

3. The method of claim 1, wherein the method comprises providing to a user a review response GUI in which the user can review at least one of 1) the inherent risk score, 2) the residual risk score, 3) the mitigation allowance, 4) one or more answers to the inherent risk questions, and 5) one or more answers to the residual risk questions.

4. The method of claim 1, wherein determining a risk level associated with a vendor comprises determining a risk level associated with a software product of the vendor.

5. The method of claim 1, wherein the vendor comprises at least one service provider.

6. The method of claim 1, wherein all of the inherent risk questions must be answered by the first client before any of the residual risk questions are displayed.

7. The method of claim 1, wherein a higher score is associated with a higher level of risk, and
    wherein the residual risk score may not result in a higher score than the inherent risk score.

8. The method of claim 1, wherein, upon completion of the inherent risk questions, by the first client, and proceeding to the residual risk questions, the answers provided to the inherent risk questions are frozen such that a second client may not access the multi-step risk assessment while the first client is answering the plurality of residual risk questions.

9. The method of claim 1, comprising defining, by the first client, the number of risk levels in the plurality of risk levels.

10. The method of claim 9, wherein the plurality of risk levels comprise a number of risk levels in a range from 3 to 5.

11. The method of claim 1, comprising adding, by the first client, at least one additional residual risk question to the plurality of residual risk questions via an add another residual question widget in the one or more risk assessment modules.

12. The method of claim 1, comprising activating, by the first client a residual risk assessment module from the one or more risk assessment modules,
    wherein, when the residual risk assessment module is activated, the first client is directed to the residual risk questions after completing the inherent risk questions.

13. A method for determining risk levels associated with a vendor, the method comprising the steps of:
    causing to display, by a processor of an enterprise system, one or more graphical user interfaces (GUIs) associated with one or more risk assessment modules, the risk assessment modules comprising a template management module for managing questionnaire templates;
    receiving, by a processor of an enterprise system, a first input from a first client, the first input comprising instructions to access a selected module of the one or more risk assessment modules;
    performing, by the first client, a multi-step risk assessment comprising:

(a) determining an inherent risk score based on an inherent risk associated with the vendor by answering, by the first client, a plurality of inherent risk questions based on at least one of (1) internal policies of the vendor, (2) internal procedures of the vendor, and (3) the line of business in which the vendor is engaged, each of the plurality of inherent risk questions falling into one of a plurality of inherent risk sections, each inherent risk section comprising an associated section weight, each of the inherent risk questions comprising a question weight within the corresponding inherent risk section;

(b) assessing mitigating controls for the vendor by answering a plurality of residual risk questions, each of the plurality of residual risk questions falling into one of a plurality of residual risk sections, each residual risk section comprising an associated section weight, each of the residual risk questions comprising a question weight within the corresponding residual risk section;

(c) determining a residual risk score representative of a residual risk associated with the vendor after application of the mitigating controls to the vendor, the residual risk score being equal to the inherent risk score after adjusting for a mitigation allowance, the mitigation allowance being determined based on answers to the residual risk questions; and (d) determining, by the first client, a final risk score, the final risk score based at least partially on each of the inherent risk score, the residual risk score, the question weights, and the section weights; and receiving, by the processor of the enterprise system, subsequent input from the first client specific to the selected risk assessment module, the subsequent inputs comprising answers to at least one of the inherent risk questions and the residual risk questions;

wherein determining at least one of the inherent risk score and the residual risk score comprises adjusting, by the first client, at least one of an inherent risk section weight and an inherent risk question weight.

14. The method of claim 13, comprising omitting, by the first client, at least one question from one of the inherent risk sections and/or from one of the residual risk sections.

15. An enterprise system workflow for vendor risk assessment comprising:

causing to display, by a processor of the enterprise system, one or more graphical user interfaces (GUIs) associated with one or more risk assessment modules;

creating, by a first client via the one or more risk assessment modules, a risk assessment template, the risk assessment template configured to allow the first client to define rating scales, risk levels, and/or scoring formats;

selecting, by the first client, a plurality of risk assessment questionnaires comprising an inherent risk questionnaire and a residual risk questionnaire;

defining, by the first client, a plurality of risk levels for each of the inherent risk questionnaire and the residual risk questionnaire;

performing, by the first client, an inherent risk assessment by answering a plurality of inherent risk questions in the inherent risk questionnaire, wherein answering the plurality of inherent risk questions comprises sliding a slider corresponding to each question within the inherent risk questionnaire to the appropriate risk level for each corresponding question within the inherent risk questionnaire;

performing, by the first client, a residual risk assessment by answering a plurality of residual risk questions in the residual risk questionnaire, the residual risk questions identifying mitigating controls that are being implemented by the vendor to mitigate risks identified via the inherent risk questionnaire, wherein answering the plurality of residual risk questions comprises sliding a slider corresponding to each question within the residual risk questionnaire to the appropriate risk level for each corresponding question within the residual risk questionnaire; and determining a final risk score, based at least partially on (1) an inherent risk score determined from the inherent risk questionnaire, and (2) a residual risk score determined from the residual risk questionnaire, wherein at least one of the inherent risk questionnaire and the residual risk questionnaire comprises at least one tiered question only visible to the first client if a particular response to a parent question of the inherent risk questionnaire and/or the residual risk questionnaire was selected by the first client.

16. The workflow of claim 15, wherein defining a plurality of risk levels comprises identifying, by the first client, the plurality of risk levels by applying risk level terminology used at the first client's institution.

17. The workflow of claim 15, wherein all required inputs for the inherent risk assessment must be completed before the residual risk assessment is performed.

18. The workflow of claim 15, further comprising a score control workspace for at least one of the inherent risk assessment and the residual risk assessment, the score control module comprising a first option to score by the highest score and a second option to score by the average score, wherein if the first client selects the first option, the workflow defaults the score for each question in the respective risk assessment to a highest risk score assigned to that question, and wherein if the first client selects the second option, for each question in the respective risk assessment, the workflow averages all the scores assigned to that question.

* * * * *